(12) United States Patent
Venkataraman et al.

(10) Patent No.: US 12,340,538 B2
(45) Date of Patent: Jun. 24, 2025

(54) SYSTEMS AND METHODS FOR GENERATING AND USING VISUAL DATASETS FOR TRAINING COMPUTER VISION MODELS

(71) Applicant: INTRINSIC INNOVATION LLC, Mountain View, CA (US)

(72) Inventors: Kartik Venkataraman, San Jose, CA (US); Agastya Kalra, Nepean (CA); Achuta Kadambi, Los Altos Hills, CA (US); Ramesh Raskar, Cambridge, MA (US)

(73) Assignee: Intrinsic Innovation LLC, Mountain View, CA (US)

( * ) Notice: Subject to any disclaimer, the term of this patent is extended or adjusted under 35 U.S.C. 154(b) by 69 days.

(21) Appl. No.: 17/359,326

(22) Filed: Jun. 25, 2021

(65) Prior Publication Data

US 2022/0414928 A1 Dec. 29, 2022

(51) Int. Cl.
*G06T 7/73* (2017.01)
*G02B 27/28* (2006.01)
(Continued)

(52) U.S. Cl.
CPC .............. *G06T 7/75* (2017.01); *G02B 27/288* (2013.01); *G06N 3/08* (2013.01); *G06T 7/344* (2017.01);
(Continued)

(58) Field of Classification Search
CPC ...... G06V 10/145; G06V 10/24; G06V 10/26; G06V 10/774; G06V 10/82;
(Continued)

(56) References Cited

U.S. PATENT DOCUMENTS 4,124,798 A 11/1978 Thompson
4,198,646 A 4/1980 Alexander et al.
(Continued)

FOREIGN PATENT DOCUMENTS

CN 2488005 Y 4/2002
CN 1619358 A 5/2005
(Continued)

OTHER PUBLICATIONS

US 8,957,977 B2, 02/2015, Venkataraman et al. (withdrawn)
(Continued)

*Primary Examiner* — Ryan M Gray
(74) *Attorney, Agent, or Firm* — Fish & Richardson P.C.

(57) ABSTRACT

A system for collecting data for training a computer vision model for shape estimation includes: an imaging system configured to capture one or more images; and a processing system including a processor and memory storing instructions that, when executed by the processor, cause the processor to: receive one or more input images from the imaging system; estimate a pose of an object depicted in the one or more images; render a shape estimate from a 3-D model of the object posed in accordance with the pose of the object; and generate a data point of a training dataset, the data point including one or more images based on the one or more input images and a label corresponding to the one or more images, the label including the shape estimate.

23 Claims, 17 Drawing Sheets

(51) Int. Cl.
  *G06N 3/08* (2023.01)
  *G06T 7/33* (2017.01)
  *G06T 7/50* (2017.01)
  *G06T 17/00* (2006.01)

(52) U.S. Cl.
  CPC .............. *G06T 7/50* (2017.01); *G06T 17/00* (2013.01); *G06T 2207/10028* (2013.01); *G06T 2207/20081* (2013.01); *G06T 2207/30108* (2013.01)

(58) Field of Classification Search
  CPC .......... G06V 2201/06; G06V 2201/12; G06V 20/653; G06V 20/64; G06N 3/08; G06T 7/344; G06T 7/50; G06T 7/70; G06T 7/73; G06T 7/75; G06T 17/00; G06T 2207/10028; G06T 2207/20081; G06T 2207/30108
  See application file for complete search history.

(56) References Cited

U.S. PATENT DOCUMENTS

| | | | |
|---|---|---|---|
| 4,323,925 A | 4/1982 | Abell et al. |
| 4,460,449 A | 7/1984 | Montalbano |
| 4,467,365 A | 8/1984 | Murayama et al. |
| 4,652,909 A | 3/1987 | Glenn |
| 4,888,645 A | 12/1989 | Mitchell et al. |
| 4,899,060 A | 2/1990 | Lischke |
| 4,962,425 A | 10/1990 | Rea |
| 5,005,083 A | 4/1991 | Grage et al. |
| 5,070,414 A | 12/1991 | Tsutsumi |
| 5,144,448 A | 9/1992 | Hornbaker et al. |
| 5,157,499 A | 10/1992 | Oguma et al. |
| 5,325,449 A | 6/1994 | Burt et al. |
| 5,327,125 A | 7/1994 | Iwase et al. |
| 5,463,464 A | 10/1995 | Ladewski |
| 5,475,422 A | 12/1995 | Suzuki et al. |
| 5,488,674 A | 1/1996 | Burt et al. |
| 5,517,236 A | 5/1996 | Sergeant et al. |
| 5,629,524 A | 5/1997 | Stettner et al. |
| 5,638,461 A | 6/1997 | Fridge |
| 5,675,377 A | 10/1997 | Gibas et al. |
| 5,703,961 A | 12/1997 | Rogina et al. |
| 5,710,875 A | 1/1998 | Hsu et al. |
| 5,757,425 A | 5/1998 | Barton et al. |
| 5,793,900 A | 8/1998 | Nourbakhsh et al. |
| 5,801,919 A | 9/1998 | Griencewic |
| 5,808,350 A | 9/1998 | Jack et al. |
| 5,832,312 A | 11/1998 | Rieger et al. |
| 5,833,507 A | 11/1998 | Woodgate et al. |
| 5,880,691 A | 3/1999 | Fossum et al. |
| 5,911,008 A | 6/1999 | Niikura et al. |
| 5,933,190 A | 8/1999 | Dierickx et al. |
| 5,963,664 A | 10/1999 | Kumar et al. |
| 5,973,844 A | 10/1999 | Burger |
| 6,002,743 A | 12/1999 | Telymonde |
| 6,005,607 A | 12/1999 | Uomori et al. |
| 6,034,690 A | 3/2000 | Gallery et al. |
| 6,069,351 A | 5/2000 | Mack |
| 6,069,365 A | 5/2000 | Chow et al. |
| 6,084,979 A | 7/2000 | Kanade et al. |
| 6,095,989 A | 8/2000 | Hay et al. |
| 6,097,394 A | 8/2000 | Levoy et al. |
| 6,124,974 A | 9/2000 | Burger |
| 6,130,786 A | 10/2000 | Osawa et al. |
| 6,137,100 A | 10/2000 | Fossum et al. |
| 6,137,535 A | 10/2000 | Meyers |
| 6,141,048 A | 10/2000 | Meyers |
| 6,160,909 A | 12/2000 | Melen |
| 6,163,414 A | 12/2000 | Kikuchi et al. |
| 6,172,352 B1 | 1/2001 | Liu |
| 6,175,379 B1 | 1/2001 | Uomori et al. |
| 6,185,529 B1 | 2/2001 | Chen et al. |
| 6,198,852 B1 | 3/2001 | Anandan et al. |
| 6,205,241 B1 | 3/2001 | Melen |
| 6,239,909 B1 | 5/2001 | Hayashi et al. |
| 6,292,713 B1 | 9/2001 | Jouppi et al. |
| 6,340,994 B1 | 1/2002 | Margulis et al. |
| 6,358,862 B1 | 3/2002 | Ireland et al. |
| 6,373,518 B1 | 4/2002 | Sogawa |
| 6,419,638 B1 | 7/2002 | Hay et al. |
| 6,443,579 B1 | 9/2002 | Myers |
| 6,445,815 B1 | 9/2002 | Sato |
| 6,476,805 B1 | 11/2002 | Shum et al. |
| 6,477,260 B1 | 11/2002 | Shimomura |
| 6,502,097 B1 | 12/2002 | Chan et al. |
| 6,525,302 B2 | 2/2003 | Dowski, Jr. et al. |
| 6,546,153 B1 | 4/2003 | Hoydal |
| 6,552,742 B1 | 4/2003 | Seta |
| 6,563,537 B1 | 5/2003 | Kawamura et al. |
| 6,571,466 B1 | 6/2003 | Glenn et al. |
| 6,603,513 B1 | 8/2003 | Berezin |
| 6,611,289 B1 | 8/2003 | Yu et al. |
| 6,627,896 B1 | 9/2003 | Hashimoto et al. |
| 6,628,330 B1 | 9/2003 | Lin |
| 6,628,845 B1 | 9/2003 | Stone et al. |
| 6,635,941 B2 | 10/2003 | Suda |
| 6,639,596 B1 | 10/2003 | Shum et al. |
| 6,647,142 B1 | 11/2003 | Beardsley |
| 6,657,218 B2 | 12/2003 | Noda |
| 6,671,399 B1 | 12/2003 | Berestov |
| 6,674,892 B1 | 1/2004 | Melen |
| 6,750,488 B1 | 6/2004 | Driescher et al. |
| 6,750,904 B1 | 6/2004 | Lambert |
| 6,765,617 B1 | 7/2004 | Tangen et al. |
| 6,771,833 B1 | 8/2004 | Edgar |
| 6,774,941 B1 | 8/2004 | Boisvert et al. |
| 6,788,338 B1 | 9/2004 | Dinev et al. |
| 6,795,253 B2 | 9/2004 | Shinohara |
| 6,801,653 B1 | 10/2004 | Wu et al. |
| 6,819,328 B1 | 11/2004 | Moriwaki et al. |
| 6,819,358 B1 | 11/2004 | Kagle et al. |
| 6,833,863 B1 | 12/2004 | Clemens |
| 6,879,735 B1 | 4/2005 | Portniaguine et al. |
| 6,897,454 B2 | 5/2005 | Sasaki et al. |
| 6,903,770 B1 | 6/2005 | Kobayashi et al. |
| 6,909,121 B2 | 6/2005 | Nishikawa |
| 6,917,702 B2 | 7/2005 | Beardsley |
| 6,927,922 B2 | 8/2005 | George et al. |
| 6,958,862 B1 | 10/2005 | Joseph |
| 6,985,175 B2 | 1/2006 | Iwai et al. |
| 7,013,318 B2 | 3/2006 | Rosengard et al. |
| 7,015,954 B1 | 3/2006 | Foote et al. |
| 7,085,409 B2 | 8/2006 | Sawhney et al. |
| 7,161,614 B1 | 1/2007 | Yamashita et al. |
| 7,199,348 B2 | 4/2007 | Olsen et al. |
| 7,206,449 B2 | 4/2007 | Raskar et al. |
| 7,215,364 B2 | 5/2007 | Wachtel et al. |
| 7,235,785 B2 | 6/2007 | Hornback et al. |
| 7,245,761 B2 | 7/2007 | Swaminathan et al. |
| 7,262,799 B2 | 8/2007 | Suda |
| 7,292,735 B2 | 11/2007 | Blake et al. |
| 7,295,697 B1 | 11/2007 | Satoh |
| 7,333,651 B1 | 2/2008 | Kim et al. |
| 7,369,165 B2 | 5/2008 | Bosco et al. |
| 7,391,572 B2 | 6/2008 | Jacobowitz et al. |
| 7,408,725 B2 | 8/2008 | Sato |
| 7,425,984 B2 | 9/2008 | Chen et al. |
| 7,430,312 B2 | 9/2008 | Gu |
| 7,471,765 B2 | 12/2008 | Jaffray et al. |
| 7,496,293 B2 | 2/2009 | Shamir et al. |
| 7,564,019 B2 | 7/2009 | Olsen et al. |
| 7,599,547 B2 | 10/2009 | Sun et al. |
| 7,606,484 B1 | 10/2009 | Richards et al. |
| 7,620,265 B1 | 11/2009 | Wolff et al. |
| 7,633,511 B2 | 12/2009 | Shum et al. |
| 7,639,435 B2 | 12/2009 | Chiang |
| 7,639,838 B2 | 12/2009 | Nims |
| 7,646,549 B2 | 1/2010 | Zalevsky et al. |
| 7,657,090 B2 | 2/2010 | Omatsu et al. |
| 7,667,824 B1 | 2/2010 | Moran |
| 7,675,080 B2 | 3/2010 | Boettiger |
| 7,675,681 B2 | 3/2010 | Tomikawa et al. |

(56) References Cited

U.S. PATENT DOCUMENTS

| | | |
|---|---|---|
| 7,706,634 B2 | 4/2010 | Schmitt et al. |
| 7,723,662 B2 | 5/2010 | Levoy et al. |
| 7,738,013 B2 | 6/2010 | Galambos et al. |
| 7,741,620 B2 | 6/2010 | Doering et al. |
| 7,782,364 B2 | 8/2010 | Smith |
| 7,826,153 B2 | 11/2010 | Hong |
| 7,840,067 B2 | 11/2010 | Shen et al. |
| 7,912,673 B2 | 3/2011 | Hébert et al. |
| 7,924,321 B2 | 4/2011 | Nayar et al. |
| 7,956,871 B2 | 6/2011 | Fainstain et al. |
| 7,965,314 B1 | 6/2011 | Miller et al. |
| 7,973,834 B2 | 7/2011 | Yang |
| 7,986,018 B2 | 7/2011 | Rennie |
| 7,990,447 B2 | 8/2011 | Honda et al. |
| 8,000,498 B2 | 8/2011 | Shih et al. |
| 8,013,904 B2 | 9/2011 | Tan et al. |
| 8,027,531 B2 | 9/2011 | Wilburn et al. |
| 8,044,994 B2 | 10/2011 | Vetro et al. |
| 8,055,466 B2 | 11/2011 | Bryll |
| 8,077,245 B2 | 12/2011 | Adamo et al. |
| 8,089,515 B2 | 1/2012 | Chebil et al. |
| 8,098,297 B2 | 1/2012 | Crisan et al. |
| 8,098,304 B2 | 1/2012 | Pinto et al. |
| 8,106,949 B2 | 1/2012 | Tan et al. |
| 8,111,910 B2 | 2/2012 | Tanaka |
| 8,126,279 B2 | 2/2012 | Marcellin et al. |
| 8,130,120 B2 | 3/2012 | Kawabata et al. |
| 8,131,097 B2 | 3/2012 | Lelescu et al. |
| 8,149,323 B2 | 4/2012 | Li et al. |
| 8,164,629 B1 | 4/2012 | Zhang |
| 8,169,486 B2 | 5/2012 | Corcoran et al. |
| 8,180,145 B2 | 5/2012 | Wu et al. |
| 8,189,065 B2 | 5/2012 | Georgiev et al. |
| 8,189,089 B1 | 5/2012 | Georgiev et al. |
| 8,194,296 B2 | 6/2012 | Compton et al. |
| 8,212,914 B2 | 7/2012 | Chiu |
| 8,213,711 B2 | 7/2012 | Tam |
| 8,231,814 B2 | 7/2012 | Duparre |
| 8,242,426 B2 | 8/2012 | Ward et al. |
| 8,244,027 B2 | 8/2012 | Takahashi |
| 8,244,058 B1 | 8/2012 | Intwala et al. |
| 8,254,668 B2 | 8/2012 | Mashitani et al. |
| 8,279,325 B2 | 10/2012 | Pitts et al. |
| 8,280,194 B2 | 10/2012 | Wong et al. |
| 8,284,240 B2 | 10/2012 | Saint-Pierre et al. |
| 8,289,409 B2 | 10/2012 | Chang |
| 8,289,440 B2 | 10/2012 | Pitts et al. |
| 8,290,358 B1 | 10/2012 | Georgiev |
| 8,294,099 B2 | 10/2012 | Blackwell, Jr. |
| 8,294,754 B2 | 10/2012 | Jung et al. |
| 8,300,085 B2 | 10/2012 | Yang et al. |
| 8,305,456 B1 | 11/2012 | McMahon |
| 8,315,476 B1 | 11/2012 | Georgiev et al. |
| 8,345,144 B1 | 1/2013 | Georgiev et al. |
| 8,360,574 B2 | 1/2013 | Ishak et al. |
| 8,400,555 B1 | 3/2013 | Georgiev et al. |
| 8,406,562 B2 | 3/2013 | Bassi et al. |
| 8,411,146 B2 | 4/2013 | Twede |
| 8,416,282 B2 | 4/2013 | Lablans |
| 8,446,492 B2 | 5/2013 | Nakano et al. |
| 8,456,517 B2 | 6/2013 | Spektor et al. |
| 8,493,496 B2 | 7/2013 | Freedman et al. |
| 8,514,291 B2 | 8/2013 | Chang |
| 8,514,491 B2 | 8/2013 | Duparre |
| 8,541,730 B2 | 9/2013 | Inuiya |
| 8,542,933 B2 | 9/2013 | Venkataraman et al. |
| 8,553,093 B2 | 10/2013 | Wong et al. |
| 8,558,929 B2 | 10/2013 | Tredwell |
| 8,559,705 B2 | 10/2013 | Ng |
| 8,559,756 B2 | 10/2013 | Georgiev et al. |
| 8,565,547 B2 | 10/2013 | Strandemar |
| 8,576,302 B2 | 11/2013 | Yoshikawa |
| 8,577,183 B2 | 11/2013 | Robinson |
| 8,581,995 B2 | 11/2013 | Lin et al. |
| 8,619,082 B1 | 12/2013 | Ciurea et al. |
| 8,648,918 B2 | 2/2014 | Kauker et al. |
| 8,648,919 B2 | 2/2014 | Mantzel et al. |
| 8,655,052 B2 | 2/2014 | Spooner et al. |
| 8,682,107 B2 | 3/2014 | Yoon et al. |
| 8,687,087 B2 | 4/2014 | Pertsel et al. |
| 8,692,893 B2 | 4/2014 | McMahon |
| 8,754,941 B1 | 6/2014 | Sarwari et al. |
| 8,773,536 B1 | 7/2014 | Zhang |
| 8,780,113 B1 | 7/2014 | Ciurea et al. |
| 8,787,691 B2 | 7/2014 | Takahashi et al. |
| 8,792,710 B2 | 7/2014 | Keselman |
| 8,804,255 B2 | 8/2014 | Duparre |
| 8,823,813 B2 | 9/2014 | Mantzel et al. |
| 8,830,375 B2 | 9/2014 | Ludwig |
| 8,831,367 B2 | 9/2014 | Venkataraman et al. |
| 8,831,377 B2 | 9/2014 | Pitts et al. |
| 8,836,793 B1 | 9/2014 | Kriesel et al. |
| 8,842,201 B2 | 9/2014 | Tajiri |
| 8,854,433 B1 | 10/2014 | Rafii |
| 8,854,462 B2 | 10/2014 | Herbin et al. |
| 8,861,089 B2 | 10/2014 | Duparre |
| 8,866,912 B2 | 10/2014 | Mullis |
| 8,866,920 B2 | 10/2014 | Venkataraman et al. |
| 8,866,951 B2 | 10/2014 | Keelan |
| 8,878,950 B2 | 11/2014 | Lelescu et al. |
| 8,885,059 B1 | 11/2014 | Venkataraman et al. |
| 8,885,922 B2 | 11/2014 | Ito et al. |
| 8,896,594 B2 | 11/2014 | Xiong et al. |
| 8,896,719 B1 | 11/2014 | Venkataraman et al. |
| 8,902,321 B2 | 12/2014 | Venkataraman et al. |
| 8,928,793 B2 | 1/2015 | McMahon |
| 8,977,038 B2 | 3/2015 | Tian et al. |
| 9,001,226 B1 | 4/2015 | Ng et al. |
| 9,019,426 B2 | 4/2015 | Han et al. |
| 9,025,894 B2 | 5/2015 | Venkataraman et al. |
| 9,025,895 B2 | 5/2015 | Venkataraman et al. |
| 9,030,528 B2 | 5/2015 | Pesach et al. |
| 9,031,335 B2 | 5/2015 | Venkataraman et al. |
| 9,031,342 B2 | 5/2015 | Venkataraman |
| 9,031,343 B2 | 5/2015 | Venkataraman |
| 9,036,928 B2 | 5/2015 | Venkataraman |
| 9,036,931 B2 | 5/2015 | Venkataraman et al. |
| 9,041,823 B2 | 5/2015 | Venkataraman et al. |
| 9,041,824 B2 | 5/2015 | Lelescu et al. |
| 9,041,829 B2 | 5/2015 | Venkataraman et al. |
| 9,042,667 B2 | 5/2015 | Venkataraman et al. |
| 9,047,684 B2 | 6/2015 | Lelescu et al. |
| 9,049,367 B2 | 6/2015 | Venkataraman et al. |
| 9,055,233 B2 | 6/2015 | Venkataraman et al. |
| 9,060,120 B2 | 6/2015 | Venkataraman et al. |
| 9,060,124 B2 | 6/2015 | Venkataraman et al. |
| 9,077,893 B2 | 7/2015 | Venkataraman et al. |
| 9,094,661 B2 | 7/2015 | Venkataraman et al. |
| 9,100,586 B2 | 8/2015 | McMahon et al. |
| 9,100,635 B2 | 8/2015 | Duparre et al. |
| 9,123,117 B2 | 9/2015 | Ciurea et al. |
| 9,123,118 B2 | 9/2015 | Ciurea et al. |
| 9,124,815 B2 | 9/2015 | Venkataraman et al. |
| 9,124,831 B2 | 9/2015 | Mullis |
| 9,124,864 B2 | 9/2015 | Mullis |
| 9,128,228 B2 | 9/2015 | Duparre |
| 9,129,183 B2 | 9/2015 | Venkataraman et al. |
| 9,129,377 B2 | 9/2015 | Ciurea et al. |
| 9,143,711 B2 | 9/2015 | McMahon |
| 9,147,254 B2 | 9/2015 | Florian et al. |
| 9,185,276 B2 | 11/2015 | Rodda et al. |
| 9,188,765 B2 | 11/2015 | Venkataraman et al. |
| 9,191,580 B2 | 11/2015 | Venkataraman et al. |
| 9,197,821 B2 | 11/2015 | McMahon |
| 9,210,392 B2 | 12/2015 | Nisenzon et al. |
| 9,214,013 B2 | 12/2015 | Venkataraman et al. |
| 9,235,898 B2 | 1/2016 | Venkataraman et al. |
| 9,235,900 B2 | 1/2016 | Ciurea et al. |
| 9,240,049 B2 | 1/2016 | Ciurea et al. |
| 9,247,117 B2 | 1/2016 | Jacques |
| 9,253,380 B2 | 2/2016 | Venkataraman et al. |
| 9,253,397 B2 | 2/2016 | Lee et al. |
| 9,256,974 B1 | 2/2016 | Hines |
| 9,264,592 B2 | 2/2016 | Rodda et al. |

(56) References Cited

U.S. PATENT DOCUMENTS

| | | |
|---|---|---|
| 9,264,610 B2 | 2/2016 | Duparre |
| 9,361,662 B2 | 6/2016 | Lelescu et al. |
| 9,374,512 B2 | 6/2016 | Venkataraman et al. |
| 9,412,206 B2 | 8/2016 | McMahon et al. |
| 9,413,953 B2 | 8/2016 | Maeda |
| 9,426,343 B2 | 8/2016 | Rodda et al. |
| 9,426,361 B2 | 8/2016 | Venkataraman et al. |
| 9,438,888 B2 | 9/2016 | Venkataraman et al. |
| 9,445,003 B1 | 9/2016 | Lelescu et al. |
| 9,456,134 B2 | 9/2016 | Venkataraman et al. |
| 9,456,196 B2 | 9/2016 | Kim et al. |
| 9,462,164 B2 | 10/2016 | Venkataraman et al. |
| 9,485,496 B2 | 11/2016 | Venkataraman et al. |
| 9,497,370 B2 | 11/2016 | Venkataraman et al. |
| 9,497,429 B2 | 11/2016 | Mullis et al. |
| 9,516,222 B2 | 12/2016 | Duparre et al. |
| 9,519,972 B2 | 12/2016 | Venkataraman et al. |
| 9,521,319 B2 | 12/2016 | Rodda et al. |
| 9,521,416 B1 | 12/2016 | McMahon et al. |
| 9,536,166 B2 | 1/2017 | Venkataraman et al. |
| 9,576,369 B2 | 2/2017 | Venkataraman et al. |
| 9,578,237 B2 | 2/2017 | Duparre et al. |
| 9,578,259 B2 | 2/2017 | Molina |
| 9,602,805 B2 | 3/2017 | Venkataraman et al. |
| 9,633,442 B2 | 4/2017 | Venkataraman et al. |
| 9,635,274 B2 | 4/2017 | Lin et al. |
| 9,638,883 B1 | 5/2017 | Duparre |
| 9,661,310 B2 | 5/2017 | Deng et al. |
| 9,706,132 B2 | 7/2017 | Nisenzon et al. |
| 9,712,759 B2 | 7/2017 | Venkataraman et al. |
| 9,729,865 B1 | 8/2017 | Kuo et al. |
| 9,733,486 B2 | 8/2017 | Lelescu et al. |
| 9,741,118 B2 | 8/2017 | Mullis |
| 9,743,051 B2 | 8/2017 | Venkataraman et al. |
| 9,749,547 B2 | 8/2017 | Venkataraman et al. |
| 9,749,568 B2 | 8/2017 | McMahon |
| 9,754,422 B2 | 9/2017 | McMahon et al. |
| 9,766,380 B2 | 9/2017 | Duparre et al. |
| 9,769,365 B1 | 9/2017 | Jannard |
| 9,774,789 B2 | 9/2017 | Ciurea et al. |
| 9,774,831 B2 | 9/2017 | Venkataraman et al. |
| 9,787,911 B2 | 10/2017 | McMahon et al. |
| 9,794,476 B2 | 10/2017 | Nayar et al. |
| 9,800,856 B2 | 10/2017 | Venkataraman et al. |
| 9,800,859 B2 | 10/2017 | Venkataraman et al. |
| 9,807,382 B2 | 10/2017 | Duparre et al. |
| 9,811,753 B2 | 11/2017 | Venkataraman et al. |
| 9,813,616 B2 | 11/2017 | Lelescu et al. |
| 9,813,617 B2 | 11/2017 | Venkataraman et al. |
| 9,826,212 B2 | 11/2017 | Newton et al. |
| 9,858,673 B2 | 1/2018 | Ciurea et al. |
| 9,864,921 B2 | 1/2018 | Venkataraman et al. |
| 9,866,739 B2 | 1/2018 | McMahon |
| 9,888,194 B2 | 2/2018 | Duparre |
| 9,892,522 B2 | 2/2018 | Smirnov et al. |
| 9,898,856 B2 | 2/2018 | Yang et al. |
| 9,917,998 B2 | 3/2018 | Venkataraman et al. |
| 9,924,092 B2 | 3/2018 | Rodda et al. |
| 9,936,148 B2 | 4/2018 | McMahon |
| 9,942,474 B2 | 4/2018 | Venkataraman et al. |
| 9,955,070 B2 | 4/2018 | Lelescu et al. |
| 9,986,224 B2 | 5/2018 | Mullis |
| 10,009,538 B2 | 6/2018 | Venkataraman et al. |
| 10,019,816 B2 | 7/2018 | Venkataraman et al. |
| 10,027,901 B2 | 7/2018 | Venkataraman et al. |
| 10,089,740 B2 | 10/2018 | Srikanth et al. |
| 10,091,405 B2 | 10/2018 | Molina |
| 10,119,808 B2 | 11/2018 | Venkataraman et al. |
| 10,122,993 B2 | 11/2018 | Venkataraman et al. |
| 10,127,682 B2 | 11/2018 | Mullis |
| 10,142,560 B2 | 11/2018 | Venkataraman et al. |
| 10,182,216 B2 | 1/2019 | Mullis et al. |
| 10,218,889 B2 | 2/2019 | McMahan |
| 10,225,543 B2 | 3/2019 | Mullis |
| 10,250,871 B2 | 4/2019 | Ciurea et al. |
| 10,261,219 B2 | 4/2019 | Duparre et al. |
| 10,275,676 B2 | 4/2019 | Venkataraman et al. |
| 10,306,120 B2 | 5/2019 | Duparre |
| 10,311,649 B2 | 6/2019 | McMohan et al. |
| 10,334,241 B2 | 6/2019 | Duparre et al. |
| 10,366,472 B2 | 7/2019 | Lelescu et al. |
| 10,375,302 B2 | 8/2019 | Nayar et al. |
| 10,375,319 B2 | 8/2019 | Venkataraman et al. |
| 10,380,752 B2 | 8/2019 | Ciurea et al. |
| 10,390,005 B2 | 8/2019 | Nisenzon et al. |
| 10,412,314 B2 | 9/2019 | McMahon et al. |
| 10,430,682 B2 | 10/2019 | Venkataraman et al. |
| 10,455,168 B2 | 10/2019 | McMahon |
| 10,455,218 B2 | 10/2019 | Venkataraman et al. |
| 10,462,362 B2 | 10/2019 | Lelescu et al. |
| 10,482,618 B2 | 11/2019 | Jain et al. |
| 10,489,683 B1* | 11/2019 | Koh ............... G06V 10/7715 |
| 10,540,806 B2 | 1/2020 | Yang et al. |
| 10,542,208 B2 | 1/2020 | Lelescu et al. |
| 10,547,772 B2 | 1/2020 | Molina |
| 10,560,684 B2 | 2/2020 | Mullis |
| 10,574,905 B2 | 2/2020 | Srikanth et al. |
| 10,621,779 B1* | 4/2020 | Topiwala ............... G06V 20/20 |
| 10,638,099 B2 | 4/2020 | Mullis et al. |
| 10,643,383 B2 | 5/2020 | Venkataraman |
| 10,674,138 B2 | 6/2020 | Venkataraman et al. |
| 10,679,046 B1* | 6/2020 | Black ................. G06V 40/23 |
| 10,694,114 B2 | 6/2020 | Venkataraman et al. |
| 10,708,492 B2 | 7/2020 | Venkataraman et al. |
| 10,735,635 B2 | 8/2020 | Duparre |
| 10,742,861 B2 | 8/2020 | McMahon |
| 10,767,981 B2 | 9/2020 | Venkataraman et al. |
| 10,805,589 B2 | 10/2020 | Venkataraman et al. |
| 10,818,026 B2 | 10/2020 | Jain et al. |
| 10,839,485 B2 | 11/2020 | Lelescu et al. |
| 10,909,707 B2 | 2/2021 | Ciurea et al. |
| 10,944,961 B2 | 3/2021 | Ciurea et al. |
| 10,958,892 B2 | 3/2021 | Mullis |
| 10,984,276 B2 | 4/2021 | Venkataraman et al. |
| 11,022,725 B2 | 6/2021 | Duparre et al. |
| 11,024,046 B2 | 6/2021 | Venkataraman |
| 12,138,805 B2* | 11/2024 | Sundermeyer ......... B25J 9/1669 |
| 12,190,536 B2* | 1/2025 | Kuss ................. G06F 18/2148 |
| 2001/0005225 A1 | 6/2001 | Clark et al. |
| 2001/0019621 A1 | 9/2001 | Hanna et al. |
| 2001/0028038 A1 | 10/2001 | Hamaguchi et al. |
| 2001/0038387 A1 | 11/2001 | Tomooka et al. |
| 2002/0003669 A1 | 1/2002 | Kedar et al. |
| 2002/0012056 A1 | 1/2002 | Trevino et al. |
| 2002/0015536 A1 | 2/2002 | Warren et al. |
| 2002/0027608 A1 | 3/2002 | Johnson et al. |
| 2002/0028014 A1 | 3/2002 | Ono |
| 2002/0039438 A1 | 4/2002 | Mori et al. |
| 2002/0057845 A1 | 5/2002 | Fossum et al. |
| 2002/0061131 A1 | 5/2002 | Sawhney et al. |
| 2002/0063807 A1 | 5/2002 | Margulis |
| 2002/0075450 A1 | 6/2002 | Aratani et al. |
| 2002/0087403 A1 | 7/2002 | Meyers et al. |
| 2002/0089596 A1 | 7/2002 | Yasuo |
| 2002/0094027 A1 | 7/2002 | Sato et al. |
| 2002/0101528 A1 | 8/2002 | Lee et al. |
| 2002/0113867 A1 | 8/2002 | Takigawa et al. |
| 2002/0113888 A1 | 8/2002 | Sonoda et al. |
| 2002/0118113 A1 | 8/2002 | Oku et al. |
| 2002/0120634 A1 | 8/2002 | Min et al. |
| 2002/0122113 A1 | 9/2002 | Foote |
| 2002/0163054 A1 | 11/2002 | Suda |
| 2002/0167537 A1 | 11/2002 | Trajkovic |
| 2002/0171666 A1 | 11/2002 | Endo et al. |
| 2002/0177054 A1 | 11/2002 | Saitoh et al. |
| 2002/0190991 A1 | 12/2002 | Efran et al. |
| 2002/0195548 A1 | 12/2002 | Dowski, Jr. et al. |
| 2003/0025227 A1 | 2/2003 | Daniell |
| 2003/0026474 A1 | 2/2003 | Yano |
| 2003/0086079 A1 | 5/2003 | Barth et al. |
| 2003/0124763 A1 | 7/2003 | Fan et al. |
| 2003/0140347 A1 | 7/2003 | Varsa |
| 2003/0156189 A1 | 8/2003 | Utsumi et al. |
| 2003/0179418 A1 | 9/2003 | Wengender et al. |

(56) References Cited

U.S. PATENT DOCUMENTS

| | | |
|---|---|---|
| 2003/0188659 A1 | 10/2003 | Merry et al. |
| 2003/0190072 A1 | 10/2003 | Adkins et al. |
| 2003/0198377 A1 | 10/2003 | Ng |
| 2003/0211405 A1 | 11/2003 | Venkataraman |
| 2003/0231179 A1 | 12/2003 | Suzuki |
| 2004/0003409 A1 | 1/2004 | Berstis |
| 2004/0008271 A1 | 1/2004 | Hagimori et al. |
| 2004/0012689 A1 | 1/2004 | Tinnerino et al. |
| 2004/0027358 A1 | 2/2004 | Nakao |
| 2004/0047274 A1 | 3/2004 | Amanai |
| 2004/0050104 A1 | 3/2004 | Ghosh et al. |
| 2004/0056966 A1 | 3/2004 | Schechner et al. |
| 2004/0061787 A1 | 4/2004 | Liu et al. |
| 2004/0066454 A1 | 4/2004 | Otani et al. |
| 2004/0071367 A1 | 4/2004 | Irani et al. |
| 2004/0075654 A1 | 4/2004 | Hsiao et al. |
| 2004/0096119 A1 | 5/2004 | Williams et al. |
| 2004/0100570 A1 | 5/2004 | Shizukuishi |
| 2004/0105021 A1 | 6/2004 | Hu |
| 2004/0114807 A1 | 6/2004 | Lelescu et al. |
| 2004/0141659 A1 | 7/2004 | Zhang |
| 2004/0151401 A1 | 8/2004 | Sawhney et al. |
| 2004/0165090 A1 | 8/2004 | Ning |
| 2004/0169617 A1 | 9/2004 | Yelton et al. |
| 2004/0170340 A1 | 9/2004 | Tipping et al. |
| 2004/0174439 A1 | 9/2004 | Upton |
| 2004/0179008 A1 | 9/2004 | Gordon et al. |
| 2004/0179834 A1 | 9/2004 | Szajewski et al. |
| 2004/0196379 A1 | 10/2004 | Chen et al. |
| 2004/0207600 A1 | 10/2004 | Zhang et al. |
| 2004/0207836 A1 | 10/2004 | Chhibber et al. |
| 2004/0212734 A1 | 10/2004 | Macinnis et al. |
| 2004/0213449 A1 | 10/2004 | Safaee-Rad et al. |
| 2004/0218809 A1 | 11/2004 | Blake et al. |
| 2004/0234873 A1 | 11/2004 | Venkataraman |
| 2004/0239782 A1 | 12/2004 | Equitz et al. |
| 2004/0239885 A1 | 12/2004 | Jaynes et al. |
| 2004/0240052 A1 | 12/2004 | Minefuji et al. |
| 2004/0251509 A1 | 12/2004 | Choi |
| 2004/0264806 A1 | 12/2004 | Herley |
| 2005/0006477 A1 | 1/2005 | Patel |
| 2005/0007461 A1 | 1/2005 | Chou et al. |
| 2005/0009313 A1 | 1/2005 | Suzuki et al. |
| 2005/0010621 A1 | 1/2005 | Pinto et al. |
| 2005/0012035 A1 | 1/2005 | Miller |
| 2005/0036778 A1 | 2/2005 | DeMonte |
| 2005/0047678 A1 | 3/2005 | Jones et al. |
| 2005/0048690 A1 | 3/2005 | Yamamoto |
| 2005/0068436 A1 | 3/2005 | Fraenkel et al. |
| 2005/0083531 A1 | 4/2005 | Millerd et al. |
| 2005/0084179 A1 | 4/2005 | Hanna et al. |
| 2005/0111705 A1 | 5/2005 | Waupotitsch et al. |
| 2005/0117015 A1 | 6/2005 | Cutler |
| 2005/0128509 A1 | 6/2005 | Tokkonen et al. |
| 2005/0128595 A1 | 6/2005 | Shimizu |
| 2005/0132098 A1 | 6/2005 | Sonoda et al. |
| 2005/0134698 A1 | 6/2005 | Schroeder et al. |
| 2005/0134699 A1 | 6/2005 | Nagashima |
| 2005/0134712 A1 | 6/2005 | Gruhlke et al. |
| 2005/0147277 A1 | 7/2005 | Higaki et al. |
| 2005/0151759 A1 | 7/2005 | Gonzalez-Banos et al. |
| 2005/0168924 A1 | 8/2005 | Wu et al. |
| 2005/0175257 A1 | 8/2005 | Kuroki |
| 2005/0185711 A1 | 8/2005 | Pfister et al. |
| 2005/0203380 A1 | 9/2005 | Sauer et al. |
| 2005/0205785 A1 | 9/2005 | Hornback et al. |
| 2005/0219264 A1 | 10/2005 | Shum et al. |
| 2005/0219363 A1 | 10/2005 | Kohler et al. |
| 2005/0224843 A1 | 10/2005 | Boemler |
| 2005/0225654 A1 | 10/2005 | Feldman et al. |
| 2005/0265633 A1 | 12/2005 | Piacentino et al. |
| 2005/0275946 A1 | 12/2005 | Choo et al. |
| 2005/0286612 A1 | 12/2005 | Takanashi |
| 2005/0286756 A1 | 12/2005 | Hong et al. |
| 2006/0002635 A1 | 1/2006 | Nestares et al. |
| 2006/0007331 A1 | 1/2006 | Izumi et al. |
| 2006/0013318 A1 | 1/2006 | Webb et al. |
| 2006/0018509 A1 | 1/2006 | Miyoshi |
| 2006/0023197 A1 | 2/2006 | Joel |
| 2006/0023314 A1 | 2/2006 | Boettiger et al. |
| 2006/0028476 A1 | 2/2006 | Sobel et al. |
| 2006/0029270 A1 | 2/2006 | Berestov et al. |
| 2006/0029271 A1 | 2/2006 | Miyoshi et al. |
| 2006/0033005 A1 | 2/2006 | Jerdev et al. |
| 2006/0034003 A1 | 2/2006 | Zalevsky |
| 2006/0034531 A1 | 2/2006 | Poon et al. |
| 2006/0035415 A1 | 2/2006 | Wood |
| 2006/0038891 A1 | 2/2006 | Okutomi et al. |
| 2006/0039611 A1 | 2/2006 | Rother et al. |
| 2006/0046204 A1 | 3/2006 | Ono et al. |
| 2006/0049930 A1 | 3/2006 | Zruya et al. |
| 2006/0050980 A1 | 3/2006 | Kohashi et al. |
| 2006/0054780 A1 | 3/2006 | Garrood et al. |
| 2006/0054782 A1 | 3/2006 | Olsen et al. |
| 2006/0055811 A1 | 3/2006 | Frtiz et al. |
| 2006/0069478 A1 | 3/2006 | Iwama |
| 2006/0072029 A1 | 4/2006 | Miyatake et al. |
| 2006/0087747 A1 | 4/2006 | Ohzawa et al. |
| 2006/0098888 A1 | 5/2006 | Morishita |
| 2006/0103754 A1 | 5/2006 | Wenstrand et al. |
| 2006/0119597 A1 | 6/2006 | Oshino |
| 2006/0125936 A1 | 6/2006 | Gruhlke et al. |
| 2006/0138322 A1 | 6/2006 | Costello et al. |
| 2006/0139475 A1 | 6/2006 | Esch et al. |
| 2006/0152803 A1 | 7/2006 | Provitola |
| 2006/0153290 A1 | 7/2006 | Watabe et al. |
| 2006/0157640 A1 | 7/2006 | Perlman et al. |
| 2006/0159369 A1 | 7/2006 | Young |
| 2006/0176566 A1 | 8/2006 | Boettiger et al. |
| 2006/0187322 A1 | 8/2006 | Janson, Jr. et al. |
| 2006/0187338 A1 | 8/2006 | May et al. |
| 2006/0197937 A1 | 9/2006 | Bamji et al. |
| 2006/0203100 A1 | 9/2006 | Ajito et al. |
| 2006/0203113 A1 | 9/2006 | Wada et al. |
| 2006/0210146 A1 | 9/2006 | Gu |
| 2006/0210186 A1 | 9/2006 | Berkner |
| 2006/0214085 A1 | 9/2006 | Olsen et al. |
| 2006/0215924 A1 | 9/2006 | Steinberg et al. |
| 2006/0221250 A1 | 10/2006 | Rossbach et al. |
| 2006/0239549 A1 | 10/2006 | Kelly et al. |
| 2006/0243889 A1 | 11/2006 | Farnworth et al. |
| 2006/0251410 A1 | 11/2006 | Trutna |
| 2006/0274174 A1 | 12/2006 | Tewinkle |
| 2006/0278948 A1 | 12/2006 | Yamaguchi et al. |
| 2006/0279648 A1 | 12/2006 | Senba et al. |
| 2006/0289772 A1 | 12/2006 | Johnson et al. |
| 2007/0002159 A1 | 1/2007 | Olsen et al. |
| 2007/0008575 A1 | 1/2007 | Yu et al. |
| 2007/0009150 A1 | 1/2007 | Suwa |
| 2007/0024614 A1 | 2/2007 | Tam et al. |
| 2007/0030356 A1 | 2/2007 | Yea et al. |
| 2007/0035707 A1 | 2/2007 | Margulis |
| 2007/0036427 A1 | 2/2007 | Nakamura et al. |
| 2007/0040828 A1 | 2/2007 | Zalevsky et al. |
| 2007/0040922 A1 | 2/2007 | McKee et al. |
| 2007/0041391 A1 | 2/2007 | Lin et al. |
| 2007/0052825 A1 | 3/2007 | Cho |
| 2007/0083114 A1 | 4/2007 | Yang et al. |
| 2007/0085917 A1 | 4/2007 | Kobayashi |
| 2007/0092245 A1 | 4/2007 | Bazakos et al. |
| 2007/0102622 A1 | 5/2007 | Olsen et al. |
| 2007/0116447 A1 | 5/2007 | Ye |
| 2007/0126898 A1 | 6/2007 | Feldman et al. |
| 2007/0127831 A1 | 6/2007 | Venkataraman |
| 2007/0139333 A1 | 6/2007 | Sato et al. |
| 2007/0140685 A1 | 6/2007 | Wu |
| 2007/0146503 A1 | 6/2007 | Shiraki |
| 2007/0146511 A1 | 6/2007 | Kinoshita et al. |
| 2007/0153335 A1 | 7/2007 | Hosaka |
| 2007/0158427 A1 | 7/2007 | Zhu et al. |
| 2007/0159541 A1 | 7/2007 | Sparks et al. |
| 2007/0160310 A1 | 7/2007 | Tanida et al. |
| 2007/0165931 A1 | 7/2007 | Higaki |
| 2007/0166447 A1 | 7/2007 | Ur-Rehman et al. |

(56) References Cited

U.S. PATENT DOCUMENTS

| | | |
|---|---|---|
| 2007/0171290 A1 | 7/2007 | Kroger |
| 2007/0177004 A1 | 8/2007 | Kolehmainen et al. |
| 2007/0182843 A1 | 8/2007 | Shimamura et al. |
| 2007/0201859 A1 | 8/2007 | Sarrat |
| 2007/0206241 A1 | 9/2007 | Smith et al. |
| 2007/0211164 A1 | 9/2007 | Olsen et al. |
| 2007/0216765 A1 | 9/2007 | Wong et al. |
| 2007/0225600 A1 | 9/2007 | Weibrecht et al. |
| 2007/0228256 A1 | 10/2007 | Mentzer et al. |
| 2007/0236595 A1 | 10/2007 | Pan et al. |
| 2007/0242141 A1 | 10/2007 | Ciurea |
| 2007/0247517 A1 | 10/2007 | Zhang et al. |
| 2007/0257184 A1 | 11/2007 | Olsen et al. |
| 2007/0258006 A1 | 11/2007 | Olsen et al. |
| 2007/0258706 A1 | 11/2007 | Raskar et al. |
| 2007/0263113 A1 | 11/2007 | Baek et al. |
| 2007/0263114 A1 | 11/2007 | Gurevich et al. |
| 2007/0268374 A1 | 11/2007 | Robinson |
| 2007/0291995 A1 | 12/2007 | Rivera |
| 2007/0296721 A1 | 12/2007 | Chang et al. |
| 2007/0296832 A1 | 12/2007 | Ota et al. |
| 2007/0296835 A1 | 12/2007 | Olsen et al. |
| 2007/0296846 A1 | 12/2007 | Barman et al. |
| 2007/0296847 A1 | 12/2007 | Chang et al. |
| 2007/0297696 A1 | 12/2007 | Hamza et al. |
| 2008/0006859 A1 | 1/2008 | Mionetto |
| 2008/0019611 A1 | 1/2008 | Larkin et al. |
| 2008/0024683 A1 | 1/2008 | Damera-Venkata et al. |
| 2008/0025649 A1 | 1/2008 | Liu et al. |
| 2008/0030592 A1 | 2/2008 | Border et al. |
| 2008/0030597 A1 | 2/2008 | Olsen et al. |
| 2008/0043095 A1 | 2/2008 | Vetro et al. |
| 2008/0043096 A1 | 2/2008 | Vetro et al. |
| 2008/0044170 A1 | 2/2008 | Yap et al. |
| 2008/0054518 A1 | 3/2008 | Ra et al. |
| 2008/0056302 A1 | 3/2008 | Erdal et al. |
| 2008/0062164 A1 | 3/2008 | Bassi et al. |
| 2008/0079805 A1 | 4/2008 | Takagi et al. |
| 2008/0080028 A1 | 4/2008 | Bakin et al. |
| 2008/0084486 A1 | 4/2008 | Enge et al. |
| 2008/0088793 A1 | 4/2008 | Sverdrup et al. |
| 2008/0095523 A1 | 4/2008 | Schilling-Benz et al. |
| 2008/0099804 A1 | 5/2008 | Venezia et al. |
| 2008/0106620 A1 | 5/2008 | Sawachi |
| 2008/0112059 A1 | 5/2008 | Choi et al. |
| 2008/0112635 A1 | 5/2008 | Kondo et al. |
| 2008/0117289 A1 | 5/2008 | Schowengerdt et al. |
| 2008/0118241 A1 | 5/2008 | TeKolste et al. |
| 2008/0131019 A1 | 6/2008 | Ng |
| 2008/0131107 A1 | 6/2008 | Ueno |
| 2008/0151097 A1 | 6/2008 | Chen et al. |
| 2008/0152213 A1 | 6/2008 | Medioni et al. |
| 2008/0152215 A1 | 6/2008 | Horie et al. |
| 2008/0152296 A1 | 6/2008 | Oh et al. |
| 2008/0156991 A1 | 7/2008 | Hu et al. |
| 2008/0158259 A1 | 7/2008 | Kempf et al. |
| 2008/0158375 A1 | 7/2008 | Kakkori et al. |
| 2008/0158698 A1 | 7/2008 | Chang et al. |
| 2008/0165257 A1 | 7/2008 | Boettiger |
| 2008/0174670 A1 | 7/2008 | Olsen et al. |
| 2008/0187305 A1 | 8/2008 | Raskar et al. |
| 2008/0193026 A1 | 8/2008 | Horie et al. |
| 2008/0208506 A1 | 8/2008 | Kuwata |
| 2008/0211737 A1 | 9/2008 | Kim et al. |
| 2008/0218610 A1 | 9/2008 | Chapman et al. |
| 2008/0218611 A1 | 9/2008 | Parulski et al. |
| 2008/0218612 A1 | 9/2008 | Border et al. |
| 2008/0218613 A1 | 9/2008 | Janson et al. |
| 2008/0219654 A1 | 9/2008 | Border et al. |
| 2008/0239116 A1 | 10/2008 | Smith |
| 2008/0240598 A1 | 10/2008 | Hasegawa |
| 2008/0246866 A1 | 10/2008 | Kinoshita et al. |
| 2008/0247638 A1 | 10/2008 | Tanida et al. |
| 2008/0247653 A1 | 10/2008 | Moussavi et al. |
| 2008/0272416 A1 | 11/2008 | Yun |
| 2008/0273751 A1 | 11/2008 | Yuan et al. |
| 2008/0278591 A1 | 11/2008 | Barna et al. |
| 2008/0278610 A1 | 11/2008 | Boettiger |
| 2008/0284880 A1 | 11/2008 | Numata |
| 2008/0291295 A1 | 11/2008 | Kato et al. |
| 2008/0298674 A1 | 12/2008 | Baker et al. |
| 2008/0310501 A1 | 12/2008 | Ward et al. |
| 2009/0027543 A1 | 1/2009 | Kanehiro |
| 2009/0050946 A1 | 2/2009 | Duparre et al. |
| 2009/0052743 A1 | 2/2009 | Techmer |
| 2009/0060281 A1 | 3/2009 | Tanida et al. |
| 2009/0066693 A1 | 3/2009 | Carson |
| 2009/0079862 A1 | 3/2009 | Subbotin |
| 2009/0086074 A1 | 4/2009 | Li et al. |
| 2009/0091645 A1 | 4/2009 | Trimeche et al. |
| 2009/0091806 A1 | 4/2009 | Inuiya |
| 2009/0092363 A1 | 4/2009 | Daum et al. |
| 2009/0096050 A1 | 4/2009 | Park |
| 2009/0102956 A1 | 4/2009 | Georgiev |
| 2009/0103792 A1 | 4/2009 | Rahn et al. |
| 2009/0109306 A1 | 4/2009 | Shan et al. |
| 2009/0127430 A1 | 5/2009 | Hirasawa et al. |
| 2009/0128644 A1 | 5/2009 | Camp, Jr. et al. |
| 2009/0128833 A1 | 5/2009 | Yahav |
| 2009/0129667 A1 | 5/2009 | Ho et al. |
| 2009/0140131 A1 | 6/2009 | Utagawa |
| 2009/0141933 A1 | 6/2009 | Wagg |
| 2009/0147919 A1 | 6/2009 | Goto et al. |
| 2009/0152664 A1 | 6/2009 | Klem et al. |
| 2009/0167922 A1 | 7/2009 | Perlman et al. |
| 2009/0167923 A1 | 7/2009 | Safaee-Rad et al. |
| 2009/0167934 A1 | 7/2009 | Gupta |
| 2009/0175349 A1 | 7/2009 | Ye et al. |
| 2009/0179142 A1 | 7/2009 | Duparre et al. |
| 2009/0180021 A1 | 7/2009 | Kikuchi et al. |
| 2009/0200622 A1 | 8/2009 | Tai et al. |
| 2009/0201371 A1 | 8/2009 | Matsuda et al. |
| 2009/0207235 A1 | 8/2009 | Francini et al. |
| 2009/0219435 A1 | 9/2009 | Yuan |
| 2009/0225203 A1 | 9/2009 | Tanida et al. |
| 2009/0237520 A1 | 9/2009 | Kaneko et al. |
| 2009/0245573 A1 | 10/2009 | Saptharishi et al. |
| 2009/0245637 A1 | 10/2009 | Barman et al. |
| 2009/0256947 A1 | 10/2009 | Ciurea et al. |
| 2009/0263017 A1 | 10/2009 | Tanbakuchi |
| 2009/0268192 A1 | 10/2009 | Koenck et al. |
| 2009/0268970 A1 | 10/2009 | Babacan et al. |
| 2009/0268983 A1 | 10/2009 | Stone et al. |
| 2009/0273663 A1 | 11/2009 | Yoshida |
| 2009/0274387 A1 | 11/2009 | Jin |
| 2009/0279800 A1 | 11/2009 | Uetani et al. |
| 2009/0284651 A1 | 11/2009 | Srinivasan |
| 2009/0290811 A1 | 11/2009 | Imai |
| 2009/0297056 A1 | 12/2009 | Lelescu et al. |
| 2009/0302205 A9 | 12/2009 | Olsen et al. |
| 2009/0317061 A1 | 12/2009 | Jung et al. |
| 2009/0322876 A1 | 12/2009 | Lee et al. |
| 2009/0323195 A1 | 12/2009 | Hembree et al. |
| 2009/0323206 A1 | 12/2009 | Oliver et al. |
| 2009/0324118 A1 | 12/2009 | Maslov et al. |
| 2010/0002126 A1 | 1/2010 | Wenstrand et al. |
| 2010/0002313 A1 | 1/2010 | Duparre et al. |
| 2010/0002314 A1 | 1/2010 | Duparre |
| 2010/0007714 A1 | 1/2010 | Kim et al. |
| 2010/0013927 A1 | 1/2010 | Nixon |
| 2010/0044815 A1 | 2/2010 | Chang |
| 2010/0045809 A1 | 2/2010 | Packard |
| 2010/0053342 A1 | 3/2010 | Hwang et al. |
| 2010/0053347 A1 | 3/2010 | Agarwala et al. |
| 2010/0053415 A1 | 3/2010 | Yun |
| 2010/0053600 A1 | 3/2010 | Tanida et al. |
| 2010/0060746 A9 | 3/2010 | Olsen et al. |
| 2010/0073463 A1 | 3/2010 | Momonoi et al. |
| 2010/0074532 A1 | 3/2010 | Gordon et al. |
| 2010/0085351 A1 | 4/2010 | Deb et al. |
| 2010/0085425 A1 | 4/2010 | Tan |
| 2010/0086227 A1 | 4/2010 | Sun et al. |
| 2010/0091389 A1 | 4/2010 | Henriksen et al. |
| 2010/0097444 A1 | 4/2010 | Lablans |

(56) References Cited

U.S. PATENT DOCUMENTS

| | | |
|---|---|---|
| 2010/0097491 A1 | 4/2010 | Farina et al. |
| 2010/0103175 A1 | 4/2010 | Okutomi et al. |
| 2010/0103259 A1 | 4/2010 | Tanida et al. |
| 2010/0103308 A1 | 4/2010 | Butterfield et al. |
| 2010/0111444 A1 | 5/2010 | Coffman |
| 2010/0118127 A1 | 5/2010 | Nam et al. |
| 2010/0128145 A1 | 5/2010 | Pitts et al. |
| 2010/0129048 A1 | 5/2010 | Pitts et al. |
| 2010/0133230 A1 | 6/2010 | Henriksen et al. |
| 2010/0133418 A1 | 6/2010 | Sargent et al. |
| 2010/0141802 A1 | 6/2010 | Knight et al. |
| 2010/0142828 A1 | 6/2010 | Chang et al. |
| 2010/0142839 A1 | 6/2010 | Lakus-Becker |
| 2010/0157073 A1 | 6/2010 | Kondo et al. |
| 2010/0165152 A1 | 7/2010 | Lim |
| 2010/0166410 A1 | 7/2010 | Chang |
| 2010/0171866 A1 | 7/2010 | Brady et al. |
| 2010/0177411 A1 | 7/2010 | Hegde et al. |
| 2010/0182406 A1 | 7/2010 | Benitez |
| 2010/0194860 A1 | 8/2010 | Mentz et al. |
| 2010/0194901 A1 | 8/2010 | van Hoorebeke et al. |
| 2010/0195716 A1 | 8/2010 | Klein Gunnewiek et al. |
| 2010/0201809 A1 | 8/2010 | Oyama et al. |
| 2010/0201834 A1 | 8/2010 | Maruyama et al. |
| 2010/0202054 A1 | 8/2010 | Niederer |
| 2010/0202683 A1 | 8/2010 | Robinson |
| 2010/0208100 A9 | 8/2010 | Olsen et al. |
| 2010/0214423 A1 | 8/2010 | Ogawa |
| 2010/0220212 A1 | 9/2010 | Perlman et al. |
| 2010/0223237 A1 | 9/2010 | Mishra et al. |
| 2010/0225740 A1 | 9/2010 | Jung et al. |
| 2010/0231285 A1 | 9/2010 | Boomer et al. |
| 2010/0238327 A1 | 9/2010 | Griffith et al. |
| 2010/0244165 A1 | 9/2010 | Lake et al. |
| 2010/0245684 A1 | 9/2010 | Xiao et al. |
| 2010/0254627 A1 | 10/2010 | Panahpour Tehrani et al. |
| 2010/0259610 A1 | 10/2010 | Petersen |
| 2010/0265346 A1 | 10/2010 | Iizuka |
| 2010/0265381 A1 | 10/2010 | Yamamoto et al. |
| 2010/0265385 A1 | 10/2010 | Knight et al. |
| 2010/0277629 A1 | 11/2010 | Tanaka |
| 2010/0281070 A1 | 11/2010 | Chan et al. |
| 2010/0289941 A1 | 11/2010 | Ito et al. |
| 2010/0290483 A1 | 11/2010 | Park et al. |
| 2010/0302423 A1 | 12/2010 | Adams, Jr. et al. |
| 2010/0309292 A1 | 12/2010 | Ho et al. |
| 2010/0309368 A1 | 12/2010 | Choi et al. |
| 2010/0321595 A1 | 12/2010 | Chiu |
| 2010/0321640 A1 | 12/2010 | Yeh et al. |
| 2010/0329556 A1 | 12/2010 | Mitarai et al. |
| 2010/0329582 A1 | 12/2010 | Albu et al. |
| 2011/0001037 A1 | 1/2011 | Tewinkle |
| 2011/0013006 A1 | 1/2011 | Uzenbajakava et al. |
| 2011/0018973 A1 | 1/2011 | Takayama |
| 2011/0019048 A1 | 1/2011 | Raynor et al. |
| 2011/0019243 A1 | 1/2011 | Constant, Jr. et al. |
| 2011/0031381 A1 | 2/2011 | Tay et al. |
| 2011/0032341 A1 | 2/2011 | Ignatov et al. |
| 2011/0032370 A1 | 2/2011 | Ludwig |
| 2011/0033129 A1 | 2/2011 | Robinson |
| 2011/0038536 A1 | 2/2011 | Gong |
| 2011/0043604 A1 | 2/2011 | Peleg et al. |
| 2011/0043613 A1 | 2/2011 | Rohaly et al. |
| 2011/0043661 A1 | 2/2011 | Podoleanu |
| 2011/0043665 A1 | 2/2011 | Ogasahara |
| 2011/0043668 A1 | 2/2011 | McKinnon et al. |
| 2011/0044502 A1 | 2/2011 | Liu et al. |
| 2011/0051255 A1 | 3/2011 | Lee et al. |
| 2011/0055729 A1 | 3/2011 | Mason et al. |
| 2011/0064327 A1 | 3/2011 | Dagher et al. |
| 2011/0069189 A1 | 3/2011 | Venkataraman et al. |
| 2011/0080487 A1 | 4/2011 | Venkataraman et al. |
| 2011/0084893 A1 | 4/2011 | Lee et al. |
| 2011/0085028 A1 | 4/2011 | Samadani et al. |
| 2011/0090217 A1 | 4/2011 | Mashitani et al. |
| 2011/0102553 A1 | 5/2011 | Corcoran et al. |
| 2011/0108708 A1 | 5/2011 | Olsen et al. |
| 2011/0115886 A1 | 5/2011 | Nguyen et al. |
| 2011/0121421 A1 | 5/2011 | Charbon et al. |
| 2011/0122308 A1 | 5/2011 | Duparre |
| 2011/0128393 A1 | 6/2011 | Tavi et al. |
| 2011/0128412 A1 | 6/2011 | Milnes et al. |
| 2011/0129165 A1 | 6/2011 | Lim et al. |
| 2011/0141309 A1 | 6/2011 | Nagashima et al. |
| 2011/0142138 A1 | 6/2011 | Tian et al. |
| 2011/0149408 A1 | 6/2011 | Hahgholt et al. |
| 2011/0149409 A1 | 6/2011 | Haugholt et al. |
| 2011/0150321 A1 | 6/2011 | Cheong et al. |
| 2011/0153248 A1 | 6/2011 | Gu et al. |
| 2011/0157321 A1 | 6/2011 | Nakajima et al. |
| 2011/0157451 A1 | 6/2011 | Chang |
| 2011/0169994 A1 | 7/2011 | DiFrancesco et al. |
| 2011/0176020 A1 | 7/2011 | Chang |
| 2011/0181797 A1 | 7/2011 | Galstian et al. |
| 2011/0193944 A1 | 8/2011 | Lian et al. |
| 2011/0199458 A1 | 8/2011 | Hayasaka et al. |
| 2011/0200319 A1 | 8/2011 | Kravitz et al. |
| 2011/0206291 A1 | 8/2011 | Kashani et al. |
| 2011/0207074 A1 | 8/2011 | Hall-Holt et al. |
| 2011/0211068 A1 | 9/2011 | Yokota |
| 2011/0211077 A1 | 9/2011 | Nayar et al. |
| 2011/0211824 A1 | 9/2011 | Georgiev et al. |
| 2011/0221599 A1 | 9/2011 | Högasten |
| 2011/0221658 A1 | 9/2011 | Haddick et al. |
| 2011/0221939 A1 | 9/2011 | Jerdev |
| 2011/0221950 A1 | 9/2011 | Oostra et al. |
| 2011/0222757 A1 | 9/2011 | Yeatman, Jr. et al. |
| 2011/0228142 A1 | 9/2011 | Brueckner et al. |
| 2011/0228144 A1 | 9/2011 | Tian et al. |
| 2011/0234825 A1 | 9/2011 | Liu et al. |
| 2011/0234841 A1 | 9/2011 | Akeley et al. |
| 2011/0241234 A1 | 10/2011 | Duparre |
| 2011/0242342 A1 | 10/2011 | Goma et al. |
| 2011/0242355 A1 | 10/2011 | Goma et al. |
| 2011/0242356 A1 | 10/2011 | Aleksic et al. |
| 2011/0243428 A1 | 10/2011 | Das Gupta et al. |
| 2011/0255592 A1 | 10/2011 | Sung et al. |
| 2011/0255745 A1 | 10/2011 | Hodder et al. |
| 2011/0255786 A1 | 10/2011 | Hunter et al. |
| 2011/0261993 A1 | 10/2011 | Weiming et al. |
| 2011/0267264 A1 | 11/2011 | Mccarthy et al. |
| 2011/0267348 A1 | 11/2011 | Lin et al. |
| 2011/0273531 A1 | 11/2011 | Ito et al. |
| 2011/0274175 A1 | 11/2011 | Sumitomo |
| 2011/0274366 A1 | 11/2011 | Tardif |
| 2011/0279705 A1 | 11/2011 | Kuang et al. |
| 2011/0279721 A1 | 11/2011 | McMahon |
| 2011/0285701 A1 | 11/2011 | Chen et al. |
| 2011/0285866 A1 | 11/2011 | Bhrugumalla et al. |
| 2011/0285910 A1 | 11/2011 | Bamji et al. |
| 2011/0292216 A1 | 12/2011 | Fergus et al. |
| 2011/0298898 A1 | 12/2011 | Jung et al. |
| 2011/0298917 A1 | 12/2011 | Yanagita |
| 2011/0300929 A1 | 12/2011 | Tardif et al. |
| 2011/0310980 A1 | 12/2011 | Mathew |
| 2011/0316968 A1 | 12/2011 | Taguchi et al. |
| 2011/0317766 A1 | 12/2011 | Lim et al. |
| 2012/0012748 A1 | 1/2012 | Pain |
| 2012/0013748 A1 | 1/2012 | Stanwood et al. |
| 2012/0014456 A1 | 1/2012 | Martinez Bauza et al. |
| 2012/0019530 A1 | 1/2012 | Baker |
| 2012/0019700 A1 | 1/2012 | Gaber |
| 2012/0023456 A1 | 1/2012 | Sun et al. |
| 2012/0026297 A1 | 2/2012 | Sato |
| 2012/0026342 A1 | 2/2012 | Yu et al. |
| 2012/0026366 A1 | 2/2012 | Golan et al. |
| 2012/0026451 A1 | 2/2012 | Nystrom |
| 2012/0026478 A1 | 2/2012 | Chen et al. |
| 2012/0038745 A1 | 2/2012 | Yu et al. |
| 2012/0039525 A1 | 2/2012 | Tian et al. |
| 2012/0044249 A1 | 2/2012 | Mashitani et al. |
| 2012/0044372 A1 | 2/2012 | Côté et al. |
| 2012/0051624 A1 | 3/2012 | Ando |
| 2012/0056982 A1 | 3/2012 | Katz et al. |

(56) References Cited

U.S. PATENT DOCUMENTS

| | | |
|---|---|---|
| 2012/0057040 A1 | 3/2012 | Park et al. |
| 2012/0062697 A1 | 3/2012 | Treado et al. |
| 2012/0062702 A1 | 3/2012 | Jiang et al. |
| 2012/0062756 A1 | 3/2012 | Tian et al. |
| 2012/0069235 A1 | 3/2012 | Imai |
| 2012/0081519 A1 | 4/2012 | Goma et al. |
| 2012/0086803 A1 | 4/2012 | Malzbender et al. |
| 2012/0105590 A1 | 5/2012 | Fukumoto et al. |
| 2012/0105654 A1 | 5/2012 | Kwatra et al. |
| 2012/0105691 A1 | 5/2012 | Waqas et al. |
| 2012/0113232 A1 | 5/2012 | Joblove |
| 2012/0113318 A1 | 5/2012 | Galstian et al. |
| 2012/0113413 A1 | 5/2012 | Miahczylowicz-Wolski et al. |
| 2012/0114224 A1 | 5/2012 | Xu et al. |
| 2012/0114260 A1 | 5/2012 | Takahashi et al. |
| 2012/0120264 A1 | 5/2012 | Lee et al. |
| 2012/0127275 A1 | 5/2012 | Von Zitzewitz et al. |
| 2012/0127284 A1 | 5/2012 | Bar-Zeev et al. |
| 2012/0147139 A1 | 6/2012 | Li et al. |
| 2012/0147205 A1 | 6/2012 | Lelescu et al. |
| 2012/0153153 A1 | 6/2012 | Chang et al. |
| 2012/0154551 A1 | 6/2012 | Inoue |
| 2012/0155830 A1 | 6/2012 | Sasaki et al. |
| 2012/0162374 A1 | 6/2012 | Markas et al. |
| 2012/0163672 A1 | 6/2012 | McKinnon |
| 2012/0163725 A1 | 6/2012 | Fukuhara |
| 2012/0169433 A1 | 7/2012 | Mullins et al. |
| 2012/0170134 A1 | 7/2012 | Bolis et al. |
| 2012/0176479 A1 | 7/2012 | Mayhew et al. |
| 2012/0176481 A1 | 7/2012 | Lukk et al. |
| 2012/0188235 A1 | 7/2012 | Wu et al. |
| 2012/0188341 A1 | 7/2012 | Klein Gunnewiek et al. |
| 2012/0188389 A1 | 7/2012 | Lin et al. |
| 2012/0188420 A1 | 7/2012 | Black et al. |
| 2012/0188634 A1 | 7/2012 | Kubala et al. |
| 2012/0198677 A1 | 8/2012 | Duparre |
| 2012/0200669 A1 | 8/2012 | Lai et al. |
| 2012/0200726 A1 | 8/2012 | Bugnariu |
| 2012/0200734 A1 | 8/2012 | Tang |
| 2012/0206582 A1 | 8/2012 | DiCarlo et al. |
| 2012/0218455 A1 | 8/2012 | Imai et al. |
| 2012/0219236 A1 | 8/2012 | Ali et al. |
| 2012/0224083 A1 | 9/2012 | Jovanovski et al. |
| 2012/0229602 A1 | 9/2012 | Chen et al. |
| 2012/0229628 A1 | 9/2012 | Ishiyama et al. |
| 2012/0237114 A1 | 9/2012 | Park et al. |
| 2012/0249550 A1 | 10/2012 | Akeley et al. |
| 2012/0249750 A1 | 10/2012 | Izzat et al. |
| 2012/0249836 A1 | 10/2012 | Ali et al. |
| 2012/0249853 A1 | 10/2012 | Krolczyk et al. |
| 2012/0250990 A1 | 10/2012 | Bocirnea |
| 2012/0262601 A1 | 10/2012 | Choi et al. |
| 2012/0262607 A1 | 10/2012 | Shimura et al. |
| 2012/0268574 A1 | 10/2012 | Gidon et al. |
| 2012/0274626 A1 | 11/2012 | Hsieh |
| 2012/0287291 A1 | 11/2012 | McMahon |
| 2012/0290257 A1 | 11/2012 | Hodge et al. |
| 2012/0293489 A1 | 11/2012 | Chen et al. |
| 2012/0293624 A1 | 11/2012 | Chen et al. |
| 2012/0293695 A1 | 11/2012 | Tanaka |
| 2012/0307084 A1 | 12/2012 | Mantzel |
| 2012/0307093 A1 | 12/2012 | Miyoshi |
| 2012/0307099 A1 | 12/2012 | Yahata |
| 2012/0314033 A1 | 12/2012 | Lee et al. |
| 2012/0314937 A1 | 12/2012 | Kim et al. |
| 2012/0327222 A1 | 12/2012 | Ng et al. |
| 2013/0002828 A1 | 1/2013 | Ding et al. |
| 2013/0002953 A1 | 1/2013 | Noguchi et al. |
| 2013/0003184 A1 | 1/2013 | Duparre |
| 2013/0010073 A1 | 1/2013 | Do et al. |
| 2013/0016245 A1 | 1/2013 | Yuba |
| 2013/0016885 A1 | 1/2013 | Tsujimoto |
| 2013/0022111 A1 | 1/2013 | Chen et al. |
| 2013/0027580 A1 | 1/2013 | Olsen et al. |
| 2013/0033579 A1 | 2/2013 | Wajs |
| 2013/0033585 A1 | 2/2013 | Li et al. |
| 2013/0038696 A1 | 2/2013 | Ding et al. |
| 2013/0047396 A1 | 2/2013 | Au et al. |
| 2013/0050504 A1 | 2/2013 | Safaee-Rad et al. |
| 2013/0050526 A1 | 2/2013 | Keelan |
| 2013/0057710 A1 | 3/2013 | McMahon |
| 2013/0070060 A1 | 3/2013 | Chatterjee et al. |
| 2013/0076967 A1 | 3/2013 | Brunner et al. |
| 2013/0077859 A1 | 3/2013 | Stauder et al. |
| 2013/0077880 A1 | 3/2013 | Venkataraman et al. |
| 2013/0077882 A1 | 3/2013 | Venkataraman et al. |
| 2013/0083172 A1 | 4/2013 | Baba |
| 2013/0088489 A1 | 4/2013 | Schmeitz et al. |
| 2013/0088637 A1 | 4/2013 | Duparre |
| 2013/0093842 A1 | 4/2013 | Yahata |
| 2013/0100254 A1 | 4/2013 | Morioka et al. |
| 2013/0107061 A1 | 5/2013 | Kumar et al. |
| 2013/0113888 A1 | 5/2013 | Koguchi |
| 2013/0113899 A1 | 5/2013 | Morohoshi et al. |
| 2013/0113939 A1 | 5/2013 | Strandemar |
| 2013/0120536 A1 | 5/2013 | Song et al. |
| 2013/0120605 A1 | 5/2013 | Georgiev et al. |
| 2013/0121559 A1 | 5/2013 | Hu et al. |
| 2013/0127988 A1 | 5/2013 | Wang et al. |
| 2013/0128049 A1 | 5/2013 | Schofield et al. |
| 2013/0128068 A1 | 5/2013 | Georgiev et al. |
| 2013/0128069 A1 | 5/2013 | Georgiev et al. |
| 2013/0128087 A1 | 5/2013 | Georgiev et al. |
| 2013/0128121 A1 | 5/2013 | Agarwala et al. |
| 2013/0135315 A1 | 5/2013 | Bares et al. |
| 2013/0135448 A1 | 5/2013 | Nagumo et al. |
| 2013/0147979 A1 | 6/2013 | McMahon et al. |
| 2013/0155050 A1 | 6/2013 | Rastogi et al. |
| 2013/0162641 A1 | 6/2013 | Zhang et al. |
| 2013/0169754 A1 | 7/2013 | Aronsson et al. |
| 2013/0176394 A1 | 7/2013 | Tian et al. |
| 2013/0208138 A1 | 8/2013 | Li et al. |
| 2013/0215108 A1 | 8/2013 | McMahon et al. |
| 2013/0215231 A1 | 8/2013 | Hiramoto et al. |
| 2013/0216144 A1 | 8/2013 | Robinson et al. |
| 2013/0222556 A1 | 8/2013 | Shimada |
| 2013/0222656 A1 | 8/2013 | Kaneko |
| 2013/0223759 A1 | 8/2013 | Nishiyama |
| 2013/0229540 A1 | 9/2013 | Farina et al. |
| 2013/0230237 A1 | 9/2013 | Schlosser et al. |
| 2013/0250123 A1 | 9/2013 | Zhang et al. |
| 2013/0250150 A1 | 9/2013 | Malone et al. |
| 2013/0258067 A1 | 10/2013 | Zhang et al. |
| 2013/0259317 A1 | 10/2013 | Gaddy |
| 2013/0265459 A1 | 10/2013 | Duparre et al. |
| 2013/0274596 A1 | 10/2013 | Azizian et al. |
| 2013/0274923 A1 | 10/2013 | By |
| 2013/0278631 A1 | 10/2013 | Border et al. |
| 2013/0286236 A1 | 10/2013 | Mankowski |
| 2013/0293760 A1 | 11/2013 | Nisenzon et al. |
| 2013/0308197 A1 | 11/2013 | Duparre |
| 2013/0321581 A1 | 12/2013 | El-Ghoroury et al. |
| 2013/0321589 A1 | 12/2013 | Kirk et al. |
| 2013/0335598 A1 | 12/2013 | Gustavsson et al. |
| 2013/0342641 A1 | 12/2013 | Morioka et al. |
| 2014/0002674 A1 | 1/2014 | Duparre et al. |
| 2014/0002675 A1 | 1/2014 | Duparre et al. |
| 2014/0009586 A1 | 1/2014 | McNamer et al. |
| 2014/0013273 A1 | 1/2014 | Ng |
| 2014/0037137 A1 | 2/2014 | Broaddus et al. |
| 2014/0037140 A1 | 2/2014 | Benhimane et al. |
| 2014/0043507 A1 | 2/2014 | Wang et al. |
| 2014/0059462 A1 | 2/2014 | Wernersson |
| 2014/0076336 A1 | 3/2014 | Clayton et al. |
| 2014/0078333 A1 | 3/2014 | Miao |
| 2014/0079336 A1 | 3/2014 | Venkataraman et al. |
| 2014/0081454 A1 | 3/2014 | Nuyujukian et al. |
| 2014/0085502 A1 | 3/2014 | Lin et al. |
| 2014/0092281 A1 | 4/2014 | Nisenzon et al. |
| 2014/0098266 A1 | 4/2014 | Nayar et al. |
| 2014/0098267 A1 | 4/2014 | Tian et al. |
| 2014/0104490 A1 | 4/2014 | Hsieh et al. |
| 2014/0118493 A1 | 5/2014 | Sali et al. |
| 2014/0118584 A1 | 5/2014 | Lee et al. |

(56) References Cited

U.S. PATENT DOCUMENTS

| | | |
|---|---|---|
| 2014/0125760 A1 | 5/2014 | Au et al. |
| 2014/0125771 A1 | 5/2014 | Grossmann et al. |
| 2014/0132810 A1 | 5/2014 | McMahon |
| 2014/0139642 A1 | 5/2014 | Ni et al. |
| 2014/0139643 A1 | 5/2014 | Hogasten et al. |
| 2014/0140626 A1 | 5/2014 | Cho et al. |
| 2014/0146132 A1 | 5/2014 | Bagnato et al. |
| 2014/0146201 A1 | 5/2014 | Knight et al. |
| 2014/0176592 A1 | 6/2014 | Wilburn et al. |
| 2014/0183258 A1 | 7/2014 | DiMuro |
| 2014/0183334 A1 | 7/2014 | Wang et al. |
| 2014/0186045 A1 | 7/2014 | Poddar et al. |
| 2014/0192154 A1 | 7/2014 | Jeong et al. |
| 2014/0192253 A1 | 7/2014 | Laroia |
| 2014/0198188 A1 | 7/2014 | Izawa |
| 2014/0204183 A1 | 7/2014 | Lee et al. |
| 2014/0218546 A1 | 8/2014 | McMahon |
| 2014/0232822 A1 | 8/2014 | Venkataraman et al. |
| 2014/0240528 A1 | 8/2014 | Venkataraman et al. |
| 2014/0240529 A1 | 8/2014 | Venkataraman et al. |
| 2014/0253738 A1 | 9/2014 | Mullis |
| 2014/0267243 A1 | 9/2014 | Venkataraman et al. |
| 2014/0267286 A1 | 9/2014 | Duparre |
| 2014/0267633 A1 | 9/2014 | Venkataraman et al. |
| 2014/0267762 A1 | 9/2014 | Mullis et al. |
| 2014/0267829 A1 | 9/2014 | McMahon et al. |
| 2014/0267890 A1 | 9/2014 | Lelescu et al. |
| 2014/0285675 A1 | 9/2014 | Mullis |
| 2014/0300706 A1 | 10/2014 | Song |
| 2014/0307058 A1 | 10/2014 | Kirk et al. |
| 2014/0307063 A1 | 10/2014 | Lee |
| 2014/0313315 A1 | 10/2014 | Shoham et al. |
| 2014/0321712 A1 | 10/2014 | Ciurea et al. |
| 2014/0333731 A1 | 11/2014 | Venkataraman et al. |
| 2014/0333764 A1 | 11/2014 | Venkataraman et al. |
| 2014/0333787 A1 | 11/2014 | Venkataraman et al. |
| 2014/0340539 A1 | 11/2014 | Venkataraman et al. |
| 2014/0347509 A1 | 11/2014 | Venkataraman et al. |
| 2014/0347748 A1 | 11/2014 | Duparre |
| 2014/0354773 A1 | 12/2014 | Venkataraman et al. |
| 2014/0354843 A1 | 12/2014 | Venkataraman et al. |
| 2014/0354844 A1 | 12/2014 | Venkataraman et al. |
| 2014/0354853 A1 | 12/2014 | Venkataraman et al. |
| 2014/0354854 A1 | 12/2014 | Venkataraman et al. |
| 2014/0354855 A1 | 12/2014 | Venkataraman et al. |
| 2014/0355870 A1 | 12/2014 | Venkataraman et al. |
| 2014/0368662 A1 | 12/2014 | Venkataraman et al. |
| 2014/0368683 A1 | 12/2014 | Venkataraman et al. |
| 2014/0368684 A1 | 12/2014 | Venkataraman et al. |
| 2014/0368685 A1 | 12/2014 | Venkataraman et al. |
| 2014/0368686 A1 | 12/2014 | Duparre |
| 2014/0369612 A1 | 12/2014 | Venkataraman et al. |
| 2014/0369615 A1 | 12/2014 | Venkataraman et al. |
| 2014/0376825 A1 | 12/2014 | Venkataraman et al. |
| 2014/0376826 A1 | 12/2014 | Venkataraman et al. |
| 2015/0002734 A1 | 1/2015 | Lee |
| 2015/0003752 A1 | 1/2015 | Venkataraman et al. |
| 2015/0003753 A1 | 1/2015 | Venkataraman et al. |
| 2015/0009353 A1 | 1/2015 | Venkataraman et al. |
| 2015/0009354 A1 | 1/2015 | Venkataraman et al. |
| 2015/0009362 A1 | 1/2015 | Venkataraman et al. |
| 2015/0015669 A1 | 1/2015 | Venkataraman et al. |
| 2015/0035992 A1 | 2/2015 | Mullis |
| 2015/0036014 A1 | 2/2015 | Lelescu et al. |
| 2015/0036015 A1 | 2/2015 | Lelescu et al. |
| 2015/0042766 A1 | 2/2015 | Ciurea et al. |
| 2015/0042767 A1 | 2/2015 | Ciurea et al. |
| 2015/0042814 A1 | 2/2015 | Vaziri |
| 2015/0042833 A1 | 2/2015 | Lelescu et al. |
| 2015/0049915 A1 | 2/2015 | Ciurea et al. |
| 2015/0049916 A1 | 2/2015 | Ciurea et al. |
| 2015/0049917 A1 | 2/2015 | Ciurea et al. |
| 2015/0055884 A1 | 2/2015 | Venkataraman et al. |
| 2015/0085073 A1 | 3/2015 | Bruls et al. |
| 2015/0085174 A1 | 3/2015 | Shabtay et al. |
| 2015/0091900 A1 | 4/2015 | Yang et al. |
| 2015/0095235 A1 | 4/2015 | Dua |
| 2015/0098079 A1 | 4/2015 | Montgomery et al. |
| 2015/0104076 A1 | 4/2015 | Hayasaka |
| 2015/0104101 A1 | 4/2015 | Bryant et al. |
| 2015/0122411 A1 | 5/2015 | Rodda et al. |
| 2015/0124059 A1 | 5/2015 | Georgiev et al. |
| 2015/0124113 A1 | 5/2015 | Rodda et al. |
| 2015/0124151 A1 | 5/2015 | Rodda et al. |
| 2015/0138346 A1 | 5/2015 | Venkataraman et al. |
| 2015/0146029 A1 | 5/2015 | Venkataraman et al. |
| 2015/0146030 A1 | 5/2015 | Venkataraman et al. |
| 2015/0161798 A1 | 6/2015 | Venkataraman et al. |
| 2015/0199793 A1 | 7/2015 | Venkataraman et al. |
| 2015/0199841 A1 | 7/2015 | Venkataraman et al. |
| 2015/0207990 A1 | 7/2015 | Ford et al. |
| 2015/0228081 A1 | 8/2015 | Kim et al. |
| 2015/0235476 A1 | 8/2015 | McMahon et al. |
| 2015/0237329 A1 | 8/2015 | Venkataraman et al. |
| 2015/0243480 A1 | 8/2015 | Yamada |
| 2015/0244927 A1 | 8/2015 | Laroia et al. |
| 2015/0245013 A1 | 8/2015 | Venkataraman et al. |
| 2015/0248744 A1 | 9/2015 | Hayasaka et al. |
| 2015/0254868 A1 | 9/2015 | Srikanth et al. |
| 2015/0264337 A1 | 9/2015 | Venkataraman et al. |
| 2015/0288861 A1 | 10/2015 | Duparre |
| 2015/0296137 A1 | 10/2015 | Duparre et al. |
| 2015/0312455 A1 | 10/2015 | Venkataraman et al. |
| 2015/0317638 A1 | 11/2015 | Donaldson |
| 2015/0326852 A1 | 11/2015 | Duparre et al. |
| 2015/0332468 A1 | 11/2015 | Hayasaka et al. |
| 2015/0373261 A1 | 12/2015 | Rodda et al. |
| 2016/0037097 A1 | 2/2016 | Duparre |
| 2016/0042548 A1 | 2/2016 | Du et al. |
| 2016/0044252 A1 | 2/2016 | Molina |
| 2016/0044257 A1 | 2/2016 | Venkataraman et al. |
| 2016/0057332 A1 | 2/2016 | Ciurea et al. |
| 2016/0065934 A1 | 3/2016 | Kaza et al. |
| 2016/0163051 A1 | 6/2016 | Mullis |
| 2016/0165106 A1 | 6/2016 | Duparre |
| 2016/0165134 A1 | 6/2016 | Lelescu et al. |
| 2016/0165147 A1 | 6/2016 | Nisenzon et al. |
| 2016/0165212 A1 | 6/2016 | Mullis |
| 2016/0182786 A1 | 6/2016 | Anderson et al. |
| 2016/0191768 A1 | 6/2016 | Shin et al. |
| 2016/0195733 A1 | 7/2016 | Lelescu et al. |
| 2016/0198096 A1 | 7/2016 | McMahon et al. |
| 2016/0209654 A1 | 7/2016 | Riccomini et al. |
| 2016/0210785 A1 | 7/2016 | Balachandreswaran et al. |
| 2016/0227195 A1 | 8/2016 | Venkataraman et al. |
| 2016/0249001 A1 | 8/2016 | McMahon |
| 2016/0255333 A1 | 9/2016 | Nisenzon et al. |
| 2016/0266284 A1 | 9/2016 | Duparre et al. |
| 2016/0267486 A1 | 9/2016 | Mitra et al. |
| 2016/0267665 A1 | 9/2016 | Venkataraman et al. |
| 2016/0267672 A1 | 9/2016 | Ciurea et al. |
| 2016/0269626 A1 | 9/2016 | McMahon |
| 2016/0269627 A1 | 9/2016 | McMahon |
| 2016/0269650 A1 | 9/2016 | Venkataraman et al. |
| 2016/0269651 A1 | 9/2016 | Venkataraman et al. |
| 2016/0269664 A1 | 9/2016 | Duparre |
| 2016/0309084 A1 | 10/2016 | Venkataraman et al. |
| 2016/0309134 A1 | 10/2016 | Venkataraman et al. |
| 2016/0316140 A1 | 10/2016 | Nayar et al. |
| 2016/0323578 A1 | 11/2016 | Kaneko et al. |
| 2017/0004791 A1 | 1/2017 | Aubineau et al. |
| 2017/0006233 A1 | 1/2017 | Venkataraman et al. |
| 2017/0011405 A1 | 1/2017 | Pandey |
| 2017/0048468 A1 | 2/2017 | Pain et al. |
| 2017/0053382 A1 | 2/2017 | Lelescu et al. |
| 2017/0054901 A1 | 2/2017 | Venkataraman et al. |
| 2017/0070672 A1 | 3/2017 | Rodda et al. |
| 2017/0070673 A1 | 3/2017 | Lelescu et al. |
| 2017/0070753 A1 | 3/2017 | Kaneko |
| 2017/0078568 A1 | 3/2017 | Venkataraman et al. |
| 2017/0085845 A1 | 3/2017 | Venkataraman et al. |
| 2017/0094243 A1 | 3/2017 | Venkataraman et al. |
| 2017/0099465 A1 | 4/2017 | Mullis et al. |
| 2017/0109742 A1 | 4/2017 | Varadarajan |

(56) References Cited

U.S. PATENT DOCUMENTS

| | | |
|---|---|---|
| 2017/0142405 A1 | 5/2017 | Shors et al. |
| 2017/0163862 A1 | 6/2017 | Molina |
| 2017/0178363 A1 | 6/2017 | Venkataraman et al. |
| 2017/0187933 A1 | 6/2017 | Duparre |
| 2017/0188011 A1 | 6/2017 | Panescu et al. |
| 2017/0244960 A1 | 8/2017 | Ciurea et al. |
| 2017/0257562 A1 | 9/2017 | Venkataraman et al. |
| 2017/0365104 A1 | 12/2017 | McMahon et al. |
| 2018/0005244 A1 | 1/2018 | Govindarajan et al. |
| 2018/0007284 A1 | 1/2018 | Venkataraman et al. |
| 2018/0012411 A1* | 1/2018 | Richey ............... G06T 19/006 |
| 2018/0013945 A1 | 1/2018 | Ciurea et al. |
| 2018/0024330 A1 | 1/2018 | Laroia |
| 2018/0035057 A1 | 2/2018 | McMahon et al. |
| 2018/0040135 A1 | 2/2018 | Mullis |
| 2018/0048830 A1 | 2/2018 | Venkataraman et al. |
| 2018/0048879 A1 | 2/2018 | Venkataraman et al. |
| 2018/0050453 A1* | 2/2018 | Peters .................. B25J 19/021 |
| 2018/0081090 A1 | 3/2018 | Duparre et al. |
| 2018/0097993 A1 | 4/2018 | Nayar et al. |
| 2018/0109782 A1 | 4/2018 | Duparre et al. |
| 2018/0124311 A1 | 5/2018 | Lelescu et al. |
| 2018/0131852 A1 | 5/2018 | McMahon |
| 2018/0139382 A1 | 5/2018 | Venkataraman et al. |
| 2018/0189767 A1 | 7/2018 | Bigioi |
| 2018/0197035 A1 | 7/2018 | Venkataraman et al. |
| 2018/0211402 A1 | 7/2018 | Ciurea et al. |
| 2018/0227511 A1 | 8/2018 | McMahon |
| 2018/0240265 A1 | 8/2018 | Yang et al. |
| 2018/0270473 A1 | 9/2018 | Mullis |
| 2018/0286120 A1 | 10/2018 | Fleishman et al. |
| 2018/0302554 A1 | 10/2018 | Lelescu et al. |
| 2018/0330182 A1 | 11/2018 | Venkataraman et al. |
| 2018/0376122 A1 | 12/2018 | Park et al. |
| 2019/0012768 A1 | 1/2019 | Tafazoli Bilandi et al. |
| 2019/0037116 A1 | 1/2019 | Molina |
| 2019/0037150 A1 | 1/2019 | Srikanth et al. |
| 2019/0043253 A1 | 2/2019 | Lucas et al. |
| 2019/0057513 A1 | 2/2019 | Jain et al. |
| 2019/0063905 A1 | 2/2019 | Venkataraman et al. |
| 2019/0089947 A1 | 3/2019 | Venkataraman et al. |
| 2019/0098209 A1 | 3/2019 | Venkataraman et al. |
| 2019/0109998 A1 | 4/2019 | Venkataraman et al. |
| 2019/0164341 A1 | 5/2019 | Venkataraman |
| 2019/0174040 A1 | 6/2019 | Mcmahon |
| 2019/0197735 A1 | 6/2019 | Xiong et al. |
| 2019/0215496 A1 | 7/2019 | Mullis et al. |
| 2019/0230348 A1 | 7/2019 | Ciurea et al. |
| 2019/0235138 A1 | 8/2019 | Duparre et al. |
| 2019/0243086 A1 | 8/2019 | Rodda et al. |
| 2019/0244379 A1 | 8/2019 | Venkataraman |
| 2019/0251744 A1* | 8/2019 | Flagg .................. G06F 18/22 |
| 2019/0268586 A1 | 8/2019 | Mullis |
| 2019/0278983 A1* | 9/2019 | Iqbal .................. G06N 3/084 |
| 2019/0289176 A1 | 9/2019 | Duparre |
| 2019/0347768 A1 | 11/2019 | Lelescu et al. |
| 2019/0355150 A1* | 11/2019 | Tremblay ............... G06T 7/73 |
| 2019/0356863 A1 | 11/2019 | Venkataraman et al. |
| 2019/0362515 A1 | 11/2019 | Ciurea et al. |
| 2019/0364263 A1 | 11/2019 | Jannard et al. |
| 2020/0026948 A1 | 1/2020 | Venkataraman et al. |
| 2020/0151894 A1 | 5/2020 | Jain et al. |
| 2020/0175759 A1* | 6/2020 | Russell ............... G06F 18/214 |
| 2020/0252597 A1 | 8/2020 | Mullis |
| 2020/0302634 A1* | 9/2020 | Pollefeys ................ G06T 7/70 |
| 2020/0311956 A1* | 10/2020 | Choi .................. G06V 10/454 |
| 2020/0334905 A1 | 10/2020 | Venkataraman |
| 2020/0389604 A1 | 12/2020 | Venkataraman et al. |
| 2021/0042952 A1 | 2/2021 | Jain et al. |
| 2021/0044790 A1 | 2/2021 | Venkataraman et al. |
| 2021/0063141 A1 | 3/2021 | Venkataraman et al. |
| 2021/0133927 A1 | 5/2021 | Lelescu et al. |
| 2021/0150748 A1 | 5/2021 | Ciurea et al. |
| 2021/0366153 A1* | 11/2021 | Hoelscher .......... G06V 10/7715 |
| 2022/0072707 A1* | 3/2022 | Fan ......................... G06T 7/73 |
| 2022/0101639 A1* | 3/2022 | Shugurov ............... G06T 17/10 |
| 2022/0277472 A1* | 9/2022 | Birchfield ............. G06V 10/00 |
| 2022/0375125 A1* | 11/2022 | Taamazyan ............. G06T 7/269 |

FOREIGN PATENT DOCUMENTS

| | | |
|---|---|---|
| CN | 1669332 A | 9/2005 |
| CN | 1727991 A | 2/2006 |
| CN | 1839394 A | 9/2006 |
| CN | 1985524 A | 6/2007 |
| CN | 1992499 A | 7/2007 |
| CN | 101010619 A | 8/2007 |
| CN | 101046882 A | 10/2007 |
| CN | 101064780 A | 10/2007 |
| CN | 101102388 A | 1/2008 |
| CN | 101147392 A | 3/2008 |
| CN | 201043890 Y | 4/2008 |
| CN | 101212566 A | 7/2008 |
| CN | 101312540 A | 11/2008 |
| CN | 101427372 A | 5/2009 |
| CN | 101551586 A | 10/2009 |
| CN | 101593350 A | 12/2009 |
| CN | 101606086 A | 12/2009 |
| CN | 101785025 A | 7/2010 |
| CN | 101883291 A | 11/2010 |
| CN | 102037717 A | 4/2011 |
| CN | 102164298 A | 8/2011 |
| CN | 102184720 A | 9/2011 |
| CN | 102375199 A | 3/2012 |
| CN | 103004180 A | 3/2013 |
| CN | 103765864 A | 4/2014 |
| CN | 104081414 A | 10/2014 |
| CN | 104508681 A | 4/2015 |
| CN | 104662589 A | 5/2015 |
| CN | 104685513 A | 6/2015 |
| CN | 104685860 A | 6/2015 |
| CN | 105409212 A | 3/2016 |
| CN | 103765864 B | 7/2017 |
| CN | 104081414 B | 8/2017 |
| CN | 104662589 B | 8/2017 |
| CN | 107077743 A | 8/2017 |
| CN | 107230236 A | 10/2017 |
| CN | 107346061 A | 11/2017 |
| CN | 107404609 A | 11/2017 |
| CN | 104685513 B | 4/2018 |
| CN | 107924572 A | 4/2018 |
| CN | 108307675 A | 7/2018 |
| CN | 104335246 B | 9/2018 |
| CN | 107404609 B | 2/2020 |
| CN | 107346061 B | 4/2020 |
| CN | 107230236 B | 12/2020 |
| CN | 108307675 B | 12/2020 |
| CN | 107077743 B | 3/2021 |
| DE | 602011041799.1 | 9/2017 |
| EP | 0677821 A2 | 10/1995 |
| EP | 0840502 A2 | 5/1998 |
| EP | 1201407 A2 | 5/2002 |
| EP | 1355274 A2 | 10/2003 |
| EP | 1734766 A2 | 12/2006 |
| EP | 1991145 A1 | 11/2008 |
| EP | 1243945 B1 | 1/2009 |
| EP | 2026563 A1 | 2/2009 |
| EP | 2031592 A1 | 3/2009 |
| EP | 2041454 A2 | 4/2009 |
| EP | 2072785 A1 | 6/2009 |
| EP | 2104334 A1 | 9/2009 |
| EP | 2136345 A1 | 12/2009 |
| EP | 2156244 A1 | 2/2010 |
| EP | 2244484 A1 | 10/2010 |
| EP | 0957642 B1 | 4/2011 |
| EP | 2336816 A2 | 6/2011 |
| EP | 2339532 A1 | 6/2011 |
| EP | 2381418 A1 | 10/2011 |
| EP | 2386554 A1 | 11/2011 |
| EP | 2462477 A1 | 6/2012 |
| EP | 2502115 A2 | 9/2012 |
| EP | 2569935 A1 | 3/2013 |
| EP | 2652678 A1 | 10/2013 |
| EP | 2677066 A1 | 12/2013 |

(56) References Cited

FOREIGN PATENT DOCUMENTS

| | | |
|---|---|---|
| EP | 2708019 A1 | 3/2014 |
| EP | 2761534 A1 | 8/2014 |
| EP | 2777245 A1 | 9/2014 |
| EP | 2867718 A1 | 5/2015 |
| EP | 2873028 A1 | 5/2015 |
| EP | 2888698 A2 | 7/2015 |
| EP | 2888720 A1 | 7/2015 |
| EP | 2901671 A2 | 8/2015 |
| EP | 2973476 A1 | 1/2016 |
| EP | 3066690 A1 | 9/2016 |
| EP | 2569935 B1 | 12/2016 |
| EP | 3201877 A1 | 8/2017 |
| EP | 2652678 B1 | 9/2017 |
| EP | 3284061 A1 | 2/2018 |
| EP | 3286914 A1 | 2/2018 |
| EP | 3201877 A4 | 3/2018 |
| EP | 2817955 B1 | 4/2018 |
| EP | 3328048 A1 | 5/2018 |
| EP | 3075140 B1 | 6/2018 |
| EP | 3201877 B1 | 12/2018 |
| EP | 3467776 A1 | 4/2019 |
| EP | 2708019 B1 | 10/2019 |
| EP | 3286914 B1 | 12/2019 |
| EP | 2761534 B1 | 11/2020 |
| EP | 2888720 B1 | 3/2021 |
| EP | 3328048 B1 | 4/2021 |
| GB | 2482022 A | 1/2012 |
| IN | 2708/CHENP/2014 A1 | 8/2015 |
| IN | 361194 | 3/2021 |
| JP | 59-025483 | 2/1984 |
| JP | 64-037177 | 2/1989 |
| JP | 02-285772 A | 11/1990 |
| JP | 06129851 A | 5/1994 |
| JP | 07-015457 A | 1/1995 |
| JP | H0756112 A | 3/1995 |
| JP | 09171075 A | 6/1997 |
| JP | 09181913 A | 7/1997 |
| JP | 10253351 A | 9/1998 |
| JP | 11142609 A | 5/1999 |
| JP | 11223708 A | 8/1999 |
| JP | 11325889 A | 11/1999 |
| JP | 2000209503 A | 7/2000 |
| JP | 2001008235 A2 | 1/2001 |
| JP | 2001194114 A2 | 7/2001 |
| JP | 2001264033 A2 | 9/2001 |
| JP | 2001277260 A | 10/2001 |
| JP | 2001337263 A2 | 12/2001 |
| JP | 2002195910 A | 7/2002 |
| JP | 2002205310 A | 7/2002 |
| JP | 2002209226 A | 7/2002 |
| JP | 2002250607 A | 9/2002 |
| JP | 2002252338 A | 9/2002 |
| JP | 2003094445 A | 4/2003 |
| JP | 2003139910 A | 5/2003 |
| JP | 2003163938 A | 6/2003 |
| JP | 2003298920 A | 10/2003 |
| JP | 2004221585 A | 8/2004 |
| JP | 2005116022 A | 4/2005 |
| JP | 2005181460 A | 7/2005 |
| JP | 2005295381 A | 10/2005 |
| JP | 2005303694 A | 10/2005 |
| JP | 2005341569 A | 12/2005 |
| JP | 2005354124 A | 12/2005 |
| JP | 2006033228 A | 2/2006 |
| JP | 2006033493 A | 2/2006 |
| JP | 2006047944 A | 2/2006 |
| JP | 2006258930 A | 9/2006 |
| JP | 2007520107 A | 7/2007 |
| JP | 2007259136 A | 10/2007 |
| JP | 2008039852 A | 2/2008 |
| JP | 2008055908 A | 3/2008 |
| JP | 2008507874 A | 3/2008 |
| JP | 2008172735 A | 7/2008 |
| JP | 2008258885 A | 10/2008 |
| JP | 2009064421 A | 3/2009 |
| JP | 2009132010 A | 6/2009 |
| JP | 2009300268 A | 12/2009 |
| JP | 2010139288 A | 6/2010 |
| JP | 2011017764 A | 1/2011 |
| JP | 2011030184 A | 2/2011 |
| JP | 2011109484 A | 6/2011 |
| JP | 2011523538 A | 8/2011 |
| JP | 2011203238 A | 10/2011 |
| JP | 2012504805 A | 2/2012 |
| JP | 2011052064 A1 | 3/2013 |
| JP | 2013509022 A | 3/2013 |
| JP | 2013526801 A | 6/2013 |
| JP | 2014519741 A | 8/2014 |
| JP | 2014521117 A | 8/2014 |
| JP | 2014535191 A | 12/2014 |
| JP | 2015022510 A | 2/2015 |
| JP | 2015522178 A | 8/2015 |
| JP | 2015534734 A | 12/2015 |
| JP | 5848754 B2 | 1/2016 |
| JP | 2016524125 A | 8/2016 |
| JP | 6140709 | 5/2017 |
| JP | 2017163550 A | 9/2017 |
| JP | 2017163587 A | 9/2017 |
| JP | 2017531976 A | 10/2017 |
| JP | 6546613 B2 | 7/2019 |
| JP | 2019-220957 A | 12/2019 |
| JP | 6630891 B2 | 12/2019 |
| JP | 2020017999 A | 1/2020 |
| JP | 6767543 B2 | 9/2020 |
| JP | 6767558 B2 | 9/2020 |
| KR | 10200500042 39 A | 1/2005 |
| KR | 100496875 B1 | 6/2005 |
| KR | 10201100976 47 A | 8/2011 |
| KR | 20140045373 A | 4/2014 |
| KR | 20170063827 A | 6/2017 |
| KR | 101824672 B1 | 2/2018 |
| KR | 101843994 B1 | 3/2018 |
| KR | 101973822 B1 | 4/2019 |
| KR | 10-2002165 B1 | 7/2019 |
| KR | 10-2111181 B1 | 5/2020 |
| SG | 191151 A1 | 7/2013 |
| SG | 11201500910 R | 10/2015 |
| TW | 200828994 A | 7/2008 |
| TW | 200939739 A | 9/2009 |
| TW | 201228382 A | 7/2012 |
| TW | I535292 B | 5/2016 |
| WO | 1994020875 A3 | 9/1994 |
| WO | 2005057922 A1 | 6/2005 |
| WO | 2006039906 A2 | 4/2006 |
| WO | 2006039906 A3 | 4/2006 |
| WO | 2007013250 A1 | 2/2007 |
| WO | 2007083579 A1 | 7/2007 |
| WO | 2007134137 A2 | 11/2007 |
| WO | 2008045198 A2 | 4/2008 |
| WO | 2008050904 A1 | 5/2008 |
| WO | 2008108271 A1 | 9/2008 |
| WO | 2008108926 A1 | 9/2008 |
| WO | 2008150817 A1 | 12/2008 |
| WO | 2009073950 A1 | 6/2009 |
| WO | 2009151903 A2 | 12/2009 |
| WO | 2009157273 A1 | 12/2009 |
| WO | 2010037512 A1 | 4/2010 |
| WO | 2011008443 A2 | 1/2011 |
| WO | 2011026527 A1 | 3/2011 |
| WO | 2011046607 A2 | 4/2011 |
| WO | 2011055655 A1 | 5/2011 |
| WO | 2011063347 A2 | 5/2011 |
| WO | 2011105814 A2 | 9/2011 |
| WO | 2011116203 A1 | 9/2011 |
| WO | 2011063347 A3 | 10/2011 |
| WO | 2011121117 A1 | 10/2011 |
| WO | 2011143501 A1 | 11/2011 |
| WO | 2012057619 A1 | 5/2012 |
| WO | 2012057620 A2 | 5/2012 |
| WO | 2012057621 A1 | 5/2012 |
| WO | 2012057622 A1 | 5/2012 |
| WO | 2012057623 A1 | 5/2012 |
| WO | 2012057620 A3 | 6/2012 |
| WO | 2012074361 A1 | 6/2012 |

(56) References Cited

FOREIGN PATENT DOCUMENTS

| | | |
|---|---|---|
| WO | 2012078126 A1 | 6/2012 |
| WO | 2012082904 A1 | 6/2012 |
| WO | 2012155119 A1 | 11/2012 |
| WO | 2013003276 A1 | 1/2013 |
| WO | 2013043751 A1 | 3/2013 |
| WO | 2013043761 A1 | 3/2013 |
| WO | 2013049699 A1 | 4/2013 |
| WO | 2013055960 A1 | 4/2013 |
| WO | 2013119706 A1 | 8/2013 |
| WO | 2013126578 A1 | 8/2013 |
| WO | 2013166215 A1 | 11/2013 |
| WO | 2014004134 A1 | 1/2014 |
| WO | 2014005123 A1 | 1/2014 |
| WO | 2014031795 A1 | 2/2014 |
| WO | 2014052974 A2 | 4/2014 |
| WO | 2014032020 A3 | 5/2014 |
| WO | 2014078443 A1 | 5/2014 |
| WO | 2014130849 A1 | 8/2014 |
| WO | 2014131038 A1 | 8/2014 |
| WO | 2014133974 A1 | 9/2014 |
| WO | 2014138695 A1 | 9/2014 |
| WO | 2014138697 A1 | 9/2014 |
| WO | 2014144157 A1 | 9/2014 |
| WO | 2014145856 A1 | 9/2014 |
| WO | 2014149403 A1 | 9/2014 |
| WO | 2014149902 A1 | 9/2014 |
| WO | 2014150856 A1 | 9/2014 |
| WO | 2014153098 A1 | 9/2014 |
| WO | 2014159721 A1 | 10/2014 |
| WO | 2014159779 A1 | 10/2014 |
| WO | 2014160142 A1 | 10/2014 |
| WO | 2014164550 A2 | 10/2014 |
| WO | 2014164909 A1 | 10/2014 |
| WO | 2014165244 A1 | 10/2014 |
| WO | 2014133974 A9 | 4/2015 |
| WO | 2015048694 A2 | 4/2015 |
| WO | 2015048906 A1 | 4/2015 |
| WO | 2015070105 A1 | 5/2015 |
| WO | 2015074078 A1 | 5/2015 |
| WO | 2015081279 A1 | 6/2015 |
| WO | 2015134996 A1 | 9/2015 |
| WO | 2015183824 A1 | 12/2015 |
| WO | 2016054089 A1 | 4/2016 |
| WO | 2016/172125 | 10/2016 |
| WO | 2016167814 A1 | 10/2016 |
| WO | 2016172125 A9 | 4/2017 |
| WO | 2018053181 A1 | 3/2018 |
| WO | 2019038193 A1 | 2/2019 |
| WO | WO 2021/071992 | 4/2021 |

OTHER PUBLICATIONS

Trabelsi A, Chaabane M, Blanchard N, Beveridge R. A pose proposal and refinement network for better 6d object pose estimation. InProceedings of the IEEE/CVF Winter Conference on Applications of Computer Vision Jan. 2021 (pp. 2382-2391). URL: https://wacv2021.thecvf.com/node/38 (Year: 2021).*

Z. Zhang, S. Fidler, and R. Urtasun. Instance-level segmentation for autonomous driving with deep densely connected MRFs. In CVPR, 2016 (Year: 2016).*

Agastya, Kalra et al. "Deep Polarization Cues for Transparent Object Segmentation." *Proceedings of the IEEE/CVF Conference on Computer Vision and Pattern Recognition*. 2020, pp. 8602-8611.

An, Gwon Hwan, et al. "Charuco Board-Based Omnidirectional Camera Calibration Method." *Electronics* 7.12 (2018): 421, 15 pages.

Atkinson, Gary A. et al. "Multi-view Surface Reconstruction using Polarization" Tenth IEEE International Conference on Computer Vision (ICCV'05) vol. 1, pp. 309-316 (2005).

Atkinson, Gary A. et al. "Recovery of Surface Orientation From Diffuse Polarization" IEEE Transactions on Image Processing, vol. 15, No. 6, Jun. 2006, pp. 1653-1664.

Ba, Yunhao et al.: Deep shape from polarization. arXiv preprint arXiv:1903.10210 (2019), 11 pages.

Baek, S.H., et al., "Simultaneous Acquisition of Polarimetric SVBRDF and Normals," ACM Trans. Graph, vol. 37, No. 6, Article 268, (2018), 15 pages.

Cao, Yue, et al. "GCNet: Non-local Networks Meet Squeeze-Excitation Networks and Beyond." *Proceedings of the IEEE/CVF International Conference on Computer Vision Workshops*. 2019, 10 pages.

Campbell, Dylan et al. "Solving the Blind Perspective-n-Point Problem End-To-End With Robust Differentiable Geometric Optimization." *European Conference on Computer Vision*. Springer, Cham, 2020, 18 pages.

Deng, Jia et al. "ImageNet: A Large-Scale Hierarchical Image Database" *IEEE Computer Vision and Pattern Recognition (CVPR)*, 2009, 8 pages.

Dosovitskiy, Alexey, et al. "FlowNet: Learning Optical Flow with Convolutional Networks." *Proceedings of the IEEE international conference on computer vision*. 2015, 9 pages.

Drost, Bertram, et al. "Model globally, match locally: Efficient and robust 3D object recognition." 2010 *IEEE Computer Society Conference on Computer Vision and Pattern Recognition*. IEEE, 2010.

Garrido-Jurado, Sergio, et al. "Automatic generation and detection of highly reliable fiducial markers under occlusion." *Pattern Recognition* 47.6 (2014): 390-402.

He, Kaiming, et al. "Deep Residual Learning for Image Recognition." *Proceedings of the IEEE conference on computer vision and pattern recognition*. 2016, pp. 770-778.

Horn, Berthold KP, and Brian G. Schunck. "Determining Optical Flow." *Artificial intelligence* 17.1-3 (1981): 185-203.

Huynh, Cong Phuoc et al. "Shape and Refractive Index from Single-View Spectro-Polarimetric Images," International Journal of Computer Vision, vol. 101, No. 1, pp. 64-94, Jun. 2013.

Ilg, Eddy, et al. "FlowNet 2.0: Evolution of Optical Flow Estimation with Deep Networks." *Proceedings of the IEEE conference on computer vision and pattern recognition*. 2017, pp. 2462-2470.

Jalal, Mona, et al. "SIDOD: A Synthetic Image Dataset for 3D Object Pose Recognition with Distractors." Proceedings of the IEEE/CVF Conference on Computer Vision and Pattern Recognition Workshops, 2019, 3 pages.

Kadambi, Achuta, et al. "Polarized 3D: High-Quality Depth Sensing with Polarization Cues." *Proceedings of the IEEE International Conference on Computer Vision*. 2015, pp. 3370-3378.

Kondo, Yuhi, et al. "Accurate Polarimetric BRDF for Real Polarization Scene Rendering." European Conference on Computer Vision. Springer, Cham, 2020, 17 pages.

Labbé, Yann, et al. "CosyPose: Consistent multi-view multi-object 6D pose estimation." *European Conference on Computer Vision*. Springer, Cham, 2020, 41 pages.

Lepetit, Vincent, et al. "EPnP: An Accurate O(n) Solution to the PnP Problem." *International Journal of Computer Vision* 81.2 (2009): 155, 13 pages.

Lin, Tsung-Yi, et al. "Feature Pyramid Networks for Object Detection." *Proceedings of the IEEE conference on computer vision and pattern recognition*. 2017, pp. 2117-2125.

Miyazaki, Daisuke et al. Polarization-based Inverse Rendering from a Single View. In: IEEE International Conference on Computer Vision. p. 982-987 (2003).

Möller, Tomas, and Ben Trumbore. "Fast, minimum storage ray-triangle intersection." *Journal of graphics tools* 2.1 (1997): 21-28.

Ngo Thanh, Trung, et al. "Shape and Light Directions from Shading and Polarization." Proceedings of the IEEE conference on computer vision and pattern recognition. 2015, 9 pages.

Ngo, Trung Thanh, Hajime Nagahara, and Rin-ichiro Taniguchi. "Surface Normals and Light Directions from Shading and Polarization." IEEE Transactions on Pattern Analysis and Machine Intelligence (2021), 12 pages.

Russakovsky, Olga et al., ImageNet Large Scale Visual Recognition Challenge. *IJCV*, 2015, 43 pages.

Saman, Gule et al. "Refractive Index Estimation Using Photometric Stereo," in IEEE International Conference on Image Processing (ICIP), 2011, pp. 1925-1928.

(56) References Cited

OTHER PUBLICATIONS

Smith, William A. R. et al. "Height-from-Polarisation with Unknown Lighting or Albedo," IEEE Transactions on Pattern Analysis and Machine Intelligence, vol. 41, No. 12, Dec. 2019, pp. 2875-2888.
Thilak, Vimal et al. "Polarization-based index of refraction and reflection angle estimation for remote sensing applications" Applied Optics 46(30),7527-7536 (2007).
Trabelsi, Ameni, et al. "A Pose Proposal and Refinement Network for Better 6D Object Pose Estimation." *Proceedings of the IEEE/CVF Winter Conference on Applications of Computer Vision.* 2021, pp. 2382-2391.
Wang, Jingdong, et al. "Deep High-Resolution Representation Learning for Visual Recognition." *IEEE Transactions on Pattern Analysis and Machine Intelligence* (2020), 23 pages.
Woodham, Robert, "Photometric Method for Determining Surface Orientation From Multiple Images," Optical Engineering, vol. 19, No. 1,1980, pp. 139-144.
Xiang, Yu, et al. "PoseCNN: A Convolutional Neural Network for 6D Object Pose Estimation in Cluttered Scenes." *arXiv preprint arXiv*:1711.00199 (2017), 10 pages.
Xu, Haofei, et al. "AANet: Adaptive Aggregation Network for Efficient Stereo Matching." *Proceedings of the IEEE/CVF Conference on Computer Vision and Pattern Recognition.* 2020, 10 pages.
Zakharov, Sergey, et al. "DPOD: 6D Pose Object Detector and Refiner." 2019 *IEEE/CVF International Conference on Computer Vision (ICCV).* IEEE Computer Society, 2019, 10 pages.
Zhao, Wanqing, et al. "Learning deep network for detecting 3D object keypoints and 6D poses." *Proceedings of the IEEE/CVF Conference on Computer Vision and Pattern Recognition.* 2020, 9 pages.
Zhang, Feihu, et al. "GA-Net: Guided Aggregation Net for End-to-end Stereo Matching." *Proceedings of the IEEE/CVF Conference on Computer Vision and Pattern Recognition.* 2019, pp. 185-194.
Zhang, Yinda et al. "Physically-Based Rendering for Indoor Scene Understanding Using Convolutional Neural Networks" IEEE Conference on Computer Vision and Pattern Recognition, pp. 5287-5295 (2017).
Zou, Shihao, et al. "Polarization Human Shape and Pose Dataset." arXiv preprint arXiv:2004.14899 (2020), 9 pages.
Ansari et al., "3-D Face Modeling Using Two Views and a Generic Face Model with Application to 3-D Face Recognition", Proceedings of the IEEE Conference on Advanced Video and Signal Based Surveillance, Jul. 22, 2003, 9 pgs.
Aufderheide et al., "A MEMS-based Smart Sensor System for Estimation of Camera Pose for Computer Vision Applications", Research and Innovation Conference 2011, Jul. 29, 2011, pp. 1-10.
Baker et al., "Limits on Super-Resolution and How to Break Them", IEEE Transactions on Pattern Analysis and Machine Intelligence, Sep. 2002, vol. 24, No. 9, pp. 1167-1183.
Banz et al., "Real-Time Semi-Global Matching Disparity Estimation on the GPU", IEEE Transactions on Pattern Analysis and Machine Intelligence, Sep. 2002, vol. 24, No. 9, pp. 1167-1183.
Barron et al., "Intrinsic Scene Properties from a Single RGB-D Image", 2013 IEEE Conference on Computer Vision and Pattern Recognition, Jun. 23-28, 2013, Portland, OR, USA, pp. 17-24.
Bennett et al., "Multispectral Bilateral Video Fusion", Computer Graphics (ACM SIGGRAPH Proceedings), Jul. 25, 2006, published Jul. 30, 2006, 1 pg.
Bennett et al., "Multispectral Video Fusion", Computer Graphics (ACM SIGGRAPH Proceedings), Jul. 25, 2006, published Jul. 30, 2006, 1 pg.
Berretti et al., "Face Recognition by Super-Resolved 3D Models from Consumer Depth Cameras", IEEE Transactions on Information Forensics and Security, vol. 9, No. 9, Sep. 2014, pp. 1436-1448.
Bertalmio et al., "Image Inpainting", Proceedings of the 27th Annual Conference on Computer Graphics and Interactive Techniques, 2000, ACM Pres/Addison-Wesley Publishing Co., pp. 417-424.
Bertero et al., "Super-resolution in computational imaging", Micron, Jan. 1, 2003, vol. 34, Issues 6-7, 17 pgs.
Bishop et al., "Full-Resolution Depth Map Estimation from an Aliased Plenoptic Light Field", ACCV Nov. 8, 2010, Part II, LNCS 6493, pp. 186-200.
Bishop et al., "Light Field Superresolution", Computational Photography (ICCP), 2009 IEEE International Conference, Conference Date Apr. 16-17, published Jan. 26, 2009, 9 pgs.
Bishop et al., "The Light Field Camera: Extended Depth of Field, Aliasing, and Superresolution", IEEE Transactions on Pattern Analysis and Machine Intelligence, May 2012, vol. 34, No. 5, published Aug. 18, 2011, pp. 972-986.
Blanz et al., "A Morphable Model for the Synthesis of 3D Faces", In Proceedings of ACM SIGGRAPH 1999, Jul. 1, 1999, pp. 187-194.
Borman, "Topics in Multiframe Superresolution Restoration", Thesis of Sean Borman, Apr. 2004, 282 pgs.
Borman et al., "Image Sequence Processing", Dekker Encyclopedia of Optical Engineering, Oct. 14, 2002, 81 pgs.
Borman et al, "Linear models for multi-frame super-resolution restoration under non-affine registration and spatially varying PSF", Proc. SPIE, May 21, 2004, vol. 5299, 12 pgs.
Borman et al., "Simultaneous Multi-Frame MAP Super-Resolution Video Enhancement Using Spatio-Temporal Priors", Image Processing, 1999, ICIP 99 Proceedings, vol. 3, pp. 469-473.
Borman et al., "Super-Resolution from Image Sequences—A Review", Circuits & Systems, 1998, pp. 374-378.
Borman et al., "Nonlinear Prediction Methods for Estimation of Clique Weighting Parameters in NonGaussian Image Models", Proc. SPIE, Sep. 22, 1998, vol. 3459, 9 pgs.
Borman et al., "Block-Matching Sub-Pixel Motion Estimation from Noisy, Under-Sampled Frames—An Empirical Performance Evaluation", Proc SPIE, Dec. 28, 1998, vol. 3653, 10 pgs.
Borman et al., "Image Resampling and Constraint Formulation for Multi-Frame Super-Resolution Restoration", Proc SPIE, Dec. 28, 1998, vol. 3653, 10 pgs.
Bose et al., "Superresolution and Noise Filtering Using Moving Least Squares", IEEE Transactions on Image Processing, Aug. 2006, vol. 15, Issue 8, published Jul. 17, 2006, pp. 2239-2248.
Boye et al., "Comparison of Subpixel Image Registration Algorithms", Proc. of SPIE—IS&T Electronic Imaging, Feb. 3, 2009, vol. 7246, pp. 72460X-1-72460X-9; doi: 10.1117/12.810369.
Bruckner et al., "Thin wafer-level camera lenses inspired by insect compound eyes", Optics Express, Nov. 22, 2010, vol. 18, No. 24, pp. 24379-24394.
Bruckner et al., "Artificial compound eye applying hyperacuity", Optics Express, Dec. 11, 2006, vol. 14, No. 25, pp. 12076-12084.
Bruckner et al., "Driving microoptical imaging systems towards miniature camera applications", Proc. SPIE, Micro-Optics, May 13, 2010, 11 pgs.
Bryan et al., "Perspective Distortion from Interpersonal Distance Is an Implicit Visual Cue for Social Judgments of Faces", PLOS One, vol. 7, Issue 9, Sep. 26, 2012, e45301, doi:10.1371/journal.pone. 0045301, 9 pgs.
Bulat et al., "How far are we from solving the 2D & 3D Face Alignment problem? (and a dataset of 230,000 3D facial landmarks)", arxiv.org, Cornell University Library, 201 Olin Library Cornell University Ithaca, NY 14853, Mar. 21, 2017.
Cai et al., "3D Deformable Face Tracking with a Commodity Depth Camera", Proceedings of the European Conference on Computer Vision: Part III, Sep. 5-11, 2010, 14pgs.
Capel, "Image Mosaicing and Super-resolution", Retrieved on Nov. 10, 2012, Retrieved from the Internet at URL :<http://citeseerx.ist.psu.edu/viewdoc/download?doi=10.1.1.226.2643&rep=rep1 &type= pdf>, 2001, 269 pgs.
Caron et al., "Multiple camera types simultaneous stereo calibration, Robotics and Automation (ICRA)", 2011 IEEE International Conference On, May 1, 2011 (May 1, 2011), pp. 2933-2938.
Carroll et al., "Image Warps for Artistic Perspective Manipulation", ACM Transactions on Graphics (TOG), vol. 29, No. 4, Jul. 26, 2010, Article No. 127, 9 pgs.
Chan et al., "Investigation of Computational Compound-Eye Imaging System with Super-Resolution Reconstruction", IEEE, ISASSP, Jun. 19, 2006, pp. 1177-1180.

(56) References Cited

OTHER PUBLICATIONS

Chan et al., "Extending the Depth of Field in a Compound-Eye Imaging System with Super-Resolution Reconstruction", Proceedings—International Conference on Pattern Recognition, Jan. 1, 2006, vol. 3, pp. 623-626.
Chan et al., "Super-resolution reconstruction in a computational compound-eye imaging system", Multidim. Syst. Sign. Process, published online Feb. 23, 2007, vol. 18, pp. 83-101.
Chen et al., "Interactive deformation of light fields", Symposium on Interactive 3D Graphics, 2005, pp. 139-146.
Chen et al., "KNN Matting", IEEE Transactions on Pattern Analysis and Machine Intelligence, Sep. 2013, vol. 35, No. 9, pp. 2175-2188.
Chen et al., "KNN matting", 2012 IEEE Conference on Computer Vision and Pattern Recognition, Jun. 16-21, 2012, Providence, RI, USA, pp. 869-876.
Chen et al., "Image Matting with Local and Nonlocal Smooth Priors" CVPR '13 Proceedings of the 2013 IEEE Conference on Computer Vision and Pattern Recognition, Jun. 23, 2013, pp. 1902-1907.
Chen et al., "Human Face Modeling and Recognition Through Multi-View High Resolution Stereopsis", IEEE Conference on Computer Vision and Pattern Recognition Workshop, Jun. 17-22, 2006, 6 pgs.
Collins et al., "An Active Camera System for Acquiring Multi-View Video", IEEE 2002 International Conference on Image Processing, Date of Conference: Sep. 22-25, 2002, Rochester, NY, 4 pgs.
Cooper et al., "The perceptual basis of common photographic practice", Journal of Vision, vol. 12, No. 5, Article 8, May 25, 2012, pp. 1-14.
Crabb et al., "Real-time foreground segmentation via range and color imaging", 2008 IEEE Computer Society Conference on Computer Vision and Pattern Recognition Workshops, Anchorage, AK, USA, Jun. 23-28, 2008, pp. 1-5.
Dainese et al., "Accurate Depth-Map Estimation for 3D Face Modeling", IEEE European Signal Processing Conference, Sep. 4-8, 2005, 4 pgs.
Debevec et al., "Recovering High Dynamic Range Radiance Maps from Photographs", Computer Graphics (ACM SIGGRAPH Proceedings), Aug. 16, 1997, 10 pgs.
Do, Minh N. "Immersive Visual Communication with Depth", Presented at Microsoft Research, Jun. 15, 2011, Retrieved from: http://minhdo.ece.illinois.edu/talks/ImmersiveComm.pdf, 42 pgs.
Do et al., Immersive Visual Communication, IEEE Signal Processing Magazine, vol. 28, Issue 1, Jan. 2011, DOI: 10.1109/MSP.2010.939075, Retrieved from: http://minhdo.ece.illinois.edu/publications/ImmerComm_SPM.pdf, pp. 58-66.
Dou et al., "End-to-end 3D face reconstruction with deep neural networks" arXiv:1704.05020v1, Apr. 17, 2017, 10 pgs.
Drouin et al., "Improving Border Localization of Multi-Baseline Stereo Using Border-Cut", International Journal of Computer Vision, Jul. 5, 2006, vol. 83, Issue 3, 8 pgs.
Drouin et al., "Fast Multiple-Baseline Stereo with Occlusion", Fifth International Conference on 3-D Digital Imaging and Modeling (3DIM'05), Ottawa, Ontario, Canada, Jun. 13-16, 2005, pp. 540-547.
Drouin et al., "Geo-Consistency for Wide Multi-Camera Stereo", 2005 IEEE Computer Society Conference on Computer Vision and Pattern Recognition (CVPR'05), vol. 1, Jun. 20-25, 2005, pp. 351-358.
Drulea et al., "Motion Estimation Using the Correlation Transform", IEEE Transactions on Image Processing, Aug. 2013, vol. 22, No. 8, pp. 3260-3270, first published May 14, 2013.
Duparre et al., "Microoptical artificial compound eyes—from design to experimental verification of two different concepts", Proc. of SPIE, Optical Design and Engineering II, vol. 5962, Oct. 17, 2005, pp. 59622A-1-59622A-12.
Duparre et al., Novel Optics/Micro-Optics for Miniature Imaging Systems, Proc. of SPIE, Apr. 21, 2006, vol. 6196, pp. 619607-1-619607-15.
Duparre et al., "Micro-optical artificial compound eyes", Bioinspiration & Biomimetics, Apr. 6, 2006, vol. 1, pp. R1-R16.
Duparre et al., "Artificial compound eye zoom camera", Bioinspiration & Biomimetics, Nov. 21, 2008, vol. 3, pp. 1-6.
Duparre et al., "Artificial apposition compound eye fabricated by micro-optics technology", Applied Optics, Aug. 1, 2004, vol. 43, No. 22, pp. 4303-4310.
Duparre et al., "Micro-optically fabricated artificial apposition compound eye", Electronic Imaging—Science and Technology, Prod. SPIE 5301, Jan. 2004, pp. 25-33.
Duparre et al., "Chirped arrays of refractive ellipsoidal microlenses for aberration correction under oblique incidence", Optics Express, Dec. 26, 2005, vol. 13, No. 26, pp. 10539-10551.
Duparre et al., "Artificial compound eyes—different concepts and their application to ultra flat image acquisition sensors", MOEMS and Miniaturized Systems IV, Proc. SPIE 5346, Jan. 24, 2004, pp. 89-100.
Duparre et al., "Ultra-Thin Camera Based on Artificial Apposition Compound Eyes", 10th Microoptics Conference, Sep. 1-3, 2004, 2 pgs.
Duparre et al., "Microoptical telescope compound eye", Optics Express, Feb. 7, 2005, vol. 13, No. 3, pp. 889-903.
Duparre et al., "Theoretical analysis of an artificial superposition compound eye for application in ultra flat digital image acquisition devices", Optical Systems Design, Proc. SPIE 5249, Sep. 2003, pp. 408-418.
Duparre et al., "Thin compound-eye camera", Applied Optics, May 20, 2005, vol. 44, No. 15, pp. 2949-2956.
Duparre et al., "Microoptical Artificial Compound Eyes—Two Different Concepts for Compact Imaging Systems", 11th Microoptics Conference, Oct. 30-Nov. 2, 2005, 2 pgs.
Eng et al., "Gaze correction for 3D tele-immersive communication system", IVMSP Workshop, 2013 IEEE 11th. IEEE, Jun. 10, 2013.
Fanaswala, "Regularized Super-Resolution of Multi-View Images", Retrieved on Nov. 10, 2012 (Nov. 10, 2012). Retrieved from the Internet at URL :<http://www.site.uottawa.ca/-edubois/theses/Fanaswala_thesis.pdf>, 2009, 163 pgs.
Fang et al., "Volume Morphing Methods for Landmark Based 3D Image Deformation", SPIE vol. 2710, Proc. 1996 SPIE Intl Symposium on Medical Imaging, Newport Beach, CA, Feb. 10, 1996, pp. 404-415.
Fangmin et al., "3D Face Reconstruction Based on Convolutional Neural Network", 2017 10th International Conference on Intelligent Computation Technology and Automation, Oct. 9-10, 2017, Changsha, China.
Farrell et al., "Resolution and Light Sensitivity Tradeoff with Pixel Size", Proceedings of the SPIE Electronic Imaging 2006 Conference, Feb. 2, 2006, vol. 6069, 8 pgs.
Farsiu et al., "Advances and Challenges in Super-Resolution", International Journal of Imaging Systems and Technology, Aug. 12, 2004, vol. 14, pp. 47-57.
Farsiu et al., "Fast and Robust Multiframe Super Resolution", IEEE Transactions on Image Processing, Oct. 2004, published Sep. 3, 2004, vol. 13, No. 10, pp. 1327-1344.
Farsiu et al., "Multiframe Demosaicing and Super-Resolution of Color Images", IEEE Transactions on Image Processing, Jan. 2006, vol. 15, No. 1, date of publication Dec. 12, 2005, pp. 141-159.
Fechteler et al., Fast and High Resolution 3D Face Scanning, IEEE International Conference on Image Processing, Sep. 16-Oct. 19, 2007, 4 pgs.
Fecker et al., "Depth Map Compression for Unstructured Lumigraph Rendering", Proc. SPIE 6077, Proceedings Visual Communications and Image Processing 2006, Jan. 18, 2006, pp. 60770B-1-60770B-8.
Feris et al., "Multi-Flash Stereopsis: Depth Edge Preserving Stereo with Small Baseline Illumination", IEEE Trans on PAMI, 2006, 31 pgs.
Fife et al., "A 3D Multi-Aperture Image Sensor Architecture", Custom Integrated Circuits Conference, 2006, CICC '06, IEEE, pp. 281-284.
Fife et al., "A 3MPixel Multi-Aperture Image Sensor with 0.7Mu Pixels in 0.11Mu CMOS", ISSCC 2008, Session 2, Image Sensors & Technology, 2008, pp. 48-50.

(56) References Cited

OTHER PUBLICATIONS

Fischer et al., "Optical System Design", 2nd Edition, SPIE Press, Feb. 14, 2008, pp. 49-58.
Fischer et al., "Optical System Design", 2nd Edition, SPIE Press, Feb. 14, 2008, pp. 191-198.
Garg et al., "Unsupervised CNN for Single View Depth Estimation: Geometry to the Rescue", In European Conference on Computer Vision, Springer, Cham, Jul. 2016, 16 pgs.
Gastal et al., "Shared Sampling for Real-Time Alpha Matting", Computer Graphics Forum, Eurographics 2010, vol. 29, Issue 2, May 2010, pp. 575-584.
Georgeiv et al., "Light Field Camera Design for Integral View Photography", Adobe Systems Incorporated, Adobe Technical Report, 2003, 13 pgs.
Georgiev et al., "Light-Field Capture by Multiplexing in the Frequency Domain", Adobe Systems Incorporated, Adobe Technical Report, 2003, 13 pgs.
Godard et al., "Unsupervised Monocular Depth Estimation with Left-Right Consistency", In Proceedings of the IEEE Conference on Computer Vision and Pattern Recognition, 2017, 14 pgs.
Goldman et al., "Video Object Annotation, Navigation, and Composition", In Proceedings of UIST 2008, Oct. 19-22, 2008, Monterey CA, USA, pp. 3-12.
Goodfellow et al., "Generative Adversarial Nets, 2014. Generative adversarial nets", In Advances in Neural Information Processing Systems (pp. 2672-2680).
Gortler et al., "The Lumigraph", In Proceedings of SIGGRAPH 1996, published Aug. 1, 1996, pp. 43-54.
Gupta et al., "Perceptual Organization and Recognition of Indoor Scenes from RGB-D Images", 2013 IEEE Conference on Computer Vision and Pattern Recognition, Jun. 23-28, 2013, Portland, OR, USA, pp. 564-571.
Hacohen et al., "Non-Rigid Dense Correspondence with Applications for Image Enhancement", ACM Transactions on Graphics, vol. 30, No. 4, Aug. 7, 2011, 9 pgs.
Hamilton, "JPEG File Interchange Format, Version 1.02", Sep. 1, 1992, 9 pgs.
Hardie, "A Fast Image Super-Algorithm Using an Adaptive Wiener Filter", IEEE Transactions on Image Processing, Dec. 2007, published Nov. 19, 2007, vol. 16, No. 12, pp. 2953-2964.
Hasinoff et al., "Search-and-Replace Editing for Personal Photo Collections", 2010 International Conference: Computational Photography (ICCP) Mar. 2010, pp. 1-8.
Hernandez et al., "Laser Scan Quality 3-D Face Modeling Using a Low-Cost Depth Camera", 20th European Signal Processing Conference, Aug. 27-31, 2012, Bucharest, Romania, pp. 1995-1999.
Hernandez-Lopez et al., "Detecting objects using color and depth segmentation with Kinect sensor", Procedia Technology, vol. 3, Jan. 1, 2012, pp. 196-204, XP055307680, ISSN: 2212-0173, DOI: 10.1016/j.protcy.2012.03.021.
Higo et al., "A Hand-held Photometric Stereo Camera for 3-D Modeling", IEEE International Conference on Computer Vision, 2009, pp. 1234-1241.
Hirschmuller, "Accurate and Efficient Stereo Processing by Semi-Global Matching and Mutual Information", IEEE Conference on Computer Vision and Pattern Recognition (CVPR), San Diego, CA, USA, Jun. 20-26, 2005, 8 pgs.
Hirschmuller et al., "Memory Efficient Semi-Global Matching, ISPRS Annals of the Photogrammetry", Remote Sensing and Spatial Information Sciences, vol. I-3, 2012, XXII ISPRS Congress, Aug. 25-Sep. 1, 2012, Melbourne, Australia, 6 pgs.
Holoeye Photonics AG, "Spatial Light Modulators", Oct. 2, 2013, Brochure retrieved from https://web.archive.org/web/20131002061028/http://holoeye.com/wp-content/uploads/Spatial_Light_Modulators.pdf on Oct. 13, 2017, 4 pgs.
Holoeye Photonics AG, "Spatial Light Modulators", Sep. 18, 2013, retrieved from https://web.archive.org/web/20130918113140/http://holoeye.com/spatial-light-modulators/ on Oct. 13, 2017, 4 pgs.
Holoeye Photonics AG, "LC 2012 Spatial Light Modulator (transmissive)", Sep. 18, 2013, retrieved from https://web.archive.org/web/20130918151716/http://holoeye.com/spatial-light-modulators/lc-2012-spatial-light-modulator/ on Oct. 20, 2017, 3 pgs.
Horisaki et al., "Superposition Imaging for Three-Dimensionally Space-Invariant Point Spread Functions", Applied Physics Express, Oct. 13, 2011, vol. 4, pp. 112501-1-112501-3.
Horisaki et al., "Irregular Lens Arrangement Design to Improve Imaging Performance of Compound-Eye Imaging Systems", Applied Physics Express, Jan. 29, 2010, vol. 3, pp. 022501-1-022501-3.
Horn et al., "LightShop: Interactive Light Field Manipulation and Rendering", In Proceedings of I3D, Jan. 1, 2007, pp. 121-128.
Hossain et al., "Inexpensive Construction of a 3D Face Model from Stereo Images", IEEE International Conference on Computer and Information Technology, Dec. 27-29, 2007, 6 pgs.
Hu et al., "A Quantitative Evaluation of Confidence Measures for Stereo Vision", IEEE Transactions on Pattern Analysis and Machine Intelligence, vol. 34, Issue 11, Nov. 2012, pp. 2121-2133.
Humenberger ER Al., "A Census-Based Stereo Vision Algorithm Using Modified Semi-Global Matching and Plane Fitting to Improve Matching Quality", IEEE Computer Society Conference on Computer Vision and Pattern Recognition Workshops (CVPRW), IEEE, Jun. 13-18, 2010, San Francisco, CA, 8 pgs.
Isaksen et al., "Dynamically Reparameterized Light Fields", In Proceedings of SIGGRAPH 2000, 2000, pp. 297-306.
Izadi et al., "KinectFusion: Real-time 3D Reconstruction and Interaction Using a Moving Depth Camera", UIST'11, Oct. 16-19, 2011, Santa Barbara, CA, pp. 559-568.
Jackson et al., "Large Post 3D Face Reconstruction from a Single Image via Direct Volumetric CNN Regression", arXiv: 1703.07834v2, Sep. 8, 2017, 9 pgs.
Janoch et al., "A category-level 3-D object dataset: Putting the Kinect to work", 2011 IEEE International Conference on Computer Vision Workshops (ICCV Workshops), Nov. 6-13, 2011, Barcelona, Spain, pp. 1168-1174.
Jarabo et al., "Efficient Propagation of Light Field Edits", In Proceedings of SIACG 2011, 2011, pp. 75-80.
Jiang et al., "Panoramic 3D Reconstruction Using Rotational Stereo Camera with Simple Epipolar Constraints", 2006 IEEE Computer Society Conference on Computer Vision and Pattern Recognition (CVPR'06), vol. 1, Jun. 17-22, 2006, New York, NY, USA, pp. 371-378.
Joshi, Color Calibration for Arrays of Inexpensive Image Sensors, Mitsubishi Electric Research Laboratories, Inc., TR2004-137, Dec. 2004, 6 pgs.
Joshi et al., "Synthetic Aperture Tracking: Tracking Through Occlusions", ICCV IEEE 11th International Conference on Computer Vision; Publication [online]. Oct. 2007 [retrieved Jul. 28, 2014]. Retrieved from the Internet: <URL: http://ieeexplore.ieee.org/stamp/stamp.jsp?tp=&arnumber=4409032&isnumber=4408819>, pp. 1-8.
Jourabloo, "Large-Pose Face Alignment via CNN-Based Dense 3D Model Fitting", ICCV IEEE 11th International Conference on Computer Vision; Publication [online]. Oct. 2007 [retrieved Jul. 28, 2014]. Retrieved from the Internet: <URL: http://ieeexplore.ieee.org/stamp/stamp.jsp?tp=&arnumber=4409032&isnumber=4408819>; pp. 1-8.
Kang et al., "Handling Occlusions in Dense Multi-view Stereo", Computer Vision and Pattern Recognition, 2001, vol. 1, pp. 1-103-1-110.
Keeton, "Memory-Driven Computing", Hewlett Packard Enterprise Company, Oct. 20, 2016, 45 pgs.
Kim, "Scene Reconstruction from a Light Field", Master Thesis, Sep. 1, 2010 (Sep. 1, 2010), pp. 1-72.
Kim et al., "Scene reconstruction from high spatio-angular resolution light fields", ACM Transactions on Graphics (TOG)—SIGGRAPH 2013 Conference Proceedings, vol. 32 Issue 4, Article 73, Jul. 21, 2013, 11 pages.
Kitamura et al., "Reconstruction of a high-resolution image on a compound-eye image-capturing system", Applied Optics, Mar. 10, 2004, vol. 43, No. 8, pp. 1719-1727.
Kittler et al., "3D Assisted Face Recognition: A Survey of 3D Imaging, Modelling, and Recognition Approaches", Proceedings of the IEEE Computer Society Conference on Computer Vision and Pattern Recognition, Jul. 2005, 7 pgs.

(56) References Cited

OTHER PUBLICATIONS

Konolige, Kurt "Projected Texture Stereo", 2010 IEEE International Conference on Robotics and Automation, May 3-7, 2010, pp. 148-155.
Kotsia et al., "Facial Expression Recognition in Image Sequences Using Geometric Deformation Features and Support Vector Machines", IEEE Transactions on Image Processing, Jan. 2007, vol. 16, No. 1, pp. 172-187.
Krishnamurthy et al., "Compression and Transmission of Depth Maps for Image-Based Rendering", Image Processing, 2001, pp. 828-831.
Kubota et al., "Reconstructing Dense Light Field From Array of Multifocus Images for Novel View Synthesis", IEEE Transactions on Image Processing, vol. 16, No. 1, Jan. 2007, pp. 269-279.
Kutulakos et al., "Occluding Contour Detection Using Affine Invariants and Purposive Viewpoint Control", Computer Vision and Pattern Recognition, Proceedings CVPR 94, Seattle, Washington, Jun. 21-23, 1994, 8 pgs.
Lai et al., "A Large-Scale Hierarchical Multi-View RGB-D Object Dataset", Proceedings—IEEE International Conference on Robotics and Automation, Conference Date May 9-13, 2011, 8 pgs., DOI: 10.1109/ICRA.201135980382.
Lane et al., "A Survey of Mobile Phone Sensing", IEEE Communications Magazine, vol. 48, Issue 9, Sep. 2010, pp. 140-150.
Lao et al., "3D template matching for pose invariant face recognition using 3D facial model built with isoluminance line based stereo vision", Proceedings 15th International Conference on Pattern Recognition, Sep. 3-7, 2000, Barcelona, Spain, pp. 911-916.
Lee, "NFC Hacking: The Easy Way", Defcon Hacking Conference, 2012, 24 pgs.
Lee et al., "Electroactive Polymer Actuator for Lens-Drive Unit in Auto-Focus Compact Camera Module", ETRI Journal, vol. 31, No. 6, Dec. 2009, pp. 695-702.
Lee et al., "Nonlocal matting", CVPR 2011, Jun. 20-25, 2011, pp. 2193-2200.
Lee et al., "Automatic Upright Adjustment of Photographs", IEEE Conference on Computer Vision and Pattern Recognition (CVPR), 2012, pp. 877-884.
Lensvector, "How LensVector Autofocus Works", 2010, printed Nov. 2, 2012 from http://www.lensvector.com/overview.html, 1 pg.
Levin et al., "A Closed Form Solution to Natural Image Matting", IEEE Conference on Computer Vision and Pattern Recognition (CVPR), 2006, vol. 1, pp. 61-68.
Levin et al., "Spectral Matting", 2007 IEEE Conference on Computer Vision and Pattern Recognition, Jun. 17-22, 2007, Minneapolis, MN, USA, pp. 1-8.
Levoy, "Light Fields and Computational Imaging", IEEE Computer Society, Sep. 1, 2006, vol. 39, Issue No. 8, pp. 46-55.
Levoy et al., "Light Field Rendering", Proc. ADM SIGGRAPH '96, 1996, pp. 1-12.
Li et al., "A Hybrid Camera for Motion Deblurring and Depth Map Super-Resolution", Jun. 23-28, 2008, IEEE Conference on Computer Vision and Pattern Recognition, 8 pgs. Retrieved from www.eecis.udel.edu/~jye/lab_research/08/deblur-feng.pdf on Feb. 5, 2014.
Li et al., "Fusing Images with Different Focuses Using Support Vector Machines", IEEE Transactions on Neural Networks, vol. 15, No. 6, Nov. 8, 2004, pp. 1555-1561.
Lim, "Optimized Projection Pattern Supplementing Stereo Systems", 2009 IEEE International Conference on Robotics and Automation, May 12-17, 2009, pp. 2823-2829.
Liu et al., "Virtual View Reconstruction Using Temporal Information", 2012 IEEE International Conference on Multimedia and Expo, 2012, pp. 115-120.
Lo et al., "Stereoscopic 3D Copy & Paste", ACM Transactions on Graphics, vol. 29, No. 6, Article 147, Dec. 2010, pp. 147:1-147:10.
Ma et al., "Constant Time Weighted Median Filtering for Stereo Matching and Beyond", ICCV '13 Proceedings of the 2013 IEEE International Conference on Computer Vision, IEEE Computer Society, Washington DC, USA, Dec. 1-8, 2013, 8 pgs.
Martinez et al., "Simple Telemedicine for Developing Regions: Camera Phones and Paper-Based Microfluidic Devices for Real-Time, Off-Site Diagnosis", Analytical Chemistry (American Chemical Society), vol. 80, No. 10, May 15, 2008, pp. 3699-3707.
Mcguire et al., "Defocus video matting", ACM Transactions on Graphics (TOG)—Proceedings of ACM SIGGRAPH 2005, vol. 24, Issue 3, Jul. 2005, pp. 567-576.
Medioni et al., "Face Modeling and Recognition in 3-D", Proceedings of the IEEE International Workshop on Analysis and Modeling of Faces and Gestures, 2013, 2 pgs.
Merkle et al., "Adaptation and optimization of coding algorithms for mobile 3DTV", Mobile3DTV Project No. 216503, Nov. 2008, 55 pgs.
Michael et al., "Real-time Stereo Vision: Optimizing Semi-Global Matching", 2013 IEEE Intelligent Vehicles Symposium (IV), IEEE, Jun. 23-26, 2013, Australia, 6 pgs.
Milella et al., "3D reconstruction and classification of natural environments by an autonomous vehicle using multi-baseline stereo", Intelligent Service Robotics, vol. 7, No. 2, Mar. 2, 2014, pp. 79-92.
Min et al., "Real-Time 3D Face Identification from a Depth Camera", Proceedings of the IEEE International Conference on Pattern Recognition, Nov. 11-15, 2012, 4 pgs.
Mitra et al., "Light Field Denoising, Light Field Superresolution and Stereo Camera Based Refocussing using a GMM Light Field Patch Prior", Computer Vision and Pattern Recognition Workshops (CVPRW), 2012 IEEE Computer Society Conference on Jun. 16-21, 2012, pp. 22-28.
Moreno-Noguer et al., "Active Refocusing of Images and Videos", ACM Transactions on Graphics (TOG)—Proceedings of ACM SIGGRAPH 2007, vol. 26, Issue 3, Jul. 2007, 10 pgs.
Muehlebach, "Camera Auto Exposure Control for VSLAM Applications", Studies on Mechatronics, Swiss Federal Institute of Technology Zurich, Autumn Term 2010 course, 67 pgs.
Nayar, "Computational Cameras: Redefining the Image", IEEE Computer Society, Aug. 14, 2006, pp. 30-38.
Ng, "Digital Light Field Photography", Thesis, Jul. 2006, 203 pgs.
Ng et al., "Super-Resolution Image Restoration from Blurred Low-Resolution Images", Journal of Mathematical Imaging and Vision, 2005, vol. 23, pp. 367-378.
Ng et al., "Light Field Photography with a Hand-held Plenoptic Camera", Stanford Tech Report CTSR 2005-02, Apr. 20, 2005, pp. 1-11.
Nguyen et al., "Image-Based Rendering with Depth Information Using the Propagation Algorithm", Proceedings. (ICASSP '05). IEEE International Conference on Acoustics, Speech, and Signal Processing, 2005, vol. 5, Mar. 23-23, 2005, pp. II-589-II-592.
Nguyen et al., "Error Analysis for Image-Based Rendering with Depth Information", IEEE Transactions on Image Processing, vol. 18, Issue 4, Apr. 2009, pp. 703-716.
Nishihara, H.K. "PRISM: A Practical Real-Time Imaging Stereo Matcher", Massachusetts Institute of Technology, A.I. Memo 780, May 1984, 32 pgs.
Nitta et al., "Image reconstruction for thin observation module by bound optics by using the iterative backprojection method", Applied Optics, May 1, 2006, vol. 45, No. 13, pp. 2893-2900.
Nomura et al., "Scene Collages and Flexible Camera Arrays", Proceedings of Eurographics Symposium on Rendering, Jun. 2007, 12 pgs.
Park et al., "Super-Resolution Image Reconstruction", IEEE Signal Processing Magazine, May 2003, pp. 21-36.
Park et al., "Multispectral Imaging Using Multiplexed Illumination", 2007 IEEE 11th International Conference on Computer Vision, Oct. 14-21, 2007, Rio de Janeiro, Brazil, pp. 1-8.
Park et al., "3D Face Reconstruction from Stereo Video", First International Workshop on Video Processing for Security, Jun. 7-9, 2006, Quebec City, Canada, 2006, 8 pgs.
Parkkinen et al., "Characteristic Spectra of Munsell Colors", Journal of the Optical Society of America A, vol. 6, Issue 2, Feb. 1989, pp. 318-322.
Perwass et al., "Single Lens 3D-Camera with Extended Depth-of-Field", printed from www.raytrix.de, Jan. 22, 2012, 15 pgs.

(56) References Cited

OTHER PUBLICATIONS

Pham et al., "Robust Super-Resolution without Regularization", Journal of Physics: Conference Series 124, Jul. 2008, pp. 1-19.
Philips 3D Solutions, "3D Interface Specifications, White Paper", Feb. 15, 2008, 2005-2008 Philips Electronics Nederland B.V., Philips 3D Solutions retrieved from www.philips.com/3dsolutions, 29 pgs.
Polight, "Designing Imaging Products Using Reflowable Autofocus Lenses", printed Nov. 2, 2012 from http://www.polight.no/tunable-polymer-autofocus-lens-html--11.html, 1 pg.
Pouydebasque et al., "Varifocal liquid lenses with integrated actuator, high focusing power and low operating voltage fabricated on 200 mm wafers", Sensors and Actuators A: Physical, vol. 172, Issue 1, Dec. 2011, pp. 280-286.
Protter et al., "Generalizing the Nonlocal-Means to Super-Resolution Reconstruction", IEEE Transactions on Image Processing, Dec. 2, 2008, vol. 18, No. 1, pp. 36-51.
Radtke et al., "Laser lithographic fabrication and characterization of a spherical artificial compound eye", Optics Express, Mar. 19, 2007, vol. 15, No. 6, pp. 3067-3077.
Rajan et al., "Simultaneous Estimation of Super Resolved Scene and Depth Map from Low Resolution Defocused Observations", IEEE Transactions on Pattern Analysis and Machine Intelligence, vol. 25, No. 9, Sep. 8, 2003, pp. 1-16.
Rander et al., "Virtualized Reality: Constructing Time-Varying Virtual Worlds from Real World Events", Proc. of IEEE Visualization '97, Phoenix, Arizona, Oct. 19-24, 1997, pp. 277-283, 552.
Ranjan et al., "HyperFace: A Deep Multi-Task Learning Framework for Face Detection, Landmark Localization, Pose Estimation, and Gender Recognition", May 11, 2016 (May 11, 2016), pp. 1-16.
Rhemann et al., "Fast Cost-Volume Filtering for Visual Correspondence and Beyond", IEEE Trans. Pattern Anal. Mach. Intell, 2013, vol. 35, No. 2, pp. 504-511.
Rhemann et al., "A perceptually motivated online benchmark for image matting", 2009 IEEE Conference on Computer Vision and Pattern Recognition, Jun. 20-25, 2009, Miami, FL, USA, pp. 1826-1833.
Robert et al., "Dense Depth Map Reconstruction: A Minimization and Regularization Approach which Preserves Discontinuities", European Conference on Computer Vision (ECCV), pp. 439-451, (1996).
Robertson et al., "Dynamic Range Improvement Through Multiple Exposures", In Proc. of the Int. Conf. on Image Processing, 1999, 5 pgs.
Robertson et al., "Estimation-theoretic approach to dynamic range enhancement using multiple exposures", Journal of Electronic Imaging, Apr. 2003, vol. 12, No. 2, pp. 219-228.
Roy et al., "Non-Uniform Hierarchical Pyramid Stereo for Large Images", Computer and Robot Vision, 2002, pp. 208-215.
Rusinkiewicz et al., "Real-Time 3D Model Acquisition", ACM Transactions on Graphics (TOG), vol. 21, No. 3, Jul. 2002, pp. 438-446.
Saatci et al., "Cascaded Classification of Gender and Facial Expression using Active Appearance Models", IEEE, FGR'06, 2006, 6 pgs.
Sauer et al., "Parallel Computation of Sequential Pixel Updates in Statistical Tomographic Reconstruction", ICIP 1995 Proceedings of the 1995 International Conference on Image Processing, Date of Conference: Oct. 23-26, 1995, pp. 93-96.
Scharstein et al., "High-Accuracy Stereo Depth Maps Using Structured Light", IEEE Computer Society Conference on Computer Vision and Pattern Recognition (CVPR 2003), Jun. 2003, vol. 1, pp. 195-202.
Seitz et al., "Plenoptic Image Editing", International Journal of Computer Vision 48, Conference Date Jan. 7, 1998, 29 pgs., DOI: 10.1109/ICCV.1998.710696 · Source: DBLP Conference: Computer Vision, Sixth International Conference.
Shechtman et al., "Increasing Space-Time Resolution in Video", European Conference on Computer Vision, LNCS 2350, May 28-31, 2002, pp. 753-768.
Shotton et al., "Real-time human pose recognition in parts from single depth images", CVPR 2011, Jun. 20-25, 2011, Colorado Springs, CO, USA, pp. 1297-1304.
Shum et al., "Pop-Up Light Field: An Interactive Image-Based Modeling and Rendering System", Apr. 2004, ACM Transactions on Graphics, vol. 23, No. 2, pp. 143-162, Retrieved from http://131.107.65.14/en-us/um/people/jiansun/papers/PopupLightField_TOG.pdf on Feb. 5, 2014.
Shum et al., "A Review of Image-based Rendering Techniques", Visual Communications and Image Processing 2000, May 2000, 12 pgs.
Sibbing et al., "Markerless reconstruction of dynamic facial expressions", 2009 IEEE 12TH International Conference on Computer Vision Workshops, ICCV Workshop: Kyoto, Japan, Sep. 27-Oct. 4, 2009, Institute of Electrical and Electronics Engineers, Piscataway, NJ, Sep. 27, 2009 (Sep. 27, 2009), pp. 1778-1785.
Silberman et al., "Indoor segmentation and support inference from RGBD images", ECCV'12 Proceedings of the 12th European conference on Computer Vision, vol. Part V, Oct. 7-13, 2012, Florence, Italy, pp. 746-760.
Stober, "Stanford researchers developing 3-D camera with 12,616 lenses", Stanford Report, Mar. 19, 2008, Retrieved from: http://news.stanford.edu/news/2008/march19/camera-031908.html, 5 pgs.
Stollberg et al., "The Gabor superlens as an alternative wafer-level camera approach inspired by superposition compound eyes of nocturnal insects", Optics Express, Aug. 31, 2009, vol. 17, No. 18, pp. 15747-15759.
Sun et al., "Image Super-Resolution Using Gradient Profile Prior", 2008 IEEE Conference on Computer Vision and Pattern Recognition, Jun. 23-28, 2008, 8 pgs.; DOI: 10.1109/CVPR.2008.4587659.
Taguchi et al., "Rendering-Oriented Decoding for a Distributed Multiview Coding System Using a Coset Code", Hindawi Publishing Corporation, EURASIP Journal on Image and Video Processing, vol. 2009, Article ID 251081, Online: Apr. 22, 2009, 12 pgs.
Takeda et al., "Super-resolution Without Explicit Subpixel Motion Estimation", IEEE Transaction on Image Processing, Sep. 2009, vol. 18, No. 9, pp. 1958-1975.
Tallon et al., "Upsampling and Denoising of Depth Maps via Joint-Segmentation", 20th European Signal Processing Conference, Aug. 27-31, 2012, 5 pgs.
Tanida et al., "Thin observation module by bound optics (TOMBO): concept and experimental verification", Applied Optics, Apr. 10, 2001, vol. 40, No. 11, pp. 1806-1813.
Tanida et al., "Color imaging with an integrated compound imaging system", Optics Express, Sep. 8, 2003, vol. 11, No. 18, pp. 2109-2117.
Tao et al., "Depth from Combining Defocus and Correspondence Using Light-Field Cameras", ICCV '13 Proceedings of the 2013 IEEE International Conference on Computer Vision, Dec. 1, 2013, pp. 673-680.
Taylor, "Virtual camera movement: The way of the future?", American Cinematographer, vol. 77, No. 9, Sep. 1996, pp. 93-100.
Tseng et al., "Automatic 3-D depth recovery from a single urban-scene image", 2012 Visual Communications and Image Processing, Nov. 27- 30, 2012, San Diego, CA, USA, pp. 1-6.
Uchida et al., 3D Face Recognition Using Passive Stereo Vision, IEEE International Conference on Image Processing 2005, Sep. 14, 2005, 4 pgs.
Vaish et al., "Reconstructing Occluded Surfaces Using Synthetic Apertures: Stereo, Focus and Robust Measures", 2006 IEEE Computer Society Conference on Computer Vision and Pattern Recognition (CVPR'06), vol. 2, Jun. 17-22, 2006, pp. 2331-2338.
Vaish et al., "Using Plane + Parallax for Calibrating Dense Camera Arrays", IEEE Conference on Computer Vision and Pattern Recognition (CVPR), 2004, 8 pgs.
Vaish et al., "Synthetic Aperture Focusing Using a Shear-Warp Factorization of the Viewing Transform", IEEE Workshop on A3DISS, CVPR, 2005, 8 pgs.
Van Der Wal et al., "The Acadia Vision Processor", Proceedings Fifth IEEE International Workshop on Computer Architectures for Machine Perception, Sep. 13, 2000, Padova, Italy, pp. 31-40.
Veilleux, "CCD Gain Lab: The Theory", University of Maryland, College Park-Observational Astronomy (ASTR 310), Oct. 19, 2006,

(56) References Cited

OTHER PUBLICATIONS pp. 1-5 (online), [retrieved on May 13, 2014]. Retrieved from the Internet <URL: http://www.astro.umd.edu/~veilleux/ASTR310/fall06/ccd_theory.pdf, 5 pgs.
Venkataraman et al., "PiCam: An Ultra-Thin High Performance Monolithic Camera Array", ACM Transactions on Graphics (TOG), ACM, US, vol. 32, No. 6, 1 Nov. 1, 2013, pp. 1-13.
Vetro et al., "Coding Approaches for End-To-End 3D TV Systems", Mitsubishi Electric Research Laboratories, Inc., TR2004-137, Dec. 2004, 6 pgs.
Viola et al., "Robust Real-time Object Detection", Cambridge Research Laboratory, Technical Report Series, Compaq, CRL 2001/01, Feb. 2001, Printed from: http://www.hpl.hp.com/techreports/Compaq-DEC/CRL-2001-1.pdf, 30 pgs.
Vuong et al., "A New Auto Exposure and Auto White-Balance Algorithm to Detect High Dynamic Range Conditions Using CMOS Technology", Proceedings of the World Congress on Engineering and Computer Science 2008, WCECS 2008, Oct. 22-24, 2008, 5 pgs.
Wang, "Calculation of Image Position, Size and Orientation Using First Order Properties", Dec. 29, 2010, OPTI521 Tutorial, 10 pgs.
Wang et al., "Soft scissors: an interactive tool for realtime high quality matting", ACM Transactions on Graphics (TOG)—Proceedings of ACM SIGGRAPH 2007, vol. 26, Issue 3, Article 9, Jul. 2007, 6 pg., published Aug. 5, 2007.
Wang et al., "Automatic Natural Video Matting with Depth", 15th Pacific Conference on Computer Graphics and Applications, PG '07, Oct. 29-Nov. 2, 2007, Maui, HI, USA, pp. 469-472.
Wang et al., "Image and Video Matting: A Survey", Foundations and Trends, Computer Graphics and Vision, vol. 3, No. 2, 2007, pp. 91-175.
Wang et al., "Facial Feature Point Detection: A Comprehensive Survey", arXiv: 1410.1037v1, Oct. 4, 2014, 32 pgs ..
Wetzstein et al., "Computational Plenoptic Imaging", Computer Graphics Forum, 2011, vol. 30, No. 8, pp. 2397-2426.
Wheeler et al., "Super-Resolution Image Synthesis Using Projections Onto Convex Sets in the Frequency Domain", Proc. SPIE, Mar. 11, 2005, vol. 5674, 12 pgs.
Widanagamaachchi et al., "3D Face Recognition from 2D Images: A Survey", Proceedings of the International Conference on Digital Image Computing: Techniques and Applications, Dec. 1-3, 2008, 7 pgs.
Wieringa et al., "Remote Non-invasive Stereoscopic Imaging of Blood Vessels: First In-vivo Results of a New Multispectral Contrast Enhancement Technology", Annals of Biomedical Engineering, vol. 34, No. 12, Dec. 2006, pp. 1870-1878, Published online Oct. 12, 2006.
Wikipedia, "Polarizing Filter (Photography)", retrieved from http://en.wikipedia.org/wiki/Polarizing_filter_(photography) on Dec. 12, 2012, last modified on Sep. 26, 2012, 5 pgs.
Wilburn, "High Performance Imaging Using Arrays of Inexpensive Cameras", Thesis of Bennett Wilburn, Dec. 2004, 128 pgs.
Wilburn et al., "High Performance Imaging Using Large Camera Arrays", ACM Transactions on Graphics, Jul. 2005, vol. 24, No. 3, pp. 1-12.
Wilburn et al., "High-Speed Videography Using a Dense Camera Array", Proceedings of the 2004 IEEE Computer Society Conference on Computer Vision and Pattern Recognition, 2004. CVPR 2004., vol. 2, Jun. 27-Jul. 2, 2004, pp. 294-301.
Wilburn et al., "The Light Field Video Camera", Proceedings of Media Processors 2002, SPIE Electronic Imaging, 2002, 8 pgs.
Wippermann et al., "Design and fabrication of a chirped array of refractive ellipsoidal micro-lenses for an apposition eye camera objective", Proceedings of SPIE, Optical Design and Engineering II, Oct. 15, 2005, pp. 59622C-1-59622C-11.
Wu et al., "A virtual view synthesis algorithm based on image inpainting", 2012 Third International Conference on Networking and Distributed Computing, Hangzhou, China, Oct. 21-24, 2012, pp. 153-156.
Xu, "Real-Time Realistic Rendering and High Dynamic Range Image Display and Compression", Dissertation, School of Computer Science in the College of Engineering and Computer Science at the University of Central Florida, Orlando, Florida, Fall Term 2005, 192 pgs.
Yang et al., "Superresolution Using Preconditioned Conjugate Gradient Method", Proceedings of SPIE—The International Society for Optical Engineering, Jul. 2002, 8 pgs.
Yang et al., "A Real-Time Distributed Light Field Camera", Eurographics Workshop on Rendering (2002), published Jul. 26, 2002, pp. 1-10.
Yang et al., Model-based Head Pose Tracking with Stereovision, Microsoft Research, Technical Report, MSR-TR-2001-102, Oct. 2001, 12 pgs.
Yokochi et al., "Extrinsic Camera Parameter Estimation Based-on Feature Tracking and GPS Data", 2006, Nara Institute of Science and Technology, Graduate School of Information Science, LNCS 3851, pp. 369-378.
Zbontar et al., Computing the Stereo Matching Cost with a Convolutional Neural Network, CVPR, 2015, pp. 1592-1599.
Zhang et al., "A Self-Reconfigurable Camera Array", Eurographics Symposium on Rendering, published Aug. 8, 2004, 12 pgs.
Zhang et al., "Depth estimation, spatially variant image registration, and super-resolution using a multi-lenslet camera", proceedings of SPIE, vol. 7705, Apr. 23, 2010, pp. 770505-770505-8, XP055113797 ISSN: 0277-786X, DOI: 10.1117/12.852171.
Zhang et al., "Spacetime Faces: High Resolution Capture for Modeling and Animation", ACM Transactions on Graphics, 2004, 11pgs.
Zheng et al., "Balloon Motion Estimation Using Two Frames", Proceedings of the Asilomar Conference on Signals, Systems and Computers, IEEE, Comp. Soc. Press, US, vol. 2 of 2, Nov. 4, 1991, pp. 1057-1061.
Zhu et al., "Fusion of Time-of-Flight Depth and Stereo for High Accuracy Depth Maps", 2008 IEEE Conference on Computer Vision and Pattern Recognition, Jun. 23-28, 2008, Anchorage, AK, USA, pp. 1-8.
Zomet et al., "Robust Super-Resolution", IEEE, 2001, pp. 1-6.
"File Formats Version 6", Alias Systems, 2004, 40 pgs.
"Light fields and computational photography", Stanford Computer Graphics Laboratory, Retrieved from: http://graphics.stanford.edu/projects/lightfield/, Earliest publication online: Feb. 10, 1997, 3 pgs.
"Exchangeable image file format for digital still cameras: Exif Version 2.2"_, Japan Electronics and Information Technology Industries Association, Prepared by Technical Standardization Committee on AV & IT Storage Systems and Equipment, Jeita CP-3451, Apr. 2002, Retrieved from: http://www.exif.org/Exif2-2.PDF, 154 pgs.
Ba et al., "Physics-based Neural Networks for Shape from Polarization," CoRR, Mar. 2019, arxiv.org/abs/1903.10210, 10 pages.
International Search Report and Written Opinion in International Appln. No. PCT/US2022/035130, dated Oct. 19, 2022, 17 pages.
International Preliminary Report on Patentability in International Appln. No. PCT/US2022/035130, dated Jan. 4, 2024, 10 pages.

\* cited by examiner

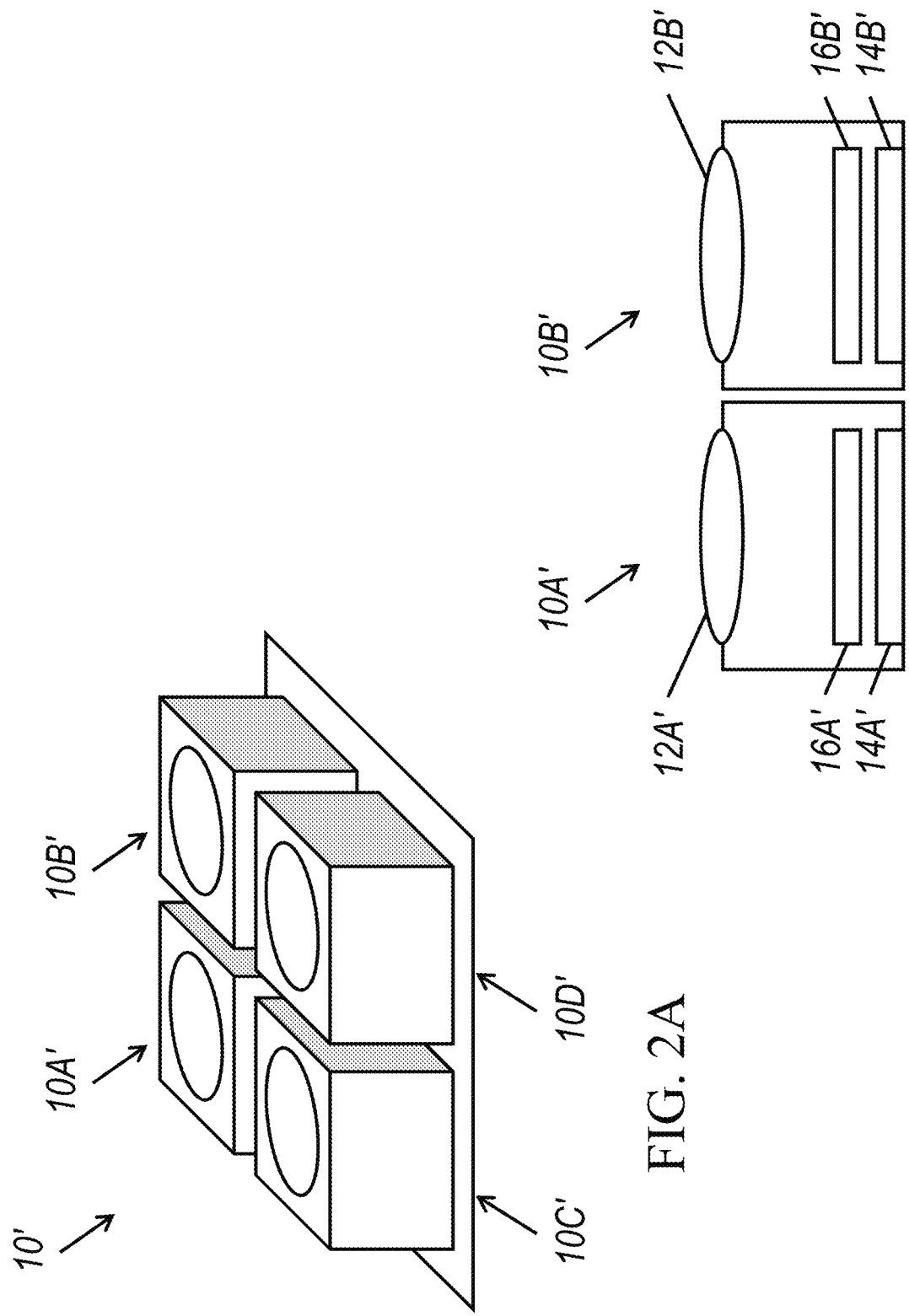

SYSTEMS AND METHODS FOR GENERATING AND USING VISUAL DATASETS FOR TRAINING COMPUTER VISION MODELS

FIELD

Aspects of embodiments of the present disclosure relate to systems and methods for generating and using visual datasets for training computer vision models including object pose detection models.

BACKGROUND

In machine learning or statistical learning, large datasets are commonly used to train models to perform predictions or estimations based on statistical patterns found in the datasets. In the case of supervised training, these datasets generally include data samples or data points represented by example inputs and their corresponding ground truth or "labels" (considering the models to operate as mathematical functions the example inputs correspond to the independent variables and the labels correspond to dependent variables).

For example, when applying machine learning in the particular field of computer vision, these datasets may include input images of a variety of different types of objects and corresponding labels such as textual descriptions of the types of objects depicted in the images and/or the locations of these objects within those images (e.g., as defined by bounding boxes or where each pixel is associated with a class of object depicted by that pixel). One example of such a dataset is ImageNet (see, e.g., J. Deng, W. Dong, R. Socher, L.-J. Li, K. Li and L. Fei-Fei, ImageNet: A Large-Scale Hierarchical Image Database. *IEEE Computer Vision and Pattern Recognition* (*CVPR*), 2009. and Olga Russakovsky*, Jia Deng*, Hao Su, Jonathan Krause, Sanjeev Satheesh, Sean Ma, Zhiheng Huang, Andrej Karpathy, Aditya Khosla, Michael Bernstein, Alexander C. Berg and Li Fei-Fei. (*=equal contribution) ImageNet Large Scale Visual Recognition Challenge. *IJCV*, 2015.), which includes images associated with concepts described by multiple words or phrases (on average, about one thousand images for each of about one hundred thousand different concepts). These visual datasets have been useful in training a wide variety of machine learning models such as deep neural networks (e.g., convolutional neural networks) to perform tasks such as image classification and image segmentation. These trained machine learning models for computer vision have been applied in a variety of areas including autonomous vehicles, robotics for manufacturing and logistics processes, detection of abnormalities in medical imaging, and the like.

SUMMARY

Aspects of embodiments of the present disclosure relate to systems and methods for generating and using visual datasets for training computer vision models including object pose detection models.

According to one embodiment of the present disclosure, a system for collecting data for training a computer vision model for shape estimation includes: an imaging system configured to capture one or more images; and a processing system including a processor and memory storing instructions that, when executed by the processor, cause the processor to: receive one or more input images from the imaging system; estimate a pose of an object depicted in the one or more images; render a shape estimate from a 3-D model of the object posed in accordance with the pose of the object; and generate a data point of a training dataset, the data point including one or more images based on the one or more input images and a label corresponding to the one or more images, the label including the shape estimate.

The imaging system may include a polarization camera system, and the one or more input images may include one or more polarization images.

The one or more polarization images may include a plurality of spectral channels corresponding to different portions of an electromagnetic spectrum.

The shape estimate may include a surface normals map rendered from the 3-D model posed in accordance with the pose of the object.

The one or more images of the data point may include the one or more polarization images.

The one or more images of the data point may include one or more polarization signatures computed based on the one or more polarization images.

The one or more images of the data point may include one or more surface normals maps computed from the one or more polarization images.

The shape estimate may include a rendered depth map.

The imaging system may include a depth camera system, and the one or more images may include one or more depth maps.

The pose of the object may be estimated based on aligning a shape of the 3-D model with the one or more depth maps.

The processing system may be further configured to estimate the pose of the object using a computer vision model trained to compute shape estimates based on the one or more input images.

The processing system may be further configured to re-train the computer vision model using the training dataset including the data point.

According to one embodiment of the present disclosure, a method for collecting data for training a computer vision model for shape estimation includes: capturing one or more images of a scene using an imaging system; receiving, by a processing system including a processor and memory, the one or more input images from the imaging system; estimating, by the processing system, a pose of an object depicted in the one or more images; rendering, by the processing system, a shape estimate from a 3-D model of the object posed in accordance with the pose of the object; and generating, by the processing system, a data point of a training dataset, the data point including one or more images based on the one or more input images and a label corresponding to the one or more images, the label including the shape estimate.

The imaging system may include a polarization camera system, and the one or more input images may include one or more polarization images.

The one or more polarization images may include a plurality of spectral channels corresponding to different portions of an electromagnetic spectrum.

The shape estimate may include a surface normals map rendered from the 3-D model posed in accordance with the pose of the object.

The one or more images of the data point may include the one or more polarization images.

The one or more images of the data point may include one or more polarization signatures computed based on the one or more polarization images.

The one or more images of the data point may include one or more surface normals maps computed from the one or more polarization images.

The shape estimate may include a rendered depth map.

The imaging system may include a depth camera system, and the one or more images may include one or more depth maps.

The pose of the object may be estimated based on aligning a shape of the 3-D model with the one or more depth maps.

The method may further include estimating the pose of the object using a computer vision model trained to compute shape estimates based on the one or more input images.

The method may further include re-training the computer vision model using the training dataset including the data point.

BRIEF DESCRIPTION OF THE DRAWINGS

The accompanying drawings, together with the specification, illustrate exemplary embodiments of the present invention, and, together with the description, serve to explain the principles of the present invention.

FIG. 2A is a perspective view of a camera array according to one embodiment of the present disclosure.

FIG. 2B is a cross sectional view of a portion of a camera array according to one embodiment of the present disclosure.

DETAILED DESCRIPTION

Figure 1A:
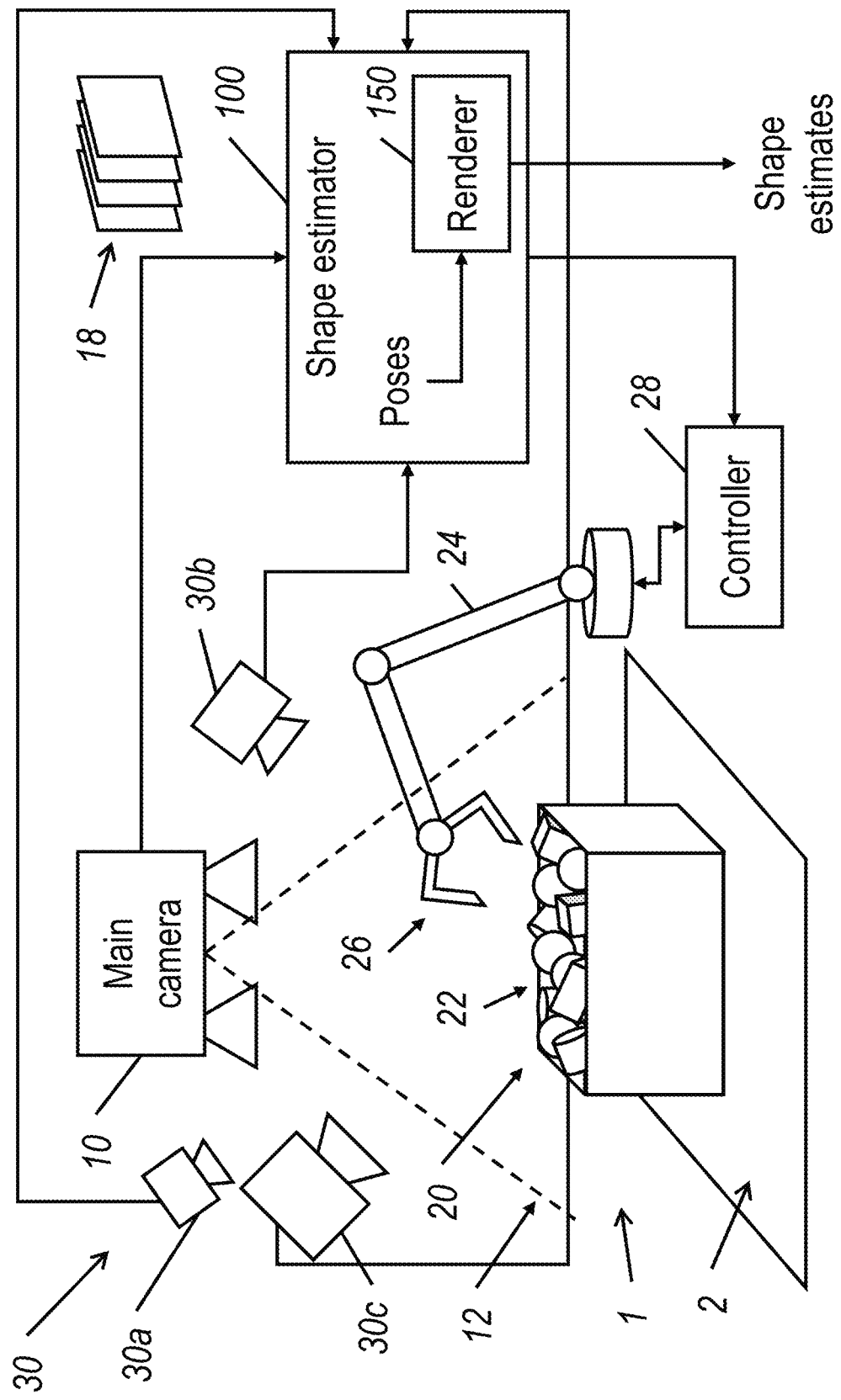
FIG. 1A is a schematic diagram depicting a pose estimation system according to one embodiment of the present disclosure.

In the following detailed description, only certain exemplary embodiments of the present invention are shown and described, by way of illustration. As those skilled in the art would recognize, the invention may be embodied in many different forms and should not be construed as being limited to the embodiments set forth herein.

Aspects of embodiments of the present disclosure relate to systems and methods for generating and using visual datasets for training computer vision models including object pose detection models and surface shape detection models. In some embodiments, these visual datasets include polarization raw frames such as images captured using a polarization camera (a camera that has a polarization filter in its optical path) and/or polarization features (e.g., Stokes vectors, degree of linear polarization (DOLP), and angle of linear polarization (AOLP)), which may be computed from polarization raw frames. These images may be associated with ground truth data relating to the shape of objects, such as clean (e.g., low noise or substantially free of noise) and high resolution surface normals maps (e.g., where each pixel or location in the surface normals map identifies the direction of the surface normals or orientation of the depicted surface as a vector in a particular coordinate system, such as a coordinate system defined with respect to the viewpoint) and depth maps (e.g., where each pixel or location in the depth map identifies the distance from the camera to the surface depicted at that pixel, where the depth map may also be interpreted as a point cloud of 3-D coordinates) and such as poses of 3-D models of objects.

Polarization imaging provides information that would not be available to comparative cameras (e.g., imaging modalities that do not include polarization filters and that therefore do not capture information about the polarization of light). This information includes detecting the shape of reflective and transparent objects, determining the surface normals of objects using Fresnel equations, and robustness to specular reflections (e.g., glare). Accordingly, the use of scene polarization information, in the form of polarization images and/or polarization features (e.g., AOLP/DOLP) provides additional information to that can be used by computer vision models to compute more accurate classifications of objects and detections of their locations, poses, and shapes.

Some embodiments of the present disclosure relate to datasets where each data sample includes images of a scene and corresponding ground truth surface normals maps and/or ground truth depth maps, point clouds, or 3-D models of the surfaces of one or more objects in the scene. The images of a scene may include images captured using one or more imaging modalities, including polarization, polarization features, color, infrared, thermal, depth maps (e.g., captured using passive stereo, active stereo with structured light, time of flight, and the like), and the like.

In some embodiments, these images also include surface normals maps computed from the images. In some cases, the surface normals maps are computed from a depth map captured using a depth camera system (e.g., by computing the slope or gradient between neighboring pixels of the captured depth map). In some cases, the surface normals maps are computed using closed form equations (e.g., the Fresnel equations) in accordance with shape-from-polarization (SfP) techniques.

Techniques for computing the shape of objects from polarization information include Polarized 3D (described in, for example, Kadambi, Achuta, et al. "Polarized 3D: High-quality depth sensing with polarization cues." *Proceedings of the IEEE International Conference on Computer Vision.* 2015.) which provides deterministic techniques for computing the surface normal field for an object based on a captured polarization signature of an object (e.g., using a polarization camera system) and a coarse approximation of a depth map (e.g., computed using a depth camera system).

While depth maps and Polarized 3D provide routes to computing surface normals maps directly from captured images (e.g., captured depth maps and/or polarization raw frames), the resulting surface normals maps generally exhibit substantial noise or artifacts in accordance with the characteristics of the underlying sensing technique. For example, depth maps captured through stereo depth camera systems may exhibit errors or noise due to ambiguities due to lack of surface texture or ambiguous surface texture, and/or depth resolution limits due to sensor resolution and feature matching constraints, thereby resulting in errors or noise in the surface normals maps computed therefrom. Surface normals maps computed through the direct application of the Fresnel equations may produce artifacts from: ambiguities that arise when determining the azimuth angle of the surface normal; refractive distortions in estimating the zenith angle; non-uniformly in the polarized lighting from the environment; texture copy artifacts when an object has multiple different unique textures; and fronto-parallel surfaces that produce noise in zenith angle estimations when they are close to zero. Furthermore, as the paper by Kadambi et al. shows, obtaining accurate surface normals through polarization is an involved process that has to address the above ambiguities in the surface normal estimations, along with constraints on depth discontinuities among other aspects. Later work by Ba et al. (Ba, Yunhao, et al. "Deep Shape from Polarization." *ECCV.* 2020.) followed up on Kadambi et al. by leveraging the physics of polarization through a deep learning network and training the network to learn the relationships between polarization signatures and the surface normal at the point of reflection while disambiguating the estimated normals in the process. This represents a significant improvement over the prior physics-based approach in that the trained network was able to resolve some of these ambiguities resulting in a reduced mean angular error (MAE) in the estimated surface normals. However, some problems remain when dealing with regions of high frequency, increased specularity, shadows and inter-reflections. In addition, the network of Ba is trained using a dataset of collected images in which the surface normals were computed from 3-D scans captured by a structured light 3-D scanner.

In contrast, the ground truth surface normals maps of datasets in accordance with some embodiments of the present disclosure provide clean (e.g., having low noise or being substantially free of noise) shape information of the objects in a scene (e.g., surface normals maps and/or depth maps) that accurately match the shapes of the objects depicted in the corresponding images. In some embodiments, these clean shape estimates are obtained by detecting the poses of known objects in a scene, aligning accurate 3-D models of those known objects based on the detected poses, and rendering the ground truth shape information based on the posed 3-D models. These approaches generally work due to the existence of accurate 3-D models representing the known objects. This is typically possible in the case where the objects are manufactured objects that are substantially uniform in shape and appearance, and where the 3-D model was created as part of the design process in designing the manufactured object and/or designing the manufacturing process for manufacturing the objects (e.g., when creating molds for injection molding or casting of the parts).

As such, datasets generated in accordance with embodiments of the present disclosure provide training data for training computer vision models to compute estimates or predictions of the shapes of objects, where the surface normals maps of the datasets exhibit lower noise and higher accuracy than comparative datasets based on observed or captured data, as opposed to synthetic datasets generated through computer simulations, such as by rending synthetic images and synthetic surface normals maps of a virtual scene using a 3-D graphics engine. In some embodiments, these datasets are used to train computer vision models (e.g., trained statistical models) to generalize from the clean data ground truth data in the training data set and thereby enable the prediction or estimation or inference of the shapes of unknown objects (e.g., objects for which the computer vision system does not have a 3-D model, such as may be the case when the objects are unique, have high variability in shape and appearance, highly diverse, or where accurate 3-D models are otherwise not available to the computer vision system).

Some aspects of embodiments of the present disclosure relate to an integrated system, including imaging hardware and an integrated physics-based deep learning system, that estimates surface normals of known objects (e.g., in a manufacturing assembly line) with very high accuracy. In some embodiments, the imaging hardware implements a multi-view, multi-spectral, and multi-modal approach to image acquisition, and the physics-based deep learning system leverages this additional information to overcome many of the shortcomings of comparative approaches.

Additional aspects of embodiments relate to systems and methods for generating a corpus of data that provides correlations between the various signatures that are captured by imaging hardware (e.g., multi-view, multi-spectral, and multi-modal images) and the final computed six degree-of-freedom (6-DoF) pose, surface normals, and depth estimate of the object in a manner that can be used to train deep learning networks to correctly detect objects and estimate their poses based on the captured signatures.

To provide some context, FIG. 1A is a schematic diagram depicting a pose estimation system according to one embodiment of the present disclosure. As shown in FIG. 1A, a main camera 10 is arranged such that its field of view 12 captures an arrangement 20 of objects 22 resting on a support platform 2 in a scene 1. In the embodiment shown in FIG. 1A, the main camera 10 is located above the support platform (e.g., spaced apart from the objects 22 along the direction of gravity), but embodiments of the present disclosure are not limited thereto—for example, the main camera 10 can be arranged to have a downward angled view of the objects 22.

In some embodiments, one or more support cameras 30 are arranged at different poses or viewpoints around the scene containing the arrangement 20 of objects 22. Accordingly, each of the support cameras 30, e.g., first support camera 30a, second support camera 30b, and third support camera 30c, captures a different view of the objects 22 from a different viewpoint (e.g., a first viewpoint, a second viewpoint, and a third viewpoint, respectively) from one another and a different viewpoint from the main camera 10. The viewpoints may be distinguished from one another in that they have substantially different optical axes, such as optical axes that are not parallel (non-parallel) to one another or that are spaced apart by a large distance if they are parallel to one another.

While FIG. 1A shows three support cameras 30, embodiments of the present disclosure are not limited thereto and may include, for example, at least one support camera 30 and may include more than three support cameras 30. In some embodiments, no support cameras are used and only a single main camera 10 is used from a single viewpoint.

In addition, while the main camera 10 is depicted in FIG. 1A as a stereo camera, embodiments of the present disclosure are not limited thereto, and may be used with, for example, a monocular main camera. As used herein, a stereo camera will be referred to as capturing images from a single viewpoint, as the camera modules of a stereo camera generally have optical axes that are substantially parallel to one another (and may be rectified to synthetically produce such parallel optical axes) and are generally spaced apart along a relatively short baseline to generate a depth map using stereo from a single viewpoint.

A shape estimator 100 according to various embodiments of the present disclosure is configured to compute or estimate shapes and/or poses of the objects 22 based on information captured by the main camera 10 and the support cameras 30. According to various embodiments of the present disclosure, the shape estimator 100 is implemented using one or more processing circuits or electronic circuits configured to perform various operations as described in more detail below. Types of electronic circuits may include a central processing unit (CPU), a graphics processing unit (GPU), an artificial intelligence (AI) accelerator (e.g., a vector processor, which may include vector arithmetic logic units configured efficiently perform operations common to neural networks, such dot products and softmax), a field programmable gate array (FPGA), an application specific integrated circuit (ASIC), a digital signal processor (DSP), or the like. For example, in some circumstances, aspects of embodiments of the present disclosure are implemented in program instructions that are stored in a non-volatile computer readable memory where, when executed by the electronic circuit (e.g., a CPU, a GPU, an AI accelerator, or combinations thereof), perform the operations described herein to compute a processing output, such as an instance segmentation map and/or 6-DoF poses, from input images 18 (including, for example, polarization raw frames or the underlying images captured by polarization cameras or cameras with polarization filters in their optical paths). The operations performed by the shape estimator 100 may be performed by a single electronic circuit (e.g., a single CPU, a single GPU, or the like) or may be allocated between multiple electronic circuits (e.g., multiple GPUs or a CPU in conjunction with a GPU). The multiple electronic circuits may be local to one another (e.g., located on a same die, located within a same package, or located within a same embedded device or computer system) and/or may be remote from one other (e.g., in communication over a network such as a local personal area network such as Bluetooth®, over a local area network such as a local wired and/or wireless network, and/or over wide area network such as the internet, such a case where some operations are performed locally and other operations are performed on a server hosted by a cloud computing service). One or more electronic circuits operating to implement the shape estimator 100 may be referred to herein as a computer or a computer system, which may include memory storing instructions that, when executed by the one or more electronic circuits, implement the systems and methods described herein.

In more detail, the main camera 10 and the support cameras 30 are configured to estimate the shapes and/or poses of objects 22 detected within their fields of view 12 (while FIG. 1A illustrates a field of view 12 for the main camera 10 using dashed lines, the fields of view of the support cameras 30 are not explicitly shown). In the embodiment shown in FIG. 1A, the objects 22 are depicted abstractly as simple three-dimensional solids such as spheres, rectangular prisms, and cylinders. However, embodiments of the present disclosure are not limited thereto and characterization of shape estimators may be performed using any arbitrary object for which a pose with respect to a camera can be clearly defined, including deformable objects mentioned above, such as flex circuits, bags or other pliable containers containing solids, liquids, and/or fluids, flexible tubing, and the like.

In particular, a "pose" refers to the position and orientation of an object with respect to a reference coordinate system. For example, a reference coordinate system may be defined with the main camera 10 at the origin, where the direction along the optical axis of the main camera 10 (e.g., a direction through the center of its field of view 12) is defined as the z-axis of the coordinate system, and the x and y axes are defined to be perpendicular to one another and perpendicular to the z-axis. (Embodiments of the present disclosure are not limited to this particular coordinate system, and a person having ordinary skill in the art would understand that poses can be mathematically transformed to equivalent representations in different coordinate systems.)

Each object 22 may also be associated with a corresponding coordinate system of its own, which is defined with respect to its particular shape. For example, a rectangular prism with sides of different lengths may have a canonical coordinate system defined where the x-axis is parallel to its shortest direction, z-axis is parallel to its longest direction, the y-axis is orthogonal to the x-axis and z-axis, and the origin is located at the centroid of the object 22.

Generally, in a three-dimensional coordinate system, objects 22 have six degrees of freedom—rotation around three axes (e.g., rotation around x-, y-, and z-axes) and translation along the three axes (e.g., translation along x-, y-, and z-axes). For the sake of clarity, symmetries of the objects 22 will not be discussed in detail herein, but may be addressed, for example, by identifying multiple possible poses with respect to different symmetries (e.g., in the case of selecting the positive versus negative directions of the z-axis of a right rectangular prism), or by ignoring some rotational components of the pose (e.g., a right cylinder is rotationally symmetric around its axis).

In some embodiments, it is assumed that a three-dimensional (3-D) model or computer aided design (CAD) model representing a canonical or ideal version of each type of object 22 in the arrangement of objects 20 is available. For example, in some embodiments of the present disclosure, the objects 22 are individual instances of manufactured components that have a substantially uniform appearance from one component to the next. Examples of such manufactured components include screws, bolts, nuts, connectors, and springs, as well as specialty parts such electronic circuit components (e.g., packaged integrated circuits, light emitting diodes, switches, resistors, and the like), laboratory supplies (e.g. test tubes, PCR tubes, bottles, caps, lids, pipette tips, sample plates, and the like), and manufactured parts (e.g., handles, switch caps, light bulbs, and the like). Accordingly, in these circumstances, a CAD model defining the ideal or canonical shape of any particular object 22 in the arrangement 20 may be used to define a coordinate system for the object (e.g., the coordinate system used in the representation of the CAD model).

Based on a reference coordinate system (or camera space, e.g., defined with respect to the pose estimation system) and an object coordinate system (or object space, e.g., defined with respect to one of the objects), the pose of the object may be considered to be a rigid transform (rotation and translation) from object space to camera space. The pose of object 1 in camera space 1 may be denoted as $P_{c_1}^1$, and the transform from object 1 space to camera space may be represented by the matrix:

$$\begin{bmatrix} R_{11} & R_{12} & R_{13} & T_1 \\ R_{21} & R_{22} & R_{23} & T_2 \\ R_{31} & R_{32} & R_{33} & T_3 \\ 0 & 0 & 0 & 1 \end{bmatrix}$$

where the rotation submatrix R:

$$R = \begin{bmatrix} R_{11} & R_{12} & R_{13} \\ R_{21} & R_{22} & R_{23} \\ R_{31} & R_{32} & R_{33} \end{bmatrix}$$

represents rotations along the three axes from object space to camera space, and the translation submatrix T:

$$T = \begin{bmatrix} T_1 \\ T_2 \\ T_3 \end{bmatrix}$$

represents translations along the three axes from object space to camera space.

If two objects—Object A and Object B—are in the same camera C coordinate frame, then the notation $P_{CA}$ is used to indicate the pose of Object A with respect to camera C and $P_{CB}$ is used to indicate the pose of Object B with respect to camera C. For the sake of convenience, it is assumed herein that the poses of objects are represented based on the reference coordinate system, so the poses of objects A and B with respect to camera space C may be denoted $P_A$ and $P_B$, respectively.

If Object A and Object B are actually the same object, but performed during different pose estimation measurements, and a residual pose $P_{err}$ or $P_{AB}$ ($P_{AB}=P_{err}$) is used to indicate a transform from pose $P_A$ to pose $P_B$, then the following relationship should hold:

$$P_A P_{err} = P_B \quad (1)$$

and therefore $$P_{err} = P_A^{-1} P_B \quad (2)$$

Ideally, assuming the object has not moved (e.g., translated or rotated) with respect to the main camera 10 between the measurements of pose estimates $P_A$ and $P_B$, then $P_A$ and $P_B$ should both be the same, and $P_{err}$ should be the identity matrix (e.g., indicating no error between the poses):

$$\begin{bmatrix} 1 & 0 & 0 & 0 \\ 0 & 1 & 0 & 0 \\ 0 & 0 & 1 & 0 \\ 0 & 0 & 0 & 1 \end{bmatrix}$$

In a similar manner, the pose of a particular object can be computed with respect to views from two different cameras. For example, images of Object A captured by a main camera C can be used to compute the pose $P_{CA}$ of Object A with respect to main camera C. Likewise, images of Object A captured by a first support camera $S_1$ can be used to compute the pose $P_{S_1A}$ of object A with respect to the support camera $S_1$. If the relative poses of main camera C and support camera $S_1$ are known, then the pose $P_{S_1A}$ can be transformed to the coordinate system of the main camera C.

Ideally, assuming that the known relative poses of main camera C and support camera $S_1$ are accurate and the poses calculated based on the data captured by the two cameras is accurate, then $P_{CA}$ and $P_{S_1A}$ should both be the same, and $P_{err}$ should be the identity matrix (e.g., indicating no error between the poses):

$$\begin{bmatrix} 1 & 0 & 0 & 0 \\ 0 & 1 & 0 & 0 \\ 0 & 0 & 1 & 0 \\ 0 & 0 & 0 & 1 \end{bmatrix}$$

Differences $P_{err}$ between the actual measured value as computed based on the estimates computed by the shape estimator 100 and the identity matrix may be considered to be errors:

$$R_{err} = \|R(P_{err})\| \quad (3)$$

$$T_{err} = \|T(P_{err})\| \quad (4)$$

where $R_{err}$ is the rotation error and $T_{err}$ is the translation error. The function R( ) converts $P_{err}$ into an axis-angle where the magnitude is the rotation difference, and the function T( ) extracts the translation component of the pose matrix.

The axis-angle representation from rotation matrix R is given by:

$$Tr(R) = 1 + 2\cos\theta \quad (5)$$

$$|\theta| = \arccos\left(\frac{Tr(R)-1}{2}\right) \quad (6)$$

where Tr( ) denotes the matrix trace (the sum of the diagonal elements of the matrix), and θ represents the angle of rotation.

Some aspects of embodiments of the present disclosure relate to computing a high accuracy pose estimate of objects 22 in a scene based on a joint estimate of the poses the objects across the main camera 10 and the support cameras 30, and/or the shapes of objects 22 in the scene 1 (e.g., the surface normals or slopes of the objects 22 in the scene and/or the 3-D coordinates of points on the surfaces of the objects), as described in more detail below.

Some aspects of embodiments of the present disclosure also relate to providing information to assist in the control of a robotic arm 24 having an end effector 26 that may be used to grasp and manipulate objects 22. The robotic arm 24, including its end effector 26, may be controlled by a robotic arm controller 28, which, in some embodiments, receives the six-degree-of-freedom poses and/or shapes of objects computed by the shape estimator 100, which may include 3-D models representing various objects 22 in the scene 1, where the 3-D models have configurations that estimate or approximate the configurations of their corresponding real-world objects, noting, for example, that the configuration of portions of the objects 22 that are occluded or otherwise not visible in the fields of view 12 of the main camera 10 and support cameras 30 may be difficult or impossible to estimate with high accuracy.

While the sensor system is generally referred to herein as including a shape estimator 100, embodiments of the present disclosure are not limited to computing shapes and poses (e.g., 6-DoF poses) of objects in a scene and may, instead of or in addition to computing 6-DoF poses, the sensor system, including one or more cameras (e.g., main camera and/or support cameras) and processing circuits may implement generalized vision systems that provide information to controller systems.

For example, a processing pipeline may include receiving images captured by sensor devices (e.g., main cameras 10 and support cameras 30) and outputting control commands for controlling a robot arm, where the processing pipeline is trained, in an end-to-end manner, based on training data that includes sensor data as input and commands for controlling the robot arm (e.g., a destination pose for the end effector 26 of the robotic arm 24) as the labels for the input training data.

As shown in FIG. 1A, the 6-DoF poses computed by the shape estimator 100 may be supplied to a renderer, which is configured to compute or render images of 3-D models posed in a virtual scene in accordance with the poses computed by the shape estimator 100, where the images are rendered from the viewpoints of virtual cameras that may correspond to the viewpoints of the main camera 10 and/or one or more support cameras 30 on the actual scene 1, such that the rendered images correspond to the estimated views of the objects 22 detected in the scene 1 and thereby provide estimates of the shape of the object, including in the case where the rendered images include rendered surface normals maps, as described in more detail below.

Sensing Hardware

In the embodiment shown in FIG. 1A, the pose estimation system includes a main camera 10 and one or more support cameras 30. In some embodiments of the present disclosure, the main camera 10 includes a stereo camera. Examples of stereo cameras include camera systems that have at least two monocular cameras spaced apart from each other along a baseline, where the monocular cameras have overlapping fields of view and optical axes that are substantially parallel to one another. While embodiments of the present disclosure will be presented herein in embodiments where the main camera 10 and the support cameras 30 are passive cameras (e.g., that are not connected to a dedicated light projector and that instead use ambient lighting or other light sources), embodiments of the present disclosure are not limited thereto and may also include circumstances where one or more active light projector are included in the camera system, thereby forming an active camera system, where the active light projector may be configured to project structured light or a pattern onto the scene. The support cameras 30 may be stereo cameras, monocular cameras, or combinations thereof (e.g., some stereo support cameras and some monocular support cameras). In some embodiments, the main camera 10 and/or one or more support cameras 30 may include one or more time-of-flight depth camera systems.

The main camera 10 and the support cameras 30 may use the same imaging modalities or different imaging modalities, and each of the main camera 10 and support cameras 30 may capture images using one or more different imaging modalities. Examples of imaging modalities include monochrome, color, infrared, ultraviolet, thermal, polarization, and combinations thereof (e.g., polarized color, polarized infrared, unpolarized ultraviolet, etc.).

Figure 1B:
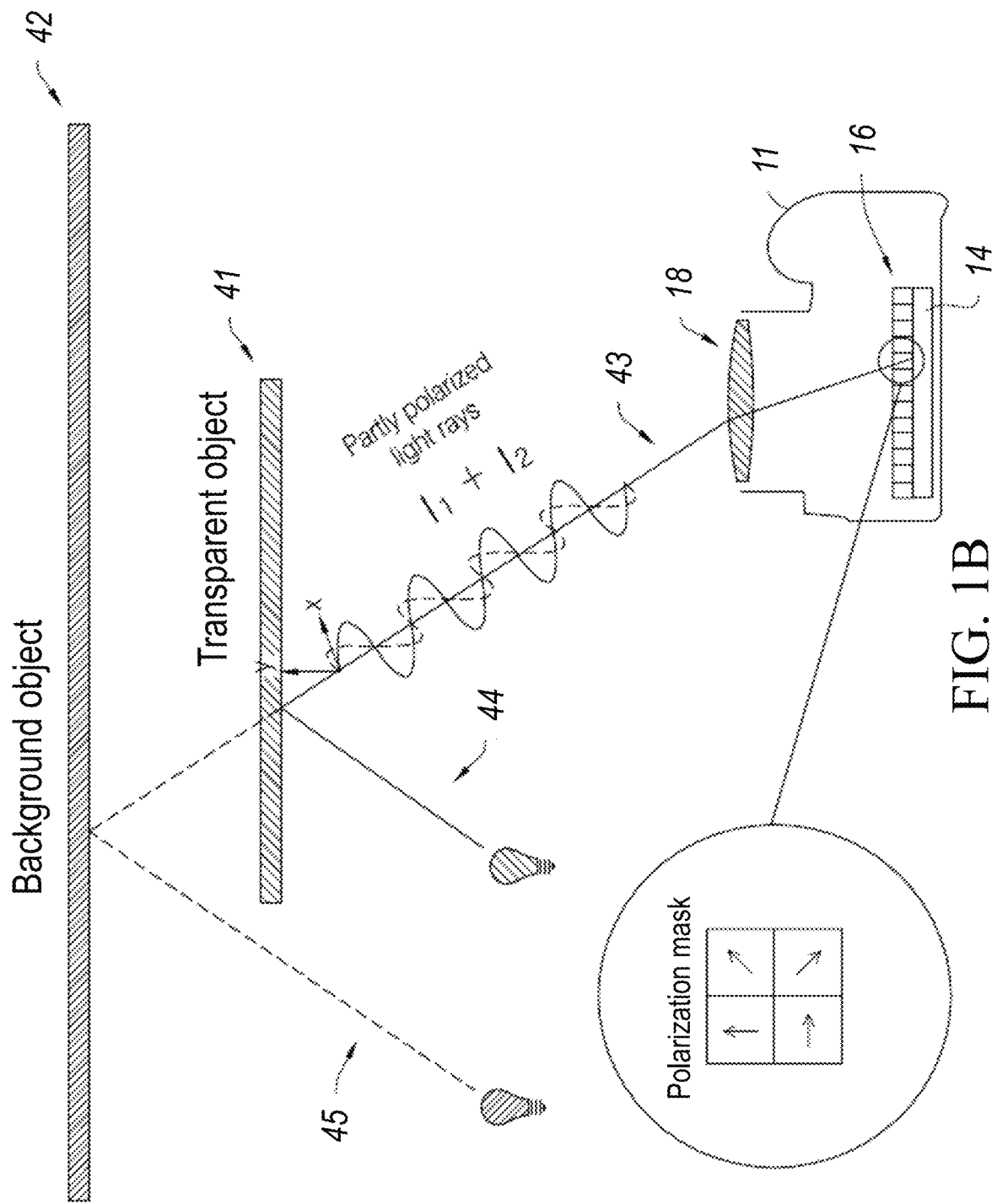
FIG. 1B is a high-level depiction of the interaction of light with transparent objects and non-transparent (e.g., diffuse and/or reflective) objects.

The interaction between light and transparent objects is rich and complex, but the material of an object determines its transparency under visible light. For many transparent household objects, the majority of visible light passes straight through and a small portion (~4% to ~8%, depending on the refractive index) is reflected. This is because light in the visible portion of the spectrum has insufficient energy to excite atoms in the transparent object. As a result, the texture (e.g., appearance) of objects behind the transparent object (or visible through the transparent object) dominate the appearance of the transparent object. For example, when looking at a transparent glass cup or tumbler on a table, the appearance of the objects on the other side of the tumbler (e.g., the surface of the table) generally dominate what is seen through the cup. This property leads to some difficulties when attempting to detect surface characteristics of transparent objects such as glass windows and glossy, transparent layers of paint, based on intensity images alone:

FIG. 1B is a high-level depiction of the interaction of light with transparent objects and non-transparent (e.g., diffuse and/or reflective) objects. As shown in FIG. 1B, in some embodiments the main camera 10 includes a polarization camera 11 that captures polarization raw frames of a scene that includes a transparent object 41 in front of an opaque background object 42. A light ray 43 hitting the image sensor 14 of the polarization camera contains polarization information from both the transparent object 41 and the background object 42. The small fraction of reflected light 44 from the transparent object 41 is heavily polarized, and thus has a large impact on the polarization measurement, in contrast to the light 45 reflected off the background object 42 and passing through the transparent object 41.

Similarly, a light ray hitting the surface of an object may interact with the shape of the surface in various ways. For example, a surface with a glossy paint may behave substantially similarly to a transparent object in front of an opaque object as shown in FIG. 1B, where interactions between the light ray and a transparent or translucent layer (or clear coat layer) of the glossy paint causes the light reflecting off of the surface to be polarized based on the characteristics of the transparent or translucent layer (e.g., based on the thickness and surface normals of the layer), which are encoded in the light ray hitting the image sensor. Similarly, as discussed in more detail below with respect to shape from polarization (SfP) theory, variations in the shape of the surface (e.g., direction of the surface normals) may cause significant changes in the polarization of light reflected by the surface of the object. For example, smooth surfaces may generally exhibit the same polarization characteristics throughout, but a scratch or a dent in the surface changes the direction of the surface normals in those areas, and light hitting scratches or dents may be polarized, attenuated, or reflected in ways different than in other portions of the surface of the object. Models of the interactions between light and matter generally consider three fundamentals: geometry, lighting, and material. Geometry is based on the shape of the material.

Lighting includes the direction and color of the lighting. Material can be parameterized by the refractive index or angular reflection/transmission of light. This angular reflection is known as a bi-directional reflectance distribution function (BRDF), although other functional forms may more accurately represent certain scenarios. For example, the bidirectional subsurface scattering distribution function (BSSRDF) would be more accurate in the context of materials that exhibit subsurface scattering (e.g. marble or wax).

A light ray 43 hitting the image sensor 14 of a polarization camera has three measurable components: the intensity of light (intensity image/I), the percentage or proportion of light that is linearly polarized (degree of linear polarization/DOLP/p), and the direction of that linear polarization (angle of linear polarization/AOLP/p). These properties encode information about the surface curvature and material of the object being imaged, which can be used by the shape estimator 100 to detect transparent objects, as described in more detail below. In some embodiments, by using one or more polarization cameras, the shape estimator 100 can detect the shapes of optically challenging objects (e.g., that include surfaces made of materials having optically challenging properties such as transparency, reflectivity, or dark matte surfaces) based on similar polarization properties of light passing through translucent objects and/or light interacting with multipath inducing objects or by non-reflective objects (e.g., matte black objects).

In more detail, the polarization camera 11 may further includes a polarizer or polarizing filter or polarization mask 16 placed in the optical path between the scene 1 and the image sensor 14. According to various embodiments of the present disclosure, the polarizer or polarization mask 16 is configured to enable the polarization camera 11 to capture images of the scene 1 with the polarizer set at various specified angles (e.g., at 45° rotations or at 60° rotations or at non-uniformly spaced rotations).

As one example, FIG. 1B depicts an embodiment where the polarization mask 16 is a polarization mosaic aligned with the pixel grid of the image sensor 14 in a manner similar to a red-green-blue (RGB) color filter (e.g., a Bayer filter) of a color camera. In a manner similar to how a color filter mosaic filters incoming light based on wavelength such that each pixel in the image sensor 14 receives light in a particular portion of the spectrum (e.g., red, green, or blue) in accordance with the pattern of color filters of the mosaic, a polarization mask 16 using a polarization mosaic filters light based on linear polarization such that different pixels receive light at different angles of linear polarization (e.g., at 0°, 45°, 90°, and 135°, or at 0°, 60° degrees, and 120°). Accordingly, the polarization camera 11 using a polarization mask 16 such as that shown in FIG. 1B is capable of concurrently or simultaneously capturing light at four different linear polarizations. One example of a polarization camera is the Blackfly® S Polarization Camera produced by FLIR® Systems, Inc. of Wilsonville, Oregon.

While the above description relates to some possible implementations of a polarization camera using a polarization mosaic, embodiments of the present disclosure are not limited thereto and encompass other types of polarization cameras that are capable of capturing images at multiple different polarizations. For example, the polarization mask 16 may have fewer than four polarizations or more than four different polarizations, or may have polarizations at different angles than those stated above (e.g., at angles of polarization of: 0°, 60°, and 120° or at angles of polarization of 0°, 30°, 60°, 90°, 120°, and 150°). As another example, the polarization mask 16 may be implemented using an electronically controlled polarization mask, such as an electro-optic modulator (e.g., may include a liquid crystal layer), where the polarization angles of the individual pixels of the mask may be independently controlled, such that different portions of the image sensor 14 receive light having different polarizations. As another example, the electro-optic modulator may be configured to transmit light of different linear polarizations when capturing different frames, e.g., so that the camera captures images with the entirety of the polarization mask set to, sequentially, to different linear polarizer angles (e.g., sequentially set to: 0 degrees; 45 degrees; 90 degrees; or 135 degrees). As another example, the polarization mask 16 may include a polarizing filter that rotates mechanically, such that different polarization raw frames are captured by the polarization camera 11 with the polarizing filter mechanically rotated with respect to the lens 18 to transmit light at different angles of polarization to image sensor 14. Furthermore, while the above examples relate to the use of a linear polarizing filter, embodiments of the present disclosure are not limited thereto and also include the use of polarization cameras that include circular polarizing filters (e.g., linear polarizing filters with a quarter wave plate). Accordingly, in various embodiments of the present disclosure, a polarization camera uses a polarizing filter to capture multiple polarization raw frames at different polarizations of light, such as different linear polarization angles and different circular polarizations (e.g., handedness).

As a result, the polarization camera 11 captures multiple input images (or polarization raw frames) of the scene including the surfaces of the objects 22. In some embodiments, each of the polarization raw frames corresponds to an image taken behind a polarization filter or polarizer at a different angle of polarization $\phi_{pol}$ (e.g., 0 degrees, 45 degrees, 90 degrees, or 135 degrees). Each of the polarization raw frames is captured from substantially the same pose with respect to the scene 1 (e.g., the images captured with the polarization filter at 0 degrees, 45 degrees, 90 degrees, or 135 degrees are all captured by a same polarization camera 11 located at a same location and orientation), as opposed to capturing the polarization raw frames from disparate locations and orientations with respect to the scene. The polarization camera 11 may be configured to detect light in a variety of different portions of the electromagnetic spectrum, such as the human-visible portion of the electromagnetic spectrum, red, green, and blue portions of the human-visible spectrum, as well as invisible portions of the electromagnetic spectrum such as infrared and ultraviolet.

FIG. 2A is a perspective view of a camera array 10' according to one embodiment of the present disclosure. FIG. 2B is a cross sectional view of a portion of a camera array 10' according to one embodiment of the present disclosure. Some aspects of embodiments of the present disclosure relate to a camera array in which multiple cameras (e.g., cameras having different imaging modalities and/or sensitivity to different spectra) are arranged adjacent to one another and in an array and may be controlled to capture images in a group (e.g., a single trigger may be used to control all of the cameras in the system to capture images concurrently or substantially simultaneously). In some embodiments, the individual cameras are arranged such that parallax shift between cameras is substantially negligible based on the designed operating distance of the camera system to objects 2 and 3 in the scene 1, where larger spacings between the cameras may be tolerated when the designed operating distance is large.

FIG. 2B shows a cross sectional view of two of the cameras or camera modules 10A' and 10B' of the camera array 10' shown in FIG. 2A. As seen in FIG. 2B, each camera or camera module (10A' and 10B') includes a corresponding lens, a corresponding image sensor, and may include one or more corresponding filters. For example, in some embodiments, camera 10A' is a visible light color camera that includes lens 12A', image sensor 14A', and color filter 16A' (e.g., a Bayer filter). In the embodiment shown in FIG. 2B, the filter 16 is located behind the lens 12 (e.g., between the lens 12 and the image sensor 14), but embodiments of the present disclosure are not limited thereto. In some embodiments, the filter 16 is located in front of the lens 12, and in some embodiments, the filter 16 may include multiple separate components, where some components are located in front of the lens and other components are located behind the lens (e.g., a polarizing filter in front of the lens 12 and a color filter behind the lens 12). In some embodiments, camera 10B' is a polarization camera that includes lens 12B', image sensor 14B', and polarizing filter 16B' (a polarization camera may also include a visible light color filter or other filter for passing a particular portion of the electromagnetic spectrum, such as an infrared filter, ultraviolet filter, and the like). In some embodiments of the present disclosure, the image sensors four cameras 10A', 10B', 10C', and 10D' are monolithically formed on a same semiconductor die, and the four cameras are located in a same housing with separate apertures for the lenses 12 corresponding to the different image sensors. Similarly, the filters 16 may correspond to different portions of a single physical layer that has different optical filter functions (e.g., different linear polarizing angles or circular polarizers, color filters with corresponding spectral response functions, and the like) in different regions of the layer (corresponding to the different cameras). In some embodiments, a filter 16 of a polarization camera includes a polarization mask 16 similar to the Sony® IMX250MZR sensor, which includes a polarization mosaic aligned with the pixel grid of the image sensor 14 in a manner similar to a red-green-blue (RGB) color filter (e.g., a Bayer filter) of a color camera. In a manner similar to how a color filter mosaic filters incoming light based on wavelength such that each pixel in the image sensor 14 receives light in a particular portion of the spectrum (e.g., red, green, or blue) in accordance with the pattern of color filters of the mosaic, a polarization mask 16 using a polarization mosaic filters light based on linear polarization such that different pixels receive light at different angles of linear polarization (e.g., at 0°, 45°, 90°, and 135°, or at 0°, 60° degrees, and 120°). Accordingly, a camera of the camera array 10' may use a polarization mask 16 to concurrently or simultaneously capture light at four different linear polarizations.

In some embodiments, a demosaicing process is used to compute separate red, green, and blue channels from the raw data. In some embodiments of the present disclosure, each polarization camera may be used without a color filter or with filters used to transmit or selectively transmit various other portions of the electromagnetic spectrum, such as infrared light.

As noted above, embodiments of the present disclosure relate to multi-modal and/or multi-spectral camera arrays. Accordingly, in various embodiments of the present disclosure, the cameras within a particular camera array include cameras configured to perform imaging in a plurality of different modalities and/or to capture information in a plurality of different spectra.

As one example, in some embodiments, the first camera 10A' is a visible light camera that is configured to capture color images in a visible portion of the electromagnetic spectrum, such as by including a Bayer color filter 16A' (and, in some cases, a filter to block infrared light), and the second camera 10B', third camera 10C', and fourth camera 10D' are polarization cameras having different polarization filters, such filters having linear polarization angles of 0°, 60°, and 120°, respectively. The polarizing filters in the optical paths of each of the cameras in the array cause differently polarized light to reach the image sensors of the cameras. The individual polarization cameras in the camera array have optical axes that are substantially perpendicular to one another, are placed adjacent to one another, and have substantially the same field of view, such that the cameras in the camera array capture substantially the same view of a scene as the visible light camera 10A', but with different polarizations. While the embodiment shown in FIG. 2A includes a 2×2 array of four cameras, three of which are polarization cameras, embodiments of the present disclosure are not limited thereto, and the camera array may more than three polarization cameras, each having a polarizing filter with a different polarization state (e.g., a camera array may have four polarization cameras along with the visible light color camera 10A', where the polarization cameras may have polarization filters with angles of linear polarization, such as 0°, 45°, 90°, and 135°). In some embodiments, one or more of the cameras may include a circular polarizer.

As another example, one or more of the cameras in the camera array 10' may operate in other imaging modalities and/or other imaging spectra, such as polarization, near infrared, far infrared, shortwave infrared (SWIR), longwave infrared (LWIR) or thermal, ultraviolet, and the like, by including appropriate filters 16 (e.g., filters that pass light having particular polarizations, near-infrared light, SWIR light, LWIR light, ultraviolet light, and the like) and/or image sensors 14 (e.g., image sensors optimized for particular wavelengths of electromagnetic radiation) for the particular modality and/or portion of the electromagnetic spectrum.

For example, in the embodiment of the camera array 10' shown in FIG. 2A, four cameras 10A', 10B', 10C', and 10D' are arranged in a 2×2 grid to form a camera array, where the four cameras have substantially parallel optical axes. In addition, the optical axes of the camera modules of the camera array are arranged close together such that the camera modules capture images from substantially the same viewpoint with respect to the objects in the scene 1. One of skill in the art would understand that the acceptable spacing between the optical axes of the camera modules within an array in order to capture images of the scene from substantially the same viewpoint depends on the working distance to objects 22 in the scene, where longer working distances allow for larger spacing between the optical axes while shorter working distances may require closer or tighter spacing between the optical axes. The four cameras may be controlled together such that they capture images substantially simultaneously. In some embodiments, the four cameras are configured to capture images using the same exposure settings (e.g., same aperture, length of exposure, and gain or "ISO" settings). In some embodiments, the exposure settings for the different cameras can be controlled independently from one another (e.g., different settings for each camera), where the shape estimator 100 jointly or holistically sets the exposure settings for the cameras based on the current conditions of the scene 1 and the characteristics of the imaging modalities and spectral responses of the cameras 10A', 10B', 10C', and 10D' of the camera array 10'.

In some embodiments, the various individual cameras of the camera array are registered with one another by determining their relative poses (or relative positions and orientations) by capturing multiple images of a calibration target, such as a checkerboard pattern, an ArUco target (see, e.g., Garrido-Jurado, Sergio, et al. "Automatic generation and detection of highly reliable fiducial markers under occlusion." *Pattern Recognition* 47.6 (2014): 390-402.) or a ChArUco target (see, e.g., An, Gwon Hwan, et al. "Charuco board-based omnidirectional camera calibration method." *Electronics* 7.12 (2018): 421.). In particular, the process of calibrating the targets may include computing intrinsic matrices characterizing the internal parameters of each camera (e.g., matrices characterizing the focal length, image sensor format, and principal point of the camera) and extrinsic matrices characterizing the pose of each camera with respect to world coordinates (e.g., matrices for performing transformations between camera coordinate space and world or scene coordinate space). Different cameras within a camera array may have image sensors with different sensor formats (e.g., aspect ratios) and/or different resolutions without limitation, and the computed intrinsic and extrinsic parameters of the individual cameras enable the shape estimator 100 to map different portions of the different images to a same coordinate space (where possible, such as where the fields of view overlap).

Figure 2C:
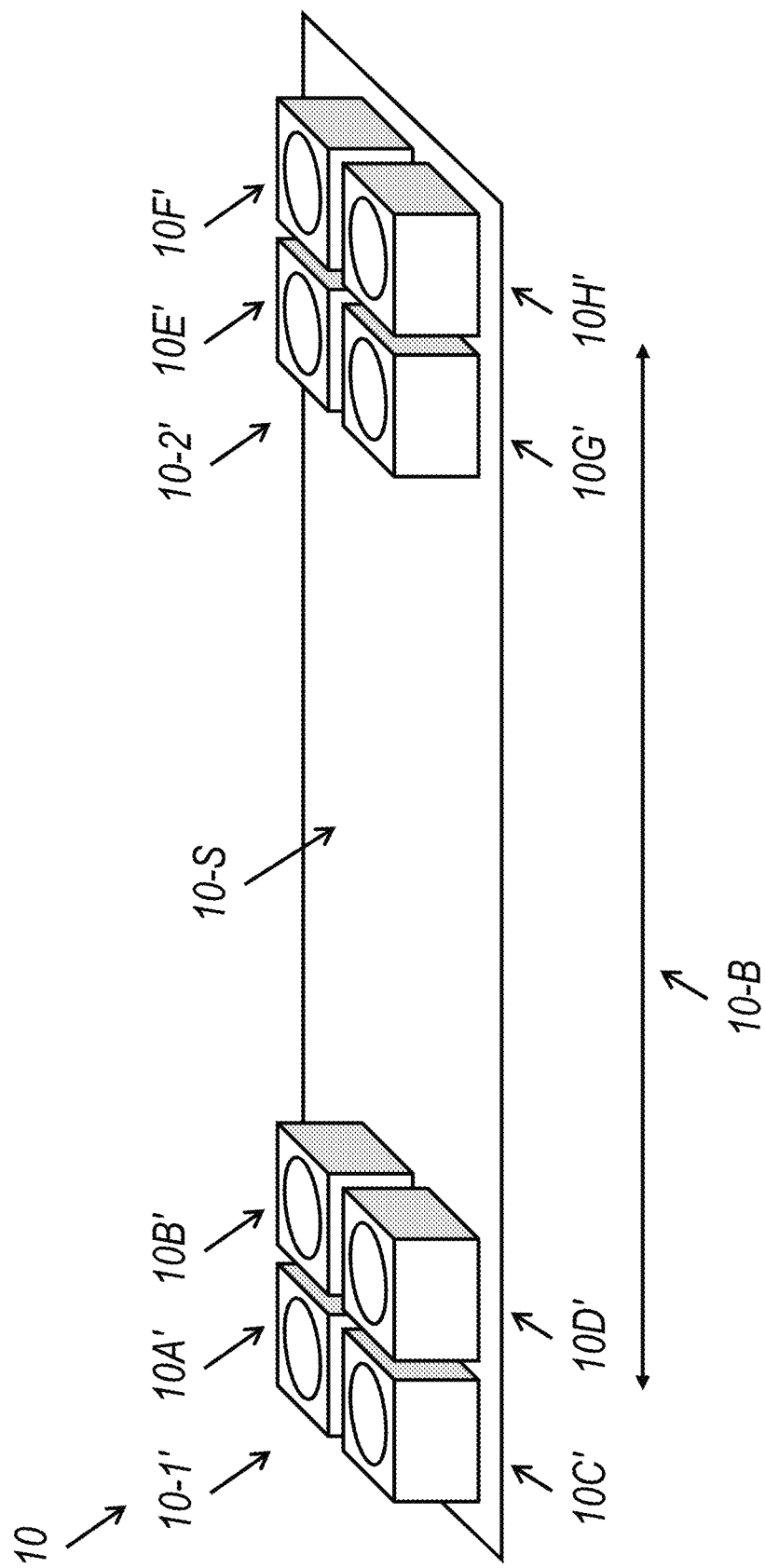
FIG. 2C is a perspective view of a stereo camera array system according to one embodiment of the present disclosure.

FIG. 2C is a perspective view of a stereo camera array system 10 according to one embodiment of the present disclosure. For some applications, stereo vision techniques are used to capture multiple images of scene from different perspectives. As noted above, in some embodiments of the present disclosure, individual cameras (or camera modules) within a camera array 10' are placed adjacent to one another such that parallax shifts between the cameras are small or substantially negligible based on the designed operating distance of the camera system to the subjects being imaged (e.g., where the parallax shifts between cameras of a same array are less than a pixel for objects at the operating distance). In addition, as noted above, in some embodiments, differences in the poses of the individual cameras within a camera array 10' are corrected through image registration based on the calibrations (e.g., computed intrinsic and extrinsic parameters) of the cameras such that the images are aligned to a same coordinate system for the viewpoint of the camera array.

In stereo camera array systems according to some embodiments, the camera arrays are spaced apart from one another such that parallax shifts between the viewpoints corresponding to the camera arrays are detectable for objects in the designed operating distance of the camera system. This enables the distances to various surfaces in a scene (the "depth") to be detected in accordance with a disparity measure or a magnitude of a parallax shift (e.g., larger parallax shifts in the locations of corresponding portions of the images indicate that those corresponding portions are on surfaces that are closer to the camera system and smaller parallax shifts indicate that the corresponding portions are on surfaces that are farther away from the camera system). These techniques for computing depth based on parallax shifts are sometimes referred to as Depth from Stereo Accordingly, FIG. 2C depicts a stereo camera array system 10 having a first camera array 10-1' and a second camera array 10-2' having substantially parallel optical axes and spaced apart along a baseline 10-B. In the embodiments shown in FIG. 2C, the first camera array 10-1' includes cameras 10A', 10B', 10C', and 10D' arranged in a 2×2 array similar to that shown in FIG. 2A and FIG. 2B. Likewise, the second camera array 10-2' includes cameras 10E', 10F', 10G', and 10H' arranged in a 2×2 array, and the overall stereo camera array system 10 includes eight individual cameras (e.g., eight separate image sensors behind eight separate lenses). In some embodiments of the present disclosure, corresponding cameras of the camera arrays 10-1' and 10-2' are of the same type or, in other words, configured to capture raw frames or images using substantially the same imaging modalities or in substantially the same spectra. In the specific embodiment shown in FIG. 2C, cameras 10A' and 10E' may be of a same first type, cameras 10B' and 10F' may be of a same second type, cameras 10C' and 10G' may be of a same third type, and cameras 10D' and 10H' may be of a same fourth type. For example, cameras 10A' and 10E' may both have linear polarizing filters at a same angle of 0°, cameras 10B' and 10F' may both have linear polarizing filters at a same angle of 45°, cameras 10C' and 10G' may both be viewpoint-independent cameras having no polarization filter (NF), such as near-infrared cameras, and cameras 10D' and 10H' may both have linear polarizing filters at a same angle of 90°. As another example, cameras 10A' and 10E' may both be viewpoint-independent cameras such as visible light cameras without polarization filters, cameras 10B' and 10F' may both be thermal cameras, cameras 10C' and 10G' may both have polarization masks with a mosaic pattern polarization filters at different angles of polarization (e.g., a repeating pattern with polarization angles of 0°, 45°, 90°, and 135°), and cameras 10D' and 10H' may both be thermal (LWIR) cameras.

While some embodiments are described above wherein each array includes cameras of different types in a same arrangement, embodiments of the present disclosure are not limited thereto. For example, in some embodiments, the arrangements of cameras within a camera array are mirrored along an axis perpendicular to the baseline 10-B. For example, cameras 10A' and 10F' may be of a same first type, cameras 10B' and 10E' may be of a same second type, cameras 10C' and 10H' may be of a same third type, and cameras 10D' and 10G' may be of a same fourth type.

In a manner similar to that described for calibrating or registering cameras within a camera array, the various polarization camera arrays of a stereo camera array system may also be registered with one another by capturing multiple images of calibration targets and computing intrinsic and extrinsic parameters for the various camera arrays. The camera arrays of a stereo camera array system 10 may be rigidly attached to a common rigid support structure 10-S in order to keep their relative poses substantially fixed (e.g., to reduce the need for recalibration to recompute their extrinsic parameters). The baseline 10-B between camera arrays is configurable in the sense that the distance between the camera arrays may be tailored based on a desired or expected operating distance to objects in a scene—when the operating distance is large, the baseline 10-B or spacing between the camera arrays may be longer, whereas the baseline 10-B or spacing between the camera arrays may be shorter (thereby allowing a more compact stereo camera array system) when the operating distance is smaller.

As noted above with respect to FIG. 1B, a light ray 43 hitting the image sensor 14 of a polarization camera 10 has three measurable components: the intensity of light (intensity image/I), the percentage or proportion of light that is linearly polarized (degree of linear polarization/DOLP/$\varphi$, and the direction of that linear polarization (angle of linear polarization/AOLP/$\phi$).

Measuring intensity I, DOLP p, and AOLP at each pixel requires 3 or more polarization raw frames of a scene taken behind polarizing filters (or polarizers) at different angles, $\phi_{pol}$ (e.g., because there are three unknown values to be determined: intensity I, DOLP $\rho$, and AOLP $\phi$. For example, a polarization camera such as those described above with respect to FIG. 1B captures polarization raw frames with four different polarization angles $\phi_{pol}$, e.g., 0 degrees, 45 degrees, 90 degrees, or 135 degrees, thereby producing four polarization raw frames $I_{\phi_{pol}}$, denoted herein as $I_0$, $I_{45}$, $I_{90}$, and $I_{135}$, and a camera module in accordance with some embodiments of FIGS. 2A, 2B, and 2C may capture polarization raw frames at three different polarization angles $\phi_{pol}$, e.g., 0 degrees, 60 degrees, and 120 degrees, thereby producing three polarization raw frames $I_{\phi_{pol}}$ denoted herein as $I_0$, $I_{60}$, and $I_{120}$.

The relationship between $I_{\phi_{pol}}$ and intensity I, DOLP $\rho$, and AOLP $\phi$ at each pixel can be expressed as:

$$I_{\phi_{pol}}=I(1+\rho \cos(2(\phi-\phi_{pol}))) \quad (7)$$

Accordingly, with four different polarization raw frames $I_{\phi_{pol}}$ ($I_0$, $I_{45}$, $I_{90}$, and $I_{135}$), a system of four equations can be used to solve for the intensity I, DOLP $\rho$, and AOLP $\phi$.

Shape from Polarization (SfP) theory (see, e.g., Gary A Atkinson and Edwin R Hancock. Recovery of surface orientation from diffuse polarization. IEEE transactions on image processing, 15(6):1653-1664, 2006.) states that the relationship between the refractive index (n), azimuth angle ($\theta_a$) and zenith angle ($\theta_z$) of the surface normal of an object and the $\phi$ and $\rho$ components of the light ray coming from that object follow the following characteristics when diffuse reflection is dominant:

$$\rho = \frac{\left(n-\frac{1}{n}\right)^2 \sin^2(\theta_z)}{2+2n^2-\left(n+\frac{1}{n}\right)^2 \sin^2\theta_z+4\cos\theta_z\sqrt{n^2-\sin^2\theta_z}} \quad (8)$$

$$\phi = \theta_a \quad (9)$$

and when the specular reflection is dominant:

$$\rho = \frac{2\sin^2\theta_z \cos\theta_z\sqrt{n^2-\sin^2\theta_z}}{n^2-\sin^2\theta_z-n^2\sin^2\theta_z+2\sin^4\theta_z} \quad (10)$$

$$\phi = \theta_a - \frac{\pi}{2} \quad (11)$$

Note that in both cases $\rho$ increases exponentially as $\theta_z$, increases and if the refractive index is the same, specular reflection is much more polarized than diffuse reflection.

Accordingly, some aspects of embodiments of the present disclosure relate to applying SfP theory to detect or measure the gradients of surfaces (e.g., the orientation of surfaces or their surface normals or directions perpendicular to the surfaces) based on the raw polarization frames of the objects, as captured by the polarization cameras among the main camera 10 and the support cameras 30. Computing these gradients produces a gradient map (or slope map or surface normals map) identifying the slope of the surface depicted at each pixel in the gradient map. These gradient maps can then be used when estimating the shape and/or pose of the object by supplying these gradient maps or surface normals maps to a trained computer vision model (e.g., a convolutional neural network) and/or by aligning a pre-existing 3-D model (e.g., CAD model) of the object with the measured surface normals (gradients or slopes) of the object in based on the slopes of the surfaces of the 3-D model, as described in more detail below.

One example of an imaging system according to embodiments of the present disclosure includes a stereo pair of 2×2 camera arrays, in an arrangement similar to that shown in FIG. 2C, Each 2×2 camera array includes three color (RGB) cameras with polarization filters at different angles to capture a diverse range of polarization signatures of the scene in the spectral bands (red, green, and blue) and fourth near-IR camera without a polarization filter to capture the scene in the near-IR spectral band. This stereo pair of 2×2 camera arrays may be combined with other cameras located at different viewpoints with respect to the scene, thereby providing a multi-view imaging system. The other cameras may also be similar stereo camera arrays (e.g., similar stereo pairs of 2×2 camera arrays) or monocular camera arrays (e.g., single camera arrays of closely-spaced camera modules), and the camera arrays, in the stereo or monocular case, may have different arrangements and numbers of camera modules in the array (e.g., a 3×2 arrangement of 6 camera modules), and where the camera modules may operate in different modalities (e.g., thermal, ultraviolet, depth from time of flight, polarization, and the like).

Pose Estimation of Known Objects Based on Captured Polarization Information

In some circumstances, the shape estimator 100 has access to 3-D models or computer aided design (CAD) models representing idealized or canonical versions of the objects 22 imaged by the imaging system. These circumstances generally correspond to conditions in which the objects 22 are standardized components that are produced in accordance with those 3-D models, and where each particular real-world instance of the object is substantially identical to each other instance and therefore can be accurately represented by its corresponding known 3-D model. The 3-D model may have been previously generated during the design of the standardized component (e.g., as part of the process of creating the molds) or may be generated through performing a 3-D scan of a part (e.g., using a laser 3-D scanner). Examples of these types of components include manufactured parts, which may be formed through injection molding (in the case of plastics) or casting (in the case of metals). Various surface treatments may be applied to the surfaces of the manufactured parts, which may cause the surfaces of the instances of the objects to have different appearances (e.g., metal parts may be plated, plastic parts may be metalized or coated in metals, various parts may be painted or dyed, and parts may be polished or roughened, and the like).

Examples of techniques for computing estimated poses of known objects for which a 3-D model is available are described in more detail in International Patent Application No. PCT/US21/15926, "Systems and Methods for Object Pose Detection and Measurement," filed in the United States Patent and Trademark Office on Jan. 29, 2021, U.S. patent application Ser. No. 17/232,084 "Systems and Methods for Six-Degree of Freedom Pose Estimation of Deformable Objects," filed in the United States Patent and Trademark Office on Apr. 15, 2021, and U.S. patent application Ser. No. 17/314,929, "System and Method for Using Computer Vision to Pick Up Small Objects," filed in the United States Patent and Trademark Office on May 7, 2021, the entire disclosures of which are incorporated by reference herein.

Generally, some approaches for computing estimated poses of known objects for which a 3-D model is available include determining a class or type of the object (e.g., a known or expected object) and aligning that corresponding 3-D model of the object (e.g., a canonical or ideal version of the object based on known design specifications of the object and/or based on the combination of a collection of samples of the object) with the various views of the object, as captured from different viewpoints around the object. The surface normals of objects in a scene, as computed directly from the polarization information or polarization signatures of surfaces in the scene, provide additional features for properly aligning the 3-D model with the pose of the real-world object in the scene.

Figure 3:
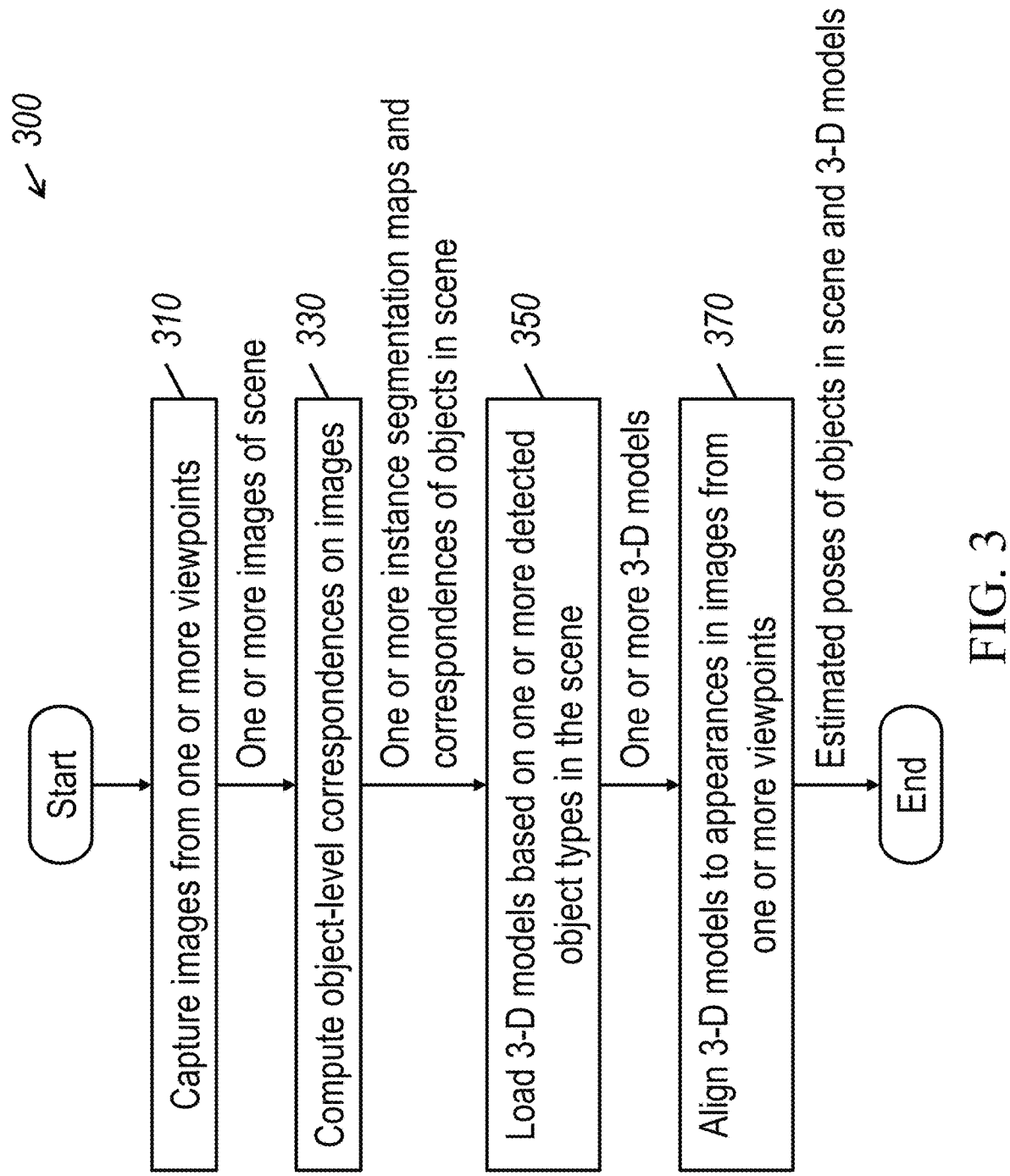
FIG. 3 is a flowchart depicting a method for computing six-degree-of-freedom (6-DoF) poses of objects according to some embodiments of the present disclosure.

FIG. 3 is a flowchart depicting a method for computing six-degree-of-freedom (6-DoF) poses of objects according to some embodiments of the present disclosure.

In operation 310, the shape estimator 100 controls one or more cameras, such as the main camera 10 and the support cameras 30, to capture one or more images of the scene, which may be from multiple viewpoints in the case of multiple cameras. In embodiments using multiple cameras, the cameras are configured to capture images concurrently or substantially simultaneously. Each camera is arranged at a different pose with respect to the scene 1, such that each camera captures scene from its corresponding different viewpoint. Accordingly, the collection of images captured by multiple cameras represent a collection of multi-viewpoint images of the scene 1. (In some embodiments, the images are captured from multiple viewpoints using one or more cameras, such as by moving the one or more cameras between different viewpoints while keeping the scene fixed, and/or rigidly transforming the scene between captures by the one or more cameras.) The one or more images of the scene may be referred to herein as being "consistent" in that they are all pictures of the same consistent scene but providing different views of the scene from different viewpoints and/or different imaging modalities. This consistency between the images of the scene may be achieved by capturing all of the images substantially simultaneously or concurrently or by requiring that none of the objects of interest in the scene that are depicted in the image have moved (e.g., translated or rotated) between in the time between the capture of different images of the scene.

In some circumstances, one or more of the "cameras" are multi-modal cameras that capture multiple images from the same viewpoint, but having different modalities, such as different portions of the electromagnetic spectrum (e.g., red, green and blue portions of the visible light spectrum, near infrared light, far infrared light, ultraviolet light, etc.), different optical filters (e.g., linear polarization filters at different angles and/or circular polarization filters), and combinations thereof. Accordingly, a collection of multi-viewpoint images of a scene does not require that all images be captured from different viewpoints, but only that there are at least two images captured from different viewpoints. Such a collection of multi-viewpoint images therefore may include at least some images that are captured from the same viewpoint.

In the case of a sensing system using multi-viewpoint images or images of a scene from more than one viewpoint, in operation 330, the shape estimator 100 computes object-level correspondences on the multi-viewpoint images of the scene. More specifically, instances of one or more types of objects are identified in the multi-viewpoint images of the scene, and corresponding instances of objects are identified between the multi-viewpoint images. For example, a scene 1 may include two cubes and three spheres, and various of the multi-viewpoint images may depict some or all of these five objects. A process of instance segmentation identifies the pixels in each of the images that depict the five objects, in addition to labeling them separately based on the type or class of object (e.g., a classification as a "sphere" or a "cube") as well as instance labels (e.g., assigning a unique label to each of the objects, such as numerical labels "1," "2," "3," "4," and "5"). Computing object-level correspondences between the multi-viewpoint images further relates to computing consistent labels between the different viewpoints (for example, such that the same cube is labeled "1" from each of the viewpoint). Accordingly, the shape estimator 100 generates collections of crops or patches of the multi-viewpoint images of the scene, where each collection of patches depicts the same instance from different viewpoints (cropped to the region containing the object and, in some cases, a small neighborhood or margin around the object).

In the case of a single image depicting a scene from a single viewpoint, in operation 330, the shape estimator 100 may merely compute a segmentation map, which similarly enables the generation of a crop or patch for each object instance detected in the image.

Systems and methods for computing object-level correspondences are described in International Patent Application No. PCT/US21/15926, titled "SYSTEMS AND METHODS FOR POSE DETECTION AND MEASUREMENT," filed in the United States Patent and Trademark Office on Jan. 29, 2021, which, as noted above, is incorporated by reference herein in its entirety. For the sake of clarity, some techniques for computing object-level correspondences on images are described herein with reference to FIGS. 4A, 4B, and 4C.

In general terms, computing object-level correspondences reduces a search space for conducting image processing tasks such as, for example, pixel-level correspondence. In one embodiment, instance segmentation is performed to identify different instances of objects in images portraying a scene as viewed from different viewpoints, and instance segmentation maps/masks may be generated in response to the instance segmentation operation. The instance segmentation masks may then be employed for computing object level correspondences.

In one embodiment, object level correspondence allows the matching of a first instance of an object appearing in a first image that depicts a view of a scene from a first viewpoint, to a second instance of the same object appearing in a second image that depicts a view of a scene from a second viewpoint. Once object level correspondence is performed, the search space for performing, for example, pixel-level correspondence, may be limited to the regions of the image that correspond to the same object. Reducing the search space in this manner may result in faster processing of pixel-level correspondence and other similar tasks.

Figure 4A:
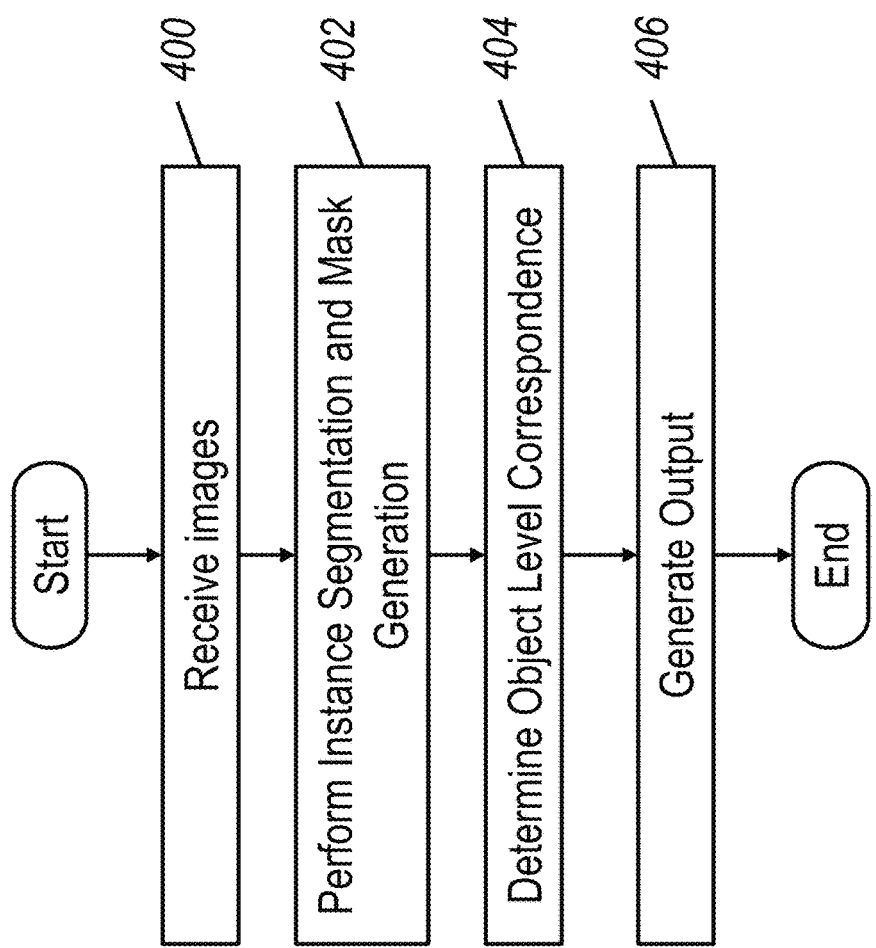
FIG. 4A is a flow diagram of a process for object level correspondence according to one embodiment.

FIG. 4A is a flow diagram of a process for object level correspondence according to one embodiment. The process may be implemented by one or more processing circuits or electronic circuits that are components of the shape estimator 100. It should be understood that the sequence of steps of the process is not fixed, but can be modified, changed in order, performed differently, performed sequentially, concurrently, or simultaneously, or altered into any desired sequence, as recognized by a person of skill in the art. The process described with respect to FIG. 4A may be used, in some embodiments of the present disclosure, to compute object level correspondences in operation 330 of FIG. 3, but embodiments of the present disclosure are not limited thereto.

The process starts, and at block 400, the shape estimator 100 receives multi-view images from the main and support cameras 10, 30. A first image captured by one of the cameras may depict one or more objects in a scene from a first viewpoint, and a second image captured by a second camera may depict the one or more objects in the scene from a second viewpoint different from the first viewpoint. The images captured by the cameras may be, for example, polarized images and/or images that have not undergone any polarization filtering.

At block 402 the shape estimator 100 performs instance segmentation and mask generation based on the captured images. In this regard, the shape estimator 100 classifies various regions (e.g. pixels) of an image captured by a particular camera 10, 30 as belonging to particular classes of objects. Each of the different instances of the objects in the image may also be identified, and unique labels be applied to each of the different instances of objects, such as by separately labeling each object in the image with a different identifier.

In one embodiment, segmentation masks delineating the various object instances are also be generated. Each segmentation mask may be a 2-D image having the same dimensions as the input image, where the value of each pixel may correspond to a label (e.g. a particular instance of the object depicted by the pixel). A different segmentation mask may be generated for different images depicting different viewpoints of the objects of interest. For example, a first segmentation mask may be generated to depict object instances in a first image captured by a first camera, and a second segmentation mask may be generated to depict object instances in a second image captured by a second camera. As convolutional neural network such as, for example, Mask R-CNN, may be employed for generating the segmentation masks.

At block 404, the shape estimator 100 engages in object-level correspondence of the objects identified in the segmentation masks. In this regard, the shape estimator may invoke a matching algorithm to identify a segmented instance of a particular object in one image as corresponding (or matching) a segmented instance of the same object in another image. The matching algorithm may be constrained to search for matching object instances along an epipolar line through an object instance in one image to find a corresponding object instance in a different image. In one embodiment, the matching algorithm compares different features of the regions corresponding to the segmented object instances to estimate the object correspondence. The matching of object instances from one image to another may narrow a search space for other image processing tasks such as, for example, performing pixel level correspondence or keypoint correspondence. The search space may be narrowed to the identified regions of the images that are identified as corresponding to the same object.

At block 406, the shape estimator 100 generates an output based on the object-level correspondence. The output may be, for example, a measure of disparity or an estimated depth (e.g., distance from the cameras 10, 30) of the object based on the disparity between corresponding instances as depicted in the various images. In one embodiment, the output is a three-dimensional reconstruction of the configuration of the object and a 6-DoF pose of the object, as described in more detail below with respect to FIG. 3.

Figure 4B:
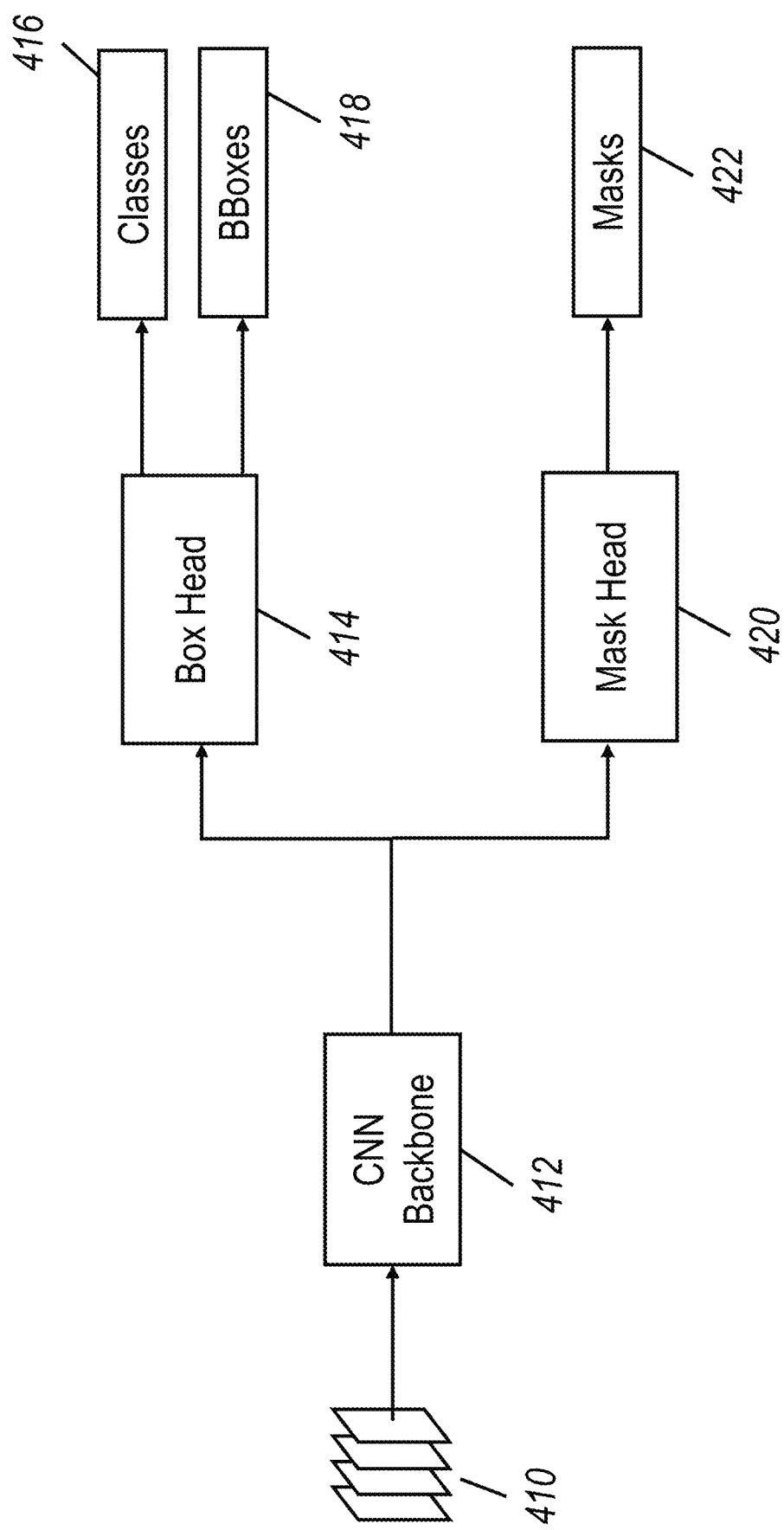
FIG. 4B is a block diagram of an architecture for instance segmentation and mask generation according to one embodiment.

FIG. 4B is a block diagram of an architecture for instance segmentation and mask generation of step 402 according to one embodiment. Input images 410 captured by the various cameras 10, 30 are provided to a deep learning network 412 such as, for example, a CNN backbone. In the embodiments where the images include polarized images, the deep learning network may be implemented as a Polarized CNN backbone as described in PCT Patent Application No. PCT/US2020/048604, also filed as U.S. patent application Ser. No. 17/266,046, the content of which is incorporated herein by reference.

In one embodiment, the deep learning network 412 is configured to generate feature maps based on the input images 410, and employ a region proposal network (RPN) to propose regions of interest from the generated feature maps. The proposals by the CNN backbone may be provided to a box head 414 for performing classification and bounding box regression. In one embodiment, the classification outputs a class label 416 for each of the object instances in the input images 410, and the bounding box regression predicts bounding boxes 418 for the classified objects. In one embodiment, a different class label 416 is provided to each instance of an object.

The proposals by the CNN backbone may also be provided to a mask head 420 for generating instance segmentation masks. The mask head 416 may be implemented as a fully convolutional network (FCN). In one embodiment, the mask head 420 is configured to encode a binary mask for each of the object instances in the input images 410.

Figure 4C:
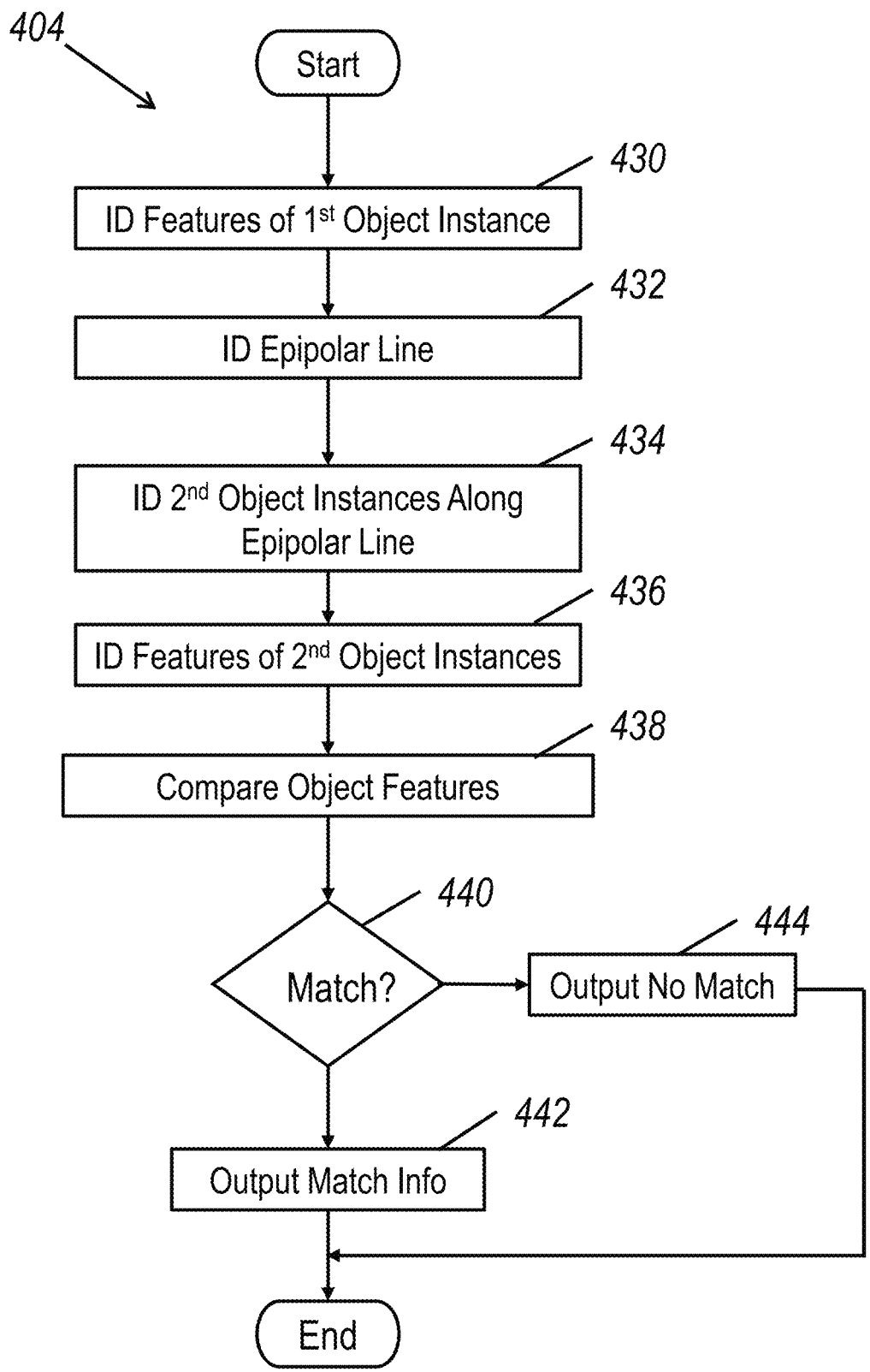
FIG. 4C is a more detailed flow diagram of a matching algorithm for identifying object-level correspondence for a particular object instance in a first segmentation mask according to one embodiment.

FIG. 4C is a more detailed flow diagram of a matching algorithm employed at step 404 (FIG. 4A) for identifying object-level correspondence for a particular object instance in a first segmentation mask according to one embodiment. The process may repeat for all object instance identified in the first segmentation mask. The sequence of steps of the process of FIG. 4C is not fixed, but can be modified, changed in order, performed differently, performed sequentially, concurrently, or simultaneously, or altered into any desired sequence, as recognized by a person of skill in the art.

At block 430, the matching algorithm identifies features of a first object instance in a first segmentation mask. The identified features for the first object instance may include a shape of the region of the object instance, a feature vector in the region, and/or keypoint predictions in the region. The shape of the region for the first object instance may be represented via a set of points sampled along the contours of the region. Where a feature vector in the region is used as the feature descriptor, the feature vector may be an average deep learning feature vector extracted via a convolutional neural network.

At block 432, the matching algorithm identifies an epipolar line through the first object instance in the first segmentation mask.

At block 434, the matching algorithm identifies one or more second object instances in a second segmentation mask that may correspond to the first object instance. A search for the second object instances may be constrained to the epipolar line between the first segmentation map and the second segmentation map that runs through the first object instance. In one embodiment, the matching algorithm searches approximately along the identified epiploar line to identify object instances in the second segmentation mask having a same class identifier as the first object instance. For example, if the first object instance belongs to a "dog" class, the matching algorithm evaluates object instances in the second segmentation mask that also belong to the "dog" class, and ignores objects that belong to a different class (e.g., a "cat" class).

At block 436, the matching algorithm identifies the features of the second object instances that belong the same class. As with the first object instance, the features of a particular second object instance may include a shape of the region of the second object instance, a feature vector representing the region, and/or keypoint predictions in the region.

At block 438, the matching algorithm compares the features of the first object instance to the features of second object instances for determining a match. In one embodiment, the matching algorithm identifies a fit between the features of the first object instance and features of the second object instances for selecting a best fit. In one embodiment, the best fit may be identified via a matching function such as the Hungarian matching function. In one embodiment, the features of the object instances are represented as probability distributions, and the matching function attempts to find a match of the probability distributions that minimizes a Kullback-Leibler (KL) divergence.

At block 440, a determination is made as to whether a match has been found. If the answer is YES, an output is generated at block 442. The output may include, for example, information (e.g. object ID) of the second object instance that matched the first object instance.

If the answer is NO, an output may be generate indicating a match failure at block 444.

Accordingly, object level correspondences can be computed from the multi-viewpoint images. These object level correspondences may be used to extract corresponding crops or patches from the multi-viewpoint images, where each of these crops or patches depicts a single instance of an object, and collections of corresponding crops or patches depict the same instance of an object from multiple viewpoints.

In operation 350, the shape estimator 100 loads a 3-D model of the object based on the detected object type one or more object detected in the scene (e.g., for each detected instance of a type of object). For example, in a circumstance where the collection of objects 22 includes a mixture of different types of flexible printed circuit boards, the process of computing object-level correspondences assigns both an instance identifier and a type (or classification) to each detected instance of a flexible printed circuit board (e.g., which of the different types of printed circuit boards). Therefore, a 3-D model of the object may then be loaded from a library based on the detected object type.

In operation 370, the shape estimator 100 aligns the corresponding 3-D model to the appearances of the object to be consistent with the appearance of the object as seen from the one or more viewpoints. In the case of deformable objects, the alignment process in operation 370 may also include deforming the 3-D model to match the estimated configuration of the actual object in the scene. This alignment of the 3-D model provides the 6-DoF pose of the object in a global coordinate system (e.g., a coordinate system based on the main camera 10 or based on the robot controller 28). Details of aspects of the present disclosure for performing the alignment of a 3-D model with the appearance of an object will be described in more detail below.

Generally, the methods described herein will make use of a 3-D model or computer-aided-design (CAD) model C of the object (e.g., as loaded in operation 350) and observed two-dimensional (2-D) image data I of the object (e.g., as captured by the cameras in operation 310 and with object-level corresponding patches of the images extracted therefrom in operation 330). In some embodiments, the output of the 6-DoF pose estimation technique (computed by the shape estimator 100) includes a mesh M and its 6-DoF pose in a global coordinate system (e.g., 3 dimensional translational and rotational coordinates in a coordinate system oriented with respect to a main camera 10) for each of the detected objects in the scene.

To align a 3-D model with the observed 6-DoF pose of an object in a scene, embodiments of the present disclosure generally attempt to find a pose of the 3-D model that causes its appearance, from one or more virtual cameras, to be consistent with the one or more observed images of the object captured by the cameras 10, 30. Generally, these approaches include detecting keypoints in the object level patches of the images, and transforming the pose of the 3-D model such that the locations of the keypoints in the 3-D model are consistent with the locations of the keypoints in the observed images. In circumstances where the images of the scene also include one or more depth maps, the 3-D model may also be aligned with the depth maps through a 3-D model alignment algorithm such as iterative closest point (ICP).

In circumstances where the images include surface normals maps (e.g., computed from polarization signatures of the object based on shape-from-polarization, as described above), the pose of the 3-D model is further aligned with the observed surface normals. For example, in some embodiments, the correspondences between the locations of keypoints in the observed images and locations on the 3-D model are identified, and the directions of the surface normals at corresponding portions of surface normals map are compared against corresponding directions of the surface normals on the 3-D model to compute an error that is used as part of an error function for aligning the pose of 3-D model with the actual pose of the observed object. In some embodiments, the correspondences are computed based on identifying matching keypoints using a keypoint detector (e.g., a classical keypoint detector or a trained neural network based keypoint detector), (e.g., updating an estimated pose of the 3-D model to minimize differences or errors between the locations of the keypoints in the observed images and the locations of the keypoints in 3-D model of the object, a render-and-compare approach (e.g., by using a differentiable rendering engine, where the differences or errors between detected keypoints and locations of keypoints in renderings of the 3-D model are propagated backward through the differentiable rendering engine to update the pose, see, e.g., Labbé, Yann, et al. "CosyPose: Consistent multi-view multi-object 6D pose estimation." *European Conference on Computer Vision*. Springer, Cham, 2020.), or dense correspondences between surfaces of 3-D models and surfaces of objects and may be computed as described in more detail below with respect to FIG. 5.

Some approaches to aligning 3-D model to their appearances in images relate to computing dense correspondences between surfaces of the object depicted in the one or more images of the scene and surfaces of the 3-D model by rendering images of the 3-D model in an initial (or current) estimated pose.

Figure 5:
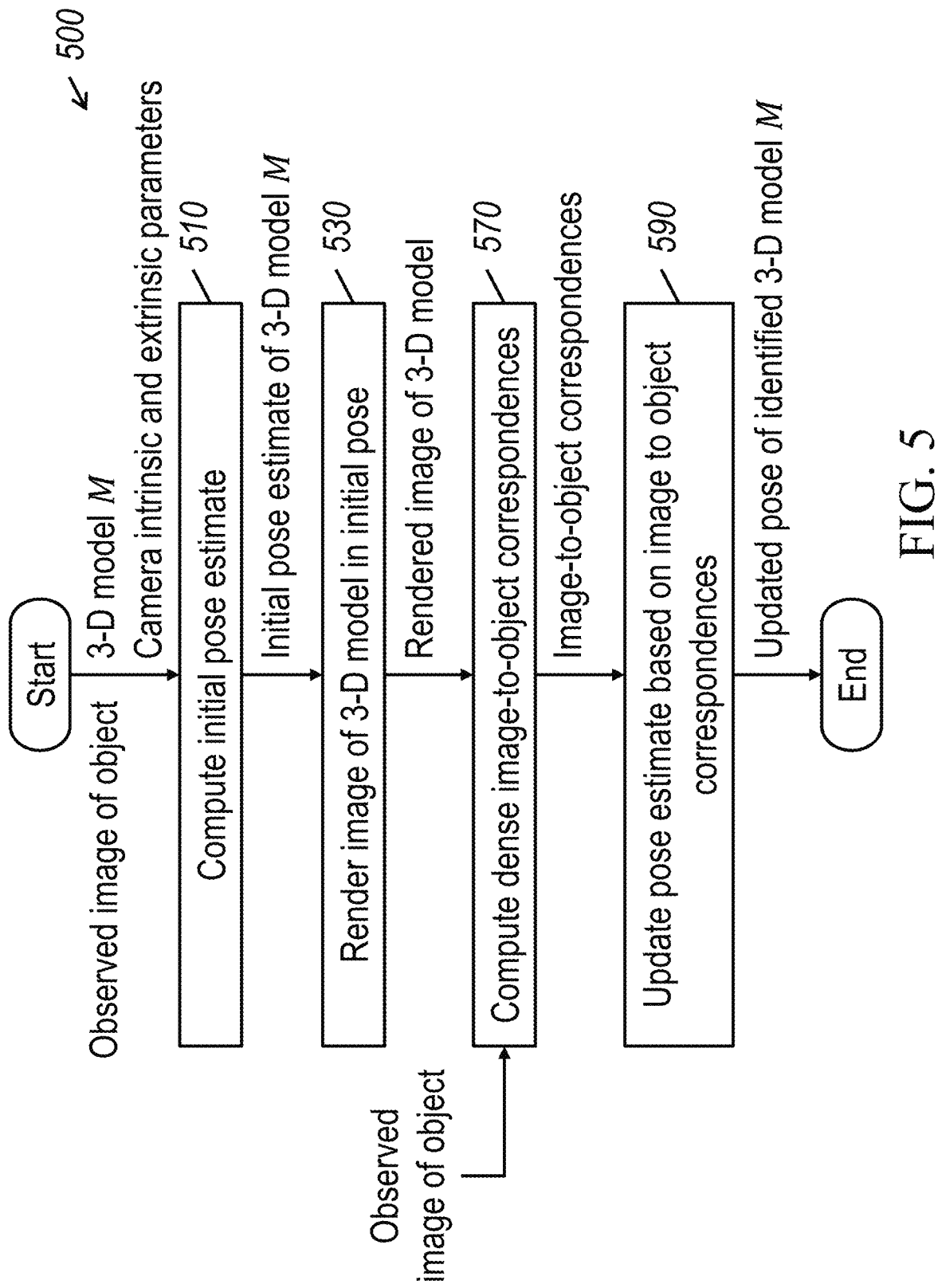
FIG. 5 is a flowchart depicting a method for computing a pose of an object based on dense correspondences according to some embodiments of the present disclosure.

FIG. 5 is a flowchart depicting a method 500 for computing a pose of an object based on dense correspondences according to some embodiments of the present disclosure. For the sake of clarity, embodiments of the present disclosure will be described with respect to the estimation of the pose of one object in the scene. However, embodiments of the present disclosure are not limited thereto and include embodiments wherein the pose estimator 100 estimates the poses of multiple objects in the scene as depicted in the one or more images captured in operation 310 (e.g., where the poses of the multiple objects may be estimated in parallel or jointly in a combined process).

In operation 510, the pose estimator 100 computes an initial pose estimate of an object based on one or more images of the object, such as the image patches extracted in operation 330. The pose estimator 100 may also receive one or more 3-D models corresponding to the detected objects (e.g., as loaded in operation 350) where the 3-D model is posed (e.g., translated and rotated) based on the initial pose estimate. In some embodiments, the initial pose estimate is computed based on detecting keypoints in the one or more images of the object and using a Perspective-n-Point algorithm to match the detected keypoints with corresponding known locations of keypoints in the 3-D model. See, e.g., Zhao, Wanqing, et al. "Learning deep network for detecting 3D object keypoints and 6D poses." *Proceedings of the IEEE/CVF Conference on Computer Vision and Pattern Recognition.* 2020. and Lepetit, Vincent, Francesc Moreno-Noguer, and Pascal Fua. "EPnP: An accurate O(n) solution to the PnP problem." *International Journal of Computer Vision* 81.2 (2009): 155. The keypoints may be detected using, for example, a classical keypoint detector (e.g., scale-invariant feature transform (SIFT), speeded up robust features (SURF), gradient location and orientation histogram (GLOH), histogram of oriented gradients (HOG), basis coefficients, Haar wavelet coefficients, and the like.) or a trained deep learning keypoint detector such as a trained convolutional neural network using HRNet (Wang, Jingdong, et al. "Deep high-resolution representation learning for visual recognition." *IEEE transactions on pattern analysis and machine intelligence* (2020).) with a differential spatial to numerical (DSNT) layer and Blind Perspective-n-Point (Campbell, Dylan, Liu, and Stephen Gould. "Solving the Blind Perspective-n-Point Problem End-To-End With Robust Differentiable Geometric Optimization." *European Conference on Computer Vision.* Springer, Cham, 2020.).

As another example, the initial pose estimate may be computed by capturing a depth image or depth map of the object (e.g., using a stereo depth camera or time of flight depth camera) and applying an iterative closest point (ICP) algorithm or a point pair feature matching algorithm (see, e.g., Drost, Bertram, et al. "Model globally, match locally: Efficient and robust 3D object recognition." 2010 *IEEE Computer Society Conference on Computer Vision and Pattern Recognition.* IEEE, 2010.) to align the 3-D model to the shape of the object as it appears in the depth image. In some embodiments, the initial pose estimate is computed directly from a trained network (see, e.g., Xiang, Yu, et al. "PoseCNN: A convolutional neural network for 6D object pose estimation in cluttered scenes." *arXiv preprint arXiv:1711.00199* (2017).) and/or approaches such as a dense pose object detector (Zakharov, Sergey, Ivan Shugurov, and Slobodan Ilic. "DPOD: 6D Pose Object Detector and Refiner." 2019 *IEEE/CVF International Conference on Computer Vision (ICCV).* IEEE Computer Society, 2019.)

Figure 6:
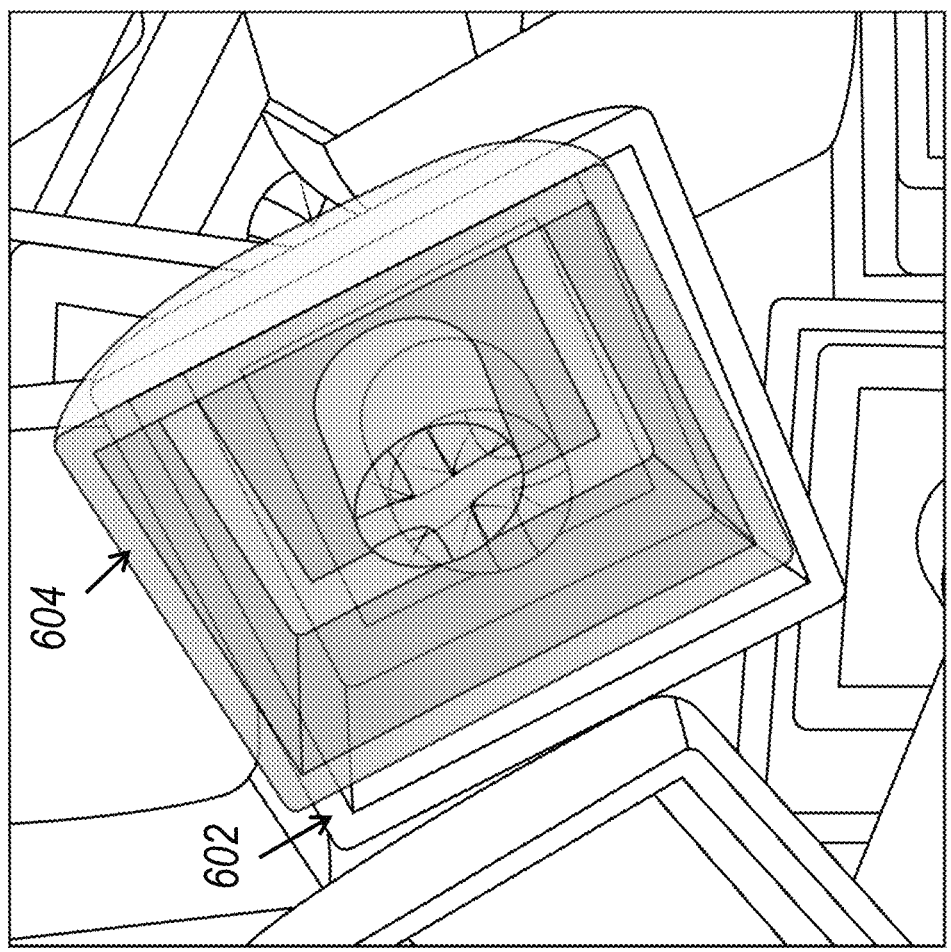
FIG. 6 is a schematic depiction of a 3-D model, depicted in shaded form, posed in accordance with an initial pose estimate and overlaid onto an observed image of a scene, depicted in line drawing form.

FIG. 6 is a schematic depiction of a 3-D model, depicted in shaded form, posed in accordance with an initial pose estimate and overlaid onto an observed image of a scene, depicted in line drawing form. As shown in FIG. 6 these is an error between the observed object 602 and the rendering of the 3-D model 604 as posed based on the initial pose estimate, both in the form of rotation error and translation error. Accordingly, aspects of embodiments of the present disclosure relate to refining this initial pose estimate (whether performed using keypoint detection and a PnP algorithm or using a depth image and an ICP algorithm as discussed above, or through other techniques) as described in more detail below.

Figure 7A:
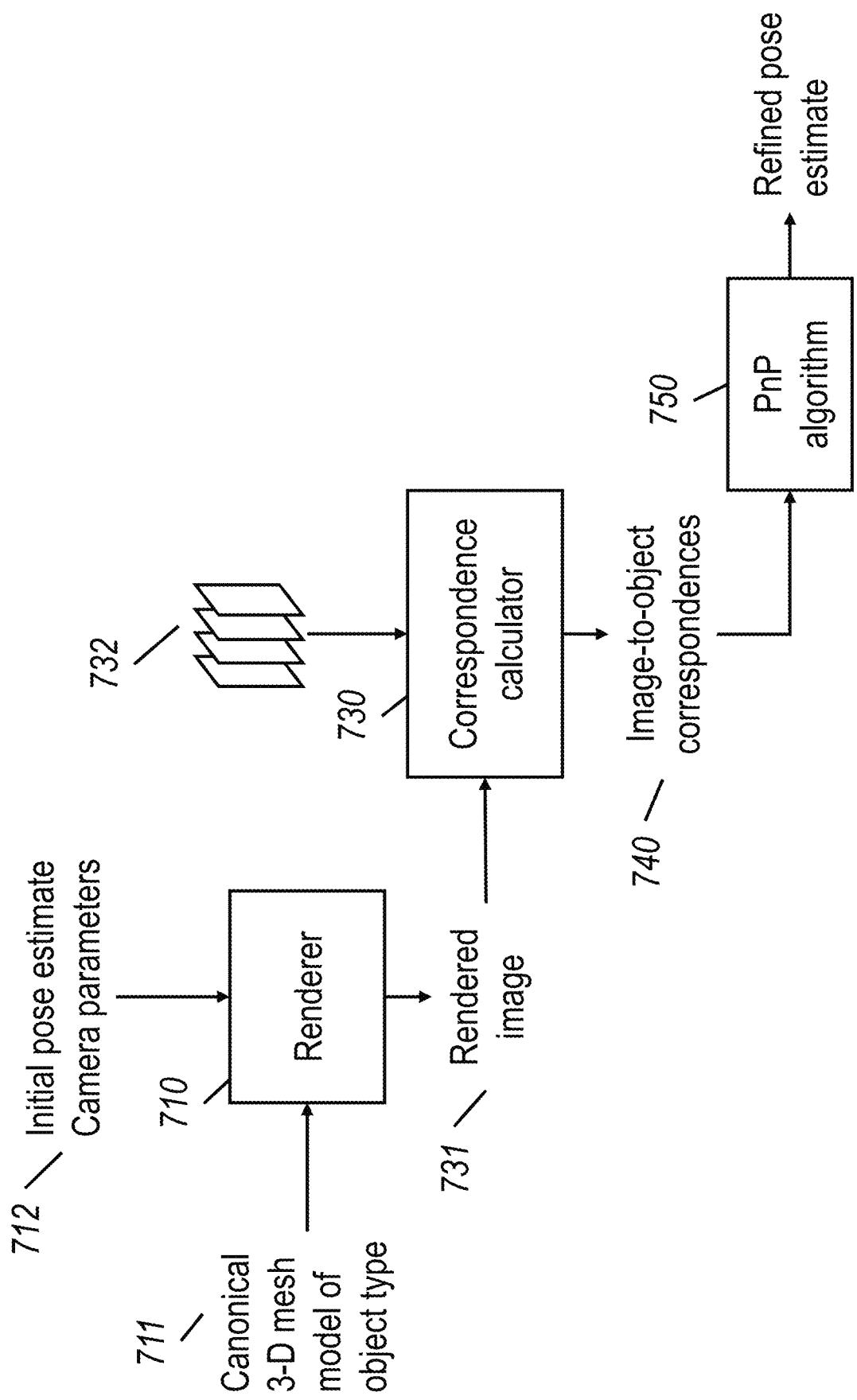
FIG. 7A is a block diagram depicting a pipeline for refining an initial pose estimate using dense correspondences according to one embodiment of the present disclosure.

FIG. 7A is a block diagram depicting a pipeline 700 for refining an initial pose estimate using dense correspondences according to one embodiment of the present disclosure. In various embodiments, the pipeline 700 is implemented in whole or in part by the pose estimator 100 to compute refined pose estimates, or feature vectors in other representation spaces representing the location of the object, based on input images of the object.

Referring back to FIG. 5 and to FIG. 7A, in operation 530, the pose estimator 100 uses a renderer 710 (or rendering engine) to render an image 731 (e.g., a 2-D image) of the 3-D model 711 in its initial pose 712 from the viewpoint of a camera (e.g., as specified by extrinsic camera parameters) that captured an image of the object in the scene. In embodiments in which multiple consistent images of the object were captured from multiple viewpoints, the pose estimator 100 renders a separate image of the 3-D model in its initial estimated pose in the scene observed by the cameras from each of the separate viewpoints with respect to the object in the scene. The rendering may also be performed in accordance with camera intrinsic parameters (e.g., accounting for field of view and lens distortions of the camera or cameras used to capture the observed images of the object in the scene).

In some embodiments of the present disclosure, the rendered image of the object is a rendered surface normals map, where each pixel or point in the rendered surface normals map is a vector indicating the direction of the surface of the 3-D model depicted at that pixel or point (e.g., a vector perpendicular to the surface of the object at that pixel or point). In some cases, the normal vector at each pixel is encoded in the color channels of an image (e.g., in red, green, and blue color channels). In some embodiments, the pose estimator 100 renders the rendered surface normals map by computing a depth map from the perspective or viewpoint of the observing camera used to capture the observed image (e.g., using the Moller-Trumbore ray-triangle intersection algorithm as described in Möller, Tomas, and Ben Trum bore. "Fast, minimum storage ray-triangle intersection." *Journal of graphics tools* 2.1 (1997): 21-28.). According to these embodiments, the depth map of the object is converted to a point cloud, and a rendered surface normals map is computed from the point map (e.g., by computing the slope between neighboring or adjacent points of the point cloud).

In some embodiments of the present disclosure, the pose estimator 100 renders the rendered surface normals map directly from 3-D model with a virtual camera placed at the perspective or viewpoint of the observing camera. This direct rendering may be performed by tracing rays directly from the virtual camera into a virtual scene containing the 3-D model in its initial estimated pose and computing the surface normal of the first surface that each ray intersects with (in particular, the surfaces of the 3-D model in the initial estimated pose that the rays intersect with).

While the rendered image 731 in the embodiments described above include one or more rendered surface normals maps, embodiments of the present disclosure are not limited thereto and the renderer may be configured to generate different types of rendered 2-D images such as color (e.g., red, green, blue) images, monochrome images, and the like.

In operation 570, the pose estimator 100 computes dense image-to-object correspondences between the one or more images of the object and the 3-D model of the object. For example, the rendered image 731 of the object in the scene based on the initial estimated pose and observed image 732 of the object in the same scene (or multiple rendered images 731 and multiple observed images 732 from different viewpoints) are supplied to correspondence calculator 730, which computes dense correspondence features between the rendered image 731 and the observed image 732 (or the rendered images 731 and the corresponding observed images 732 of the object in the scene).

In various embodiments, the correspondence calculator 730 may use different techniques to compute dense correspondence features between the rendered image 731 and the observed image 732. In some embodiments, a disparity neural network is used to detect correspondences (see, e.g., Xu, Haofei, and Juyong Zhang. "AANet: Adaptive aggregation network for efficient stereo matching." *Proceedings of the IEEE/CVF Conference on Computer Vision and Pattern Recognition.* 2020.), where the disparity neural network is modified to match pixels along the y-axis of the images (e.g., perpendicular to the usual direction of identifying correspondences by a disparity neural network) in addition to along the x-axis of the input images (as traditional, where the input images are rectified to extend along the x-axis between stereo pairs of images), where the modification may include flattening the output of the neural network before supplying the output to the loss function used to train the disparity neural network, such that the loss function accounts identifies and detects disparities along both the x-axis and the y-axis. In some embodiments, an optical flow neural network is trained and/or retrained to operate on the given types of input data (e.g., observed surface normals maps and observed images), where examples of optical flow neural networks are described in Dosovitskiy, Alexey, et al. "FlowNet: Learning optical flow with convolutional networks." *Proceedings of the IEEE international conference on computer vision.* 2015. Ilg, Eddy, et al. "FlowNet 2.0: Evolution of optical flow estimation with deep networks." *Proceedings of the IEEE conference on computer vision and pattern recognition.* 2017. and Trabelsi, Ameni, et al. "A Pose Proposal and Refinement Network for Better 6D Object Pose Estimation." *Proceedings of the IEEE/C VF Winter Conference on Applications of Computer Vision.* 2021. In some embodiments, classical techniques for computing dense correspondences are be used, such as classical algorithms for computing optical flow (see, e.g., Horn and Schunck, referenced above) or classical techniques for computing disparity (e.g., block matching, but applied along both the x-axis and y-axis). Other embodiments of the present disclosure include modifications and/or retraining of existing neural network backbones to take two inputs (e.g., the observed image and the rendered image) to compute correspondences.

The observed image or observed images 732 supplied as input to the correspondence calculator 730 may be the same images that were used to compute the initial pose estimate or may be different images, such as images from different viewpoints from those used to compute the initial pose estimate, images captured in different modalities (e.g., polarization and/or different spectra), or images or feature maps computed based on captured or observed images (e.g., observed features in polarization representation spaces or observed surface normals computed from polarization features using shape-from-polarization techniques). Examples of types of images include color images (e.g., red, green, blue images) captured by color cameras, monochrome images (e.g., in the visible light, infrared, or ultraviolet portions of the spectrum), polarization raw frames (e.g., color or monochrome images captured through a polarization filter), polarization features in polarization representation spaces (e.g., angle of linear polarization (AOLP) and degree of linear polarization (DOLP)). As discussed in more detail above, shape from polarization (SfP) provides techniques for computing observed surface normals maps from captured or observed polarization raw frames.

Accordingly, the correspondence calculator 730 computes dense correspondences between the rendered image 731 and the observed image 732.

Through the rendering process, the pose estimator 100 also stores information associated with the rendered image 731 regarding the point in the 3-D model that is represented by each pixel in the rendered image. For example, when rendering the image using a ray tracing technique, each pixel of the rendered image corresponds to a location on the surface of the 3-D model (e.g., in uv coordinate space representing points on the surface of the 3-D model) as defined by a ray connecting the camera origin, the pixel, and the location on the surface of the 3-D model, as modified by any virtual optics system (e.g., as defined by camera intrinsic parameters). As such, the pose estimator 100 stores 2-D to 3-D correspondences between the 2-D rendered image 731 and the 3-D model in its initial pose.

Figure 7B:
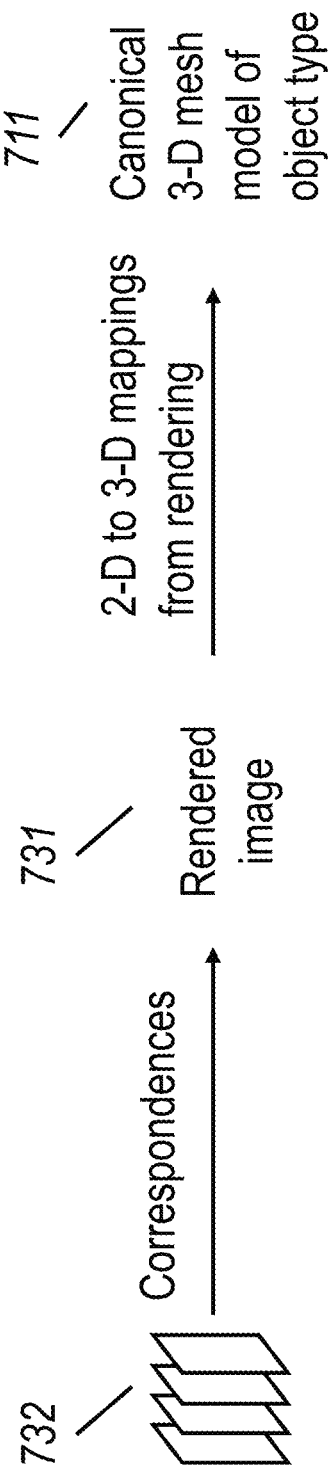
FIG. 7B is a schematic depiction of mappings between observed images and 3-D mesh models based on image-to-object correspondences computed in accordance with some embodiments of the present disclosure.

Therefore, the correspondence calculator 730 further computes dense image-to-object correspondences 740 that maps pixels in the observed image 732 to locations on the surface of the 3-D model 711. In more detail, as shown in FIG. 7B, the optical flow features computed by the correspondence calculator 730 provide a mapping from pixels in the observed image 732 to pixels in the rendered image 731 and the 2-D to 3-D mapping information from the rendering process provides mappings from pixels in the rendered image 731 to locations on the surface of the 3-D model 711. As a result, the dense image-to-object correspondences 740 provide 2-D to 3-D correspondences between every visible pixel in the observed image 732 and the predicted point it represents on the 3-D model 711 of the object.

In operation 590, the pose estimator 100 updates the estimated pose based on the dense image-to-object correspondences. For example, as shown in FIG. 7A, the dense image-to-object correspondences may be supplied to a Perspective-n-Point (PnP) algorithm to compute a refined pose estimate. In some embodiments, the PnP algorithm estimates the refined pose P by finding the pose P that minimizes the error function below:

$$\arg\min_P \sum_{x \in X} \|KPf(x) - x\|$$

where K is the camera intrinsic matrix of the camera used to capture the observed image of the object, P is a pose matrix representing the transformation between the object and the camera, f: $\mathbb{N}^2 \to \mathbb{R}^3$ is the dense image-to-object correspondences described above (computed in operation 570) mapping from pixel coordinates in the observed image to 3-D coordinates on the surface of the 3-D model, and X is the domain of f (e.g., across all of the pixels in the observed image of the object).

Because the correspondence calculator 730 computes a large number of correspondences (e.g., dense correspondences) between the image and the 3-D model of the object, these correspondences can also be used to estimate the configuration of the deformable object using a PnP algorithm, thereby enabling the measurement of the configuration of deformable objects (e.g., bags holding loose items such as food, clothes, flexible printed circuit boards, and the like) by deforming the 3-D model to match the configuration of the object. In some embodiments, the deformation of the 3-D model to match the configuration of the deformable object in the images can be computed for every pixel coordinate x∈X (where X represents the collection of all pixels in the observed images) as:

$$\{Pf(x) - \text{proj}_{L(x)}(Pf(x)) | x \in X\}$$

where L(x) represents a line of a projection of point x from the camera, P is a pose matrix representing the transformation between the object and the camera, $f: \mathbb{N}^2 \to \mathbb{R}^3$ is the dense image-to-object correspondences described above (computed in operation 570) mapping from pixel coordinates in the observed image to 3-D coordinates on the surface of the 3-D model, $\text{proj}_{L(x)}$ (Pf(x)) is the estimated depth of the object coordinate seen at point x from the camera along line L(x), and X is the domain off (e.g., across all of the pixels in the observed image of the object). Accordingly, the above expression provides one estimate of the deformation of the object, e.g., the difference between the predicted location based on the current pose P and a 3-D model of the object (as represented by the term Pf(x)) and the actual observed location of the corresponding point in the observed image, as represented by the term $\text{proj}_{L(x)}$ (Pf(x)), where the difference represents the change in 3-D coordinates to be applied to make the shape of the 3-D model match up with the actual deformed shape or configuration of the observed object.

In some embodiments where a depth map D of the scene is available (e.g., by capturing a depth map of the scene using a depth camera such as a stereo camera) among the one or more observed images 732, the depth map is used to convert the pixel coordinates x to 3-D coordinates D(x) and therefore the deformation would be computed for each pixel x as:

$$\{Pf(x) - D(x) | x \in X\}$$

Accordingly, the above expression provides one estimate of the deformation of the object, e.g., the difference between the predicted location based on the current pose P and a 3-D model of the object (as represented by the term Pf(x)) and the actual observed location of the corresponding point in the observed depth image D(x), where the difference represents the change in 3-D coordinates to be applied to make the shape of the 3-D model match up with the actual deformed shape or configuration of the observed object.

While FIG. 5 shows an embodiment where an updated pose of the 3-D model is computed once, in some embodiments the pose is iteratively refined by supplying the pose computed in operation 590 as the initial pose of the next iteration in operation 530 in order to further refine the estimated pose of the object for consistency with the observed image of the object.

In addition, while FIG. 5 depicts a circumstance in which the observed image of the object is captured from a single viewpoint, embodiments of the present disclosure are not limited thereto and may be applied in a multi-view environment where multiple cameras (e.g., a main camera 10 and support cameras 30) capture observed images of the object from multiple different viewpoints. In such embodiments, the multiple views (e.g., N different views) may be jointly used to compute a pose estimate that minimizes a combined error metric across the multiple views (e.g., errors computed by comparing the locations of keypoints in the observed images from each viewpoint with renderings from each viewpoint).

Generating Datasets of Images of Known Objects and Corresponding Shape Estimates As noted above, in some embodiments, the shape estimator 100 includes a renderer 150 such as a 3-D rendering engine that is configured to compute shape estimates of the objects detected in the scene based on estimated poses of those objects.

Figure 8:
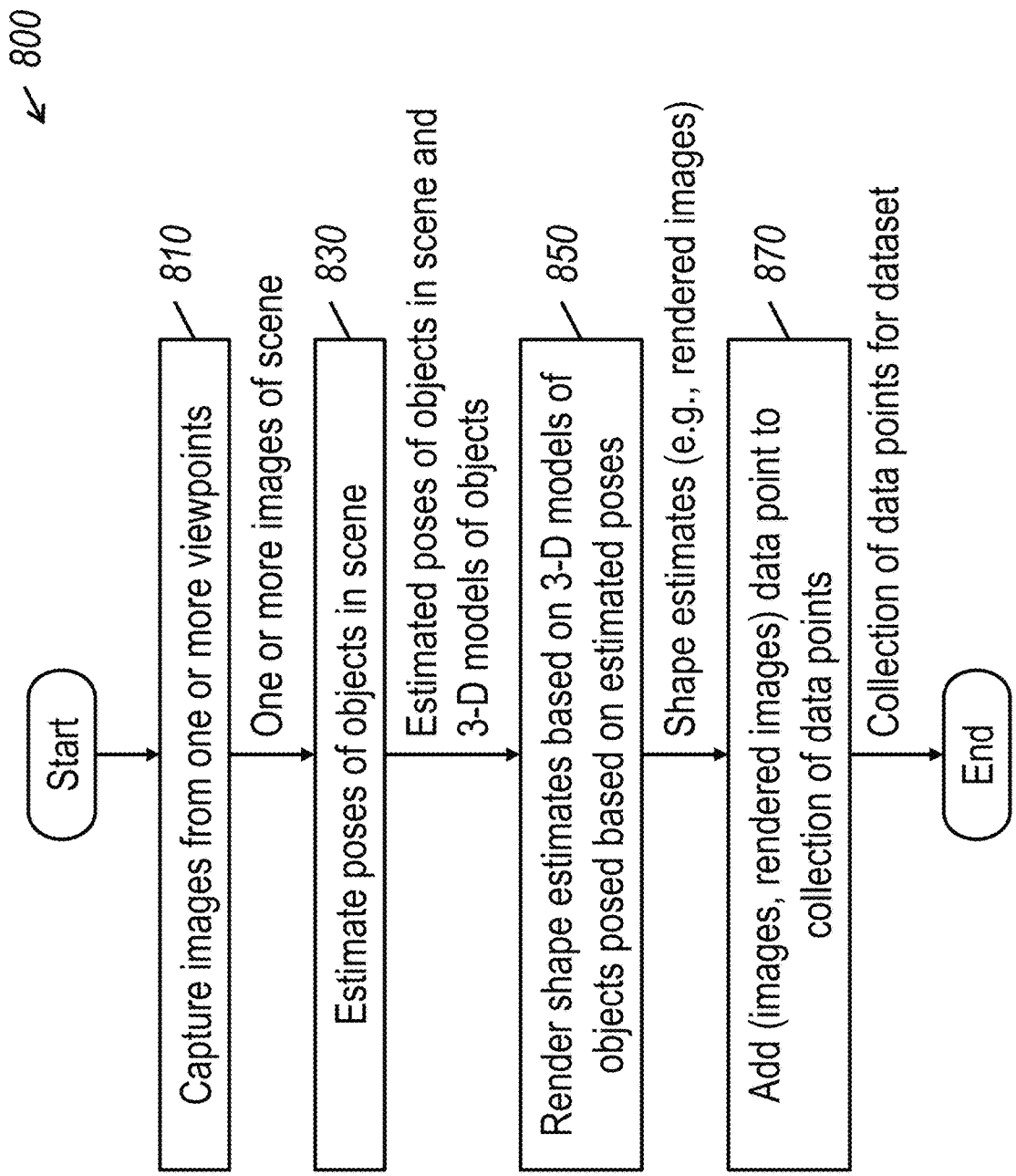
FIG. 8 is a flowchart depicting a method for generating datasets including images of known objects and corresponding shape estimates according to one embodiment of the present disclosure.

FIG. 8 is a flowchart depicting a method for generating datasets including images of known objects and corresponding shape estimates according to one embodiment of the present disclosure.

In operation 810, the shape estimator controls one or more cameras to capture one or more images of a scene containing known objects. The images may be captured in accordance as described above with respect to operation 310 of FIG. 3, such as by controlling a main camera 10 and support cameras 30 to capture consistent images of a scene from one or more viewpoints. The images may include images in different modalities, such as images covering different parts of the electromagnetic spectrum (e.g., visible light of different colors, near infrared, thermal, ultraviolet, and the like), depth maps (e.g., captured using depth from active or passive stereo), polarization raw frames captured by cameras with different polarization filters (e.g., circular polarization filters or linear polarization filters at different angles), and combinations thereof.

In some embodiments, the images may also include polarization signatures or polarization signature maps computed from the raw images from the cameras, including Stokes vectors, degree of linear polarization (DOLP), and angle of linear polarization (AOLP) (for cases where there are three or more polarization raw frames captured with different polarization angles from the same viewpoint). In some cases, the images also include physics-based surface normals maps (e.g., $N_x$, $N_y$, and $N_z$ for each pixel), where these normals maps may be computed from the polarization signatures based on shape from polarization techniques, as described above.

In the case of a multi-viewpoint system, such as where multiple ones of the main camera 10 and the support cameras 30 include multi-modal camera systems (e.g., monocular multi-modal camera arrays and stereo multi-modal camera arrays), the above values can be estimated for multiple viewpoints. While the 3-D depth or 3-D coordinates of each point of the objects visible in the scene will be consistent (within expected noise tolerances) in the depth maps captured across the viewpoints of the multiple cameras, the DOLP and AOLP will vary depending on the viewpoint as well as the color of the object and as a result each of the normal maps will be different. For each viewpoint and each color channel, there is a corresponding set of surface normals N estimated from the physics of polarization by applying the Fresnel equation which will vary depending on the viewpoint due to a number of factors that include: material reflectivity or "albedo," wavelength, and specular reflections/viewing direction.

Regarding material reflectivity or "albedo," when the albedo of the material is low it has a significant impact on polarization. Umov's law which states that the albedo and the degree of polarization are inversely proportional to one another. (For example, low albedo materials have a very high degree of polarization, while high albedo materials have a low degree of polarization.) In these cases of low albedo materials, it is likely that the surface normals estimated from different viewpoints are substantially similar (after accounting for the rigid body transformation between the two viewpoints), whereas the estimated surface normals based on physics may be very different for high albedo materials.

Regarding wavelength, the albedo is wavelength dependent for a whole range of colors other than pure black and pure white (e.g., the albedo of black car and a white car are spectrally invariant over the visible wavelength range). As a result, the degree of polarization is stronger for certain colors and its corresponding signal-to-noise ratio (SNR) is higher. Therefore, the surface normals estimated from certain, low albedo wavelength channels will be more accurate than those from other channels with higher albedo.

Regarding specular reflections and viewing direction, specular reflections change with viewing direction as well as illumination direction. The brightness variations that result from specular reflection (and not material geometry) are sometimes referred to as "texture-copy artifacts." In such situations, having a substantially different viewpoint will result in a change in brightness to one which is more consistent with the material and geometry of the object. In that case, the surface normals estimated from viewpoints where texture-copy artifacts are not visible on the surface of the object are likely to be more accurate than those from other viewpoints in which texture-copy artifacts do appear on the surface of the object.

In some embodiments, the observed images take the form of:

$I_{r1}, I_{g1}, I_{b1}, N_{r1d}, N_{r1s1}, N_{g1d}, N_{g1s1}, N_{g1s2}, N_{b1d}, N_{b1s1}, N_{b1s2} I_{r2}, I_{g2}, I_{b2}, N_{r2d}, N_{r1s1}, N_{g2d}, N_{g2s1}, N_{g2s2}, N_{b2d}, N_{b2s1}, N_{b2s2} \ldots I_{rn}, I_{gn}, I_{bn}, N_{rnd}, N_{r1n1}, N_{gnd}, N_{gns1}, N_{gns2}, N_{bnd}, N_{bns1}, N_{bns2}$ where $I_{ri}, I_{gi}, I_{bi}$, represent intensity images from viewpoint i among viewpoints 1 through n in r, g, and b spectral channels, $N_{rid}, N_{ris1}, N_{ris2}, N_{gid}, N_{gis1}, N_{gis2}, N_{btid}, N_{btis1}, N_{bis2}$ are the surface normals estimated from diffuse and specular reflection models on the red, green, and blue spectral channel images using a physics-based approach that leverages the Fresnel equations (e.g., based on shape from polarization).

According to some embodiments, pose estimation and data generation systems of the present disclosure are deployed in factory conditions where the illumination conditions are not always known or may not be uniform (e.g., periodically changing illumination due to moving machinery may change the illumination conditions from one image to the next). Accordingly, applying photometric constraints is challenging given the varying illumination conditions. Imaging systems according to some embodiments of the present disclosure capture multi-channel polarization information to provide additional constraints for disambiguating (or reducing ambiguity) in the surface normals computed based on a computer vision model trained based on datasets generated in accordance with embodiments of the present disclosure. For example, as discussed in more detail below, the polarization images as well as the corresponding estimated normal maps may be supplied to train a computer vision model (e.g., a deep learning network) to choose how to combine these inputs effectively to form the desired output, such as shape estimates of objects depicted in the images such as depth maps and surface normals maps that have low noise compared to comparative approaches (e.g., using depth from stereo, depth from time of flight, and surface normals from shape from polarization using the Fresnel equations).

In operation 830, the shape estimator 100 computes pose estimates of the known objects depicted in the scene. These pose estimates may be computed from the one or more images based on the pose estimation techniques such as those described above with respect to FIGS. 3, 4A, 4B, 4C, 5, 6, 7A, and 7B. In some example embodiments, the multi-view light field capture of the scene using a main camera 10 and multiple support cameras 30 is used to estimate depths of surfaces of objects using multi-view stereo correspondence, correlates the depths of these surfaces with the detected keypoints in the images and keypoints in the ground truth 3-D CAD models of the objects in the images, and jointly optimizes the depth errors over the multiple viewpoints and multiple imaging modalities to provide 6DoF pose estimations.

In some embodiments, the joint optimization of depth errors includes computing surface shape estimates based on the input images using a shape estimation neural network, and including the differences between the shape estimates and the rendered shapes (e.g., comparing the estimated depth maps to rendered depth maps and/or comparing the estimated surface normals maps of the 3-D model in an initial estimated pose to the rendered surface normals maps of the 3-D model in the initial estimated pose to update the estimated pose of the 3-D model). This shape estimation neural network may be trained based on existing training data mapping input images and image signatures (e.g., polarization signatures) to ground truth smooth shapes. In some circumstances the differences or errors computed in accordance with the different factors are separately weighted, such as based on relative confidences output by the different factors. For example, the shape estimation neural network may include a confidence score as part of its output and, as another example, depth maps and surface normals maps computed using shape from polarization approaches may be weighted based on the level of noise present in the underlying images.

However, embodiments of the present disclosure are not limited thereto, and the poses of the objects may be estimated using different techniques, as discussed above.

In operation 850, the renderer 150 renders shape estimates of the objects in the scene based on 3-D models of the objects posed based on the estimated poses. These rendered shape estimates represent the "ground truth" or desired output labels associated with the captured images. Using the pose estimates computed in operation 830 and ground truth, accurate 3-D CAD models of the objects, the shape estimator 100 infers the shape of the objects, including surface normal maps, accurately enough to have them represent ground truth for the purpose of populating a dataset for training computer vision models, such as by adding a new data point to a collection of data points of the dataset in operation 870.

These rendered shape estimates may include images of a virtual scene with one or more 3-D models posed in accordance with the estimated poses of the corresponding objects depicted in the scene, and the images are rendered from the perspective of virtual cameras having intrinsic and extrinsic camera parameters matching those of the main camera 10 and/or support cameras 30, such that each rendered view corresponds to a view from the observed images 18. For example, rendering color images of a scene may provide estimates regarding the outline or silhouette of the object as viewed from a particular camera. As another example, rendering a depth map based on the 3-D model can provide a high resolution depth map or point cloud of the shape of the objects in the scene with substantially no noise compared to point clouds or depth maps generated from depth camera systems. As a third example, rendering a surface normals map of the surface normals directions of the surfaces of the 3-D model produces a higher resolution surface normals map with substantially no noise compared to surface normals maps computed directly from depth maps from depth camera systems or computed from polarization raw frames based on shape from polarization techniques. In various embodiments, these surface normals maps may be rendered by directly detecting the surface normals (e.g., the angles or slopes or orientations) of the surfaces of the posed 3-D model, or may be computed from the high resolution depth map rendered from the 3-D model (e.g., by computing the gradient between adjacent pixels of the depth map or adjacent points of the point cloud).

In operation 870, the shape estimator 100 adds a data point to a collection of data points, where the added data point includes the one or more observed images of the scene (as captured by the one or more cameras) and the corresponding shape estimates from the same viewpoint with respect to the object (e.g., as generated by the renderer). In some cases, each data point includes one or more images from a given viewpoint and one or more shape estimates (e.g., rendered images) rendered from the corresponding virtual viewpoint. In some embodiments, the shape estimator 100 determines whether or not to add a particular data point to the collection of data points in operation 870 based on whether the robotic arm 24 was able to pick an object depicted in the images, or otherwise perform a particular task, based on the estimated 6-DoF pose of the object as computed from the observed images of the scene associated with the data point. In other words, the ability of the robotic controller to control the robotic arm to pick the object may be included as a factor in validating the rendered "ground truth" surface normals of the object depicted in the images and therefore in determining whether or not the data point should be included in the generated dataset.

These observed images are paired with their corresponding "ground truth" shape signatures generated by the renderer from the posed 3-D model. For example, ground truth surface normals maps generated by the renderer may be substantially similar to the surface normals $N_{rid}$, $N_{ris1}$, $N_{ris2}$, $N_{gid}$, $N_{gis1}$, $N_{gis2}$, $N_{bid}$, $N_{bis1}$, $N_{bis2}$ estimated from the captured polarization images, but will generally be smoother (e.g., have less noise or substantially no noise) than the observed images because the ground truth surface normals maps were generated from a virtual rendering environment in which the directions of the surface normals of the posed 3-D model are known.

As such, aspects of embodiments of the present disclosure provide systems and methods for generating datasets that include observed images of real-world objects and corresponding ground truth images or signatures representing the shapes of those real-world objects, where the ground truth images or signatures may include high resolution, low noise or substantially noise-free depth maps and surface normals maps of the objects.

As described above, the dataset may be generated, in part, by shape estimators 100 operating as pose estimators for estimating the poses of known objects in a manufacturing environment, where the computed poses are supplied to a controller 28 for controlling a robotic arm 24 to pick the objects based on their computed poses. The collection of data as part of an existing pose estimation process in accordance with some embodiments of the present disclosure generates a large number of data points relating to known objects under a variety of different conditions (e.g., appearing in different orientations, under varying lighting conditions, interacting with various other objects, and the like). Some aspects of embodiments of the present disclosure relate to aggregating data points collected from diverse environments (e.g., different shape estimators operating on different logistics facilities or manufacturing lines that are configured to compute the poses and/or shapes of different objects, such as different manufacturing lines that manufacture different products from different components, and where the different facilities may be operated by different entities). Accordingly, embodiments of the present disclosure provide systems and methods for generating large and diverse datasets for training computer vision models to perform computer vision tasks such as shape estimation, such as the slope or surface normals map of an object.

Computer Vision Models Trained Based on Datasets Including Slope Data

Datasets generated in accordance with embodiments of the present disclosure may be applied to train computer vision models such as deep neural networks (e.g., convolutional neural networks) to compute images or signatures representing the shapes of objects that are depicted in one or more given input images. Considering the arrangement shown in FIG. 1A, a main camera 10 and support cameras 30 may capture images of a scene, such as polarization raw frames in different portions of the visible spectrum (e.g., red, green, and blue color channels of color images), infrared images, depth maps from stereo, and the like. In addition, shape from polarization may be used to compute surface normals maps from polarization signatures (e.g., AOLP and DOLP) based on the polarization raw frames in accordance with the Fresnel equations.

In more detail, these aspects of embodiments of the present disclosure relate to training a computer vision model such as a neural network to implement shape from polarization and/or multi-view/multi-spectral stereo given a set of input images. In particular, neural networks are capable of performing non-parametric functional approximations and therefore can be trained to compute the desired mapping between input space (e.g., captured multi-modal and multi-view images and/or signatures such as polarization signatures, noisy depth maps, and noisy surface normals maps) and the corresponding shape of the depicted objects (e.g., surface orientation in the form of surface normals maps and/or depth maps).

Figure 9:
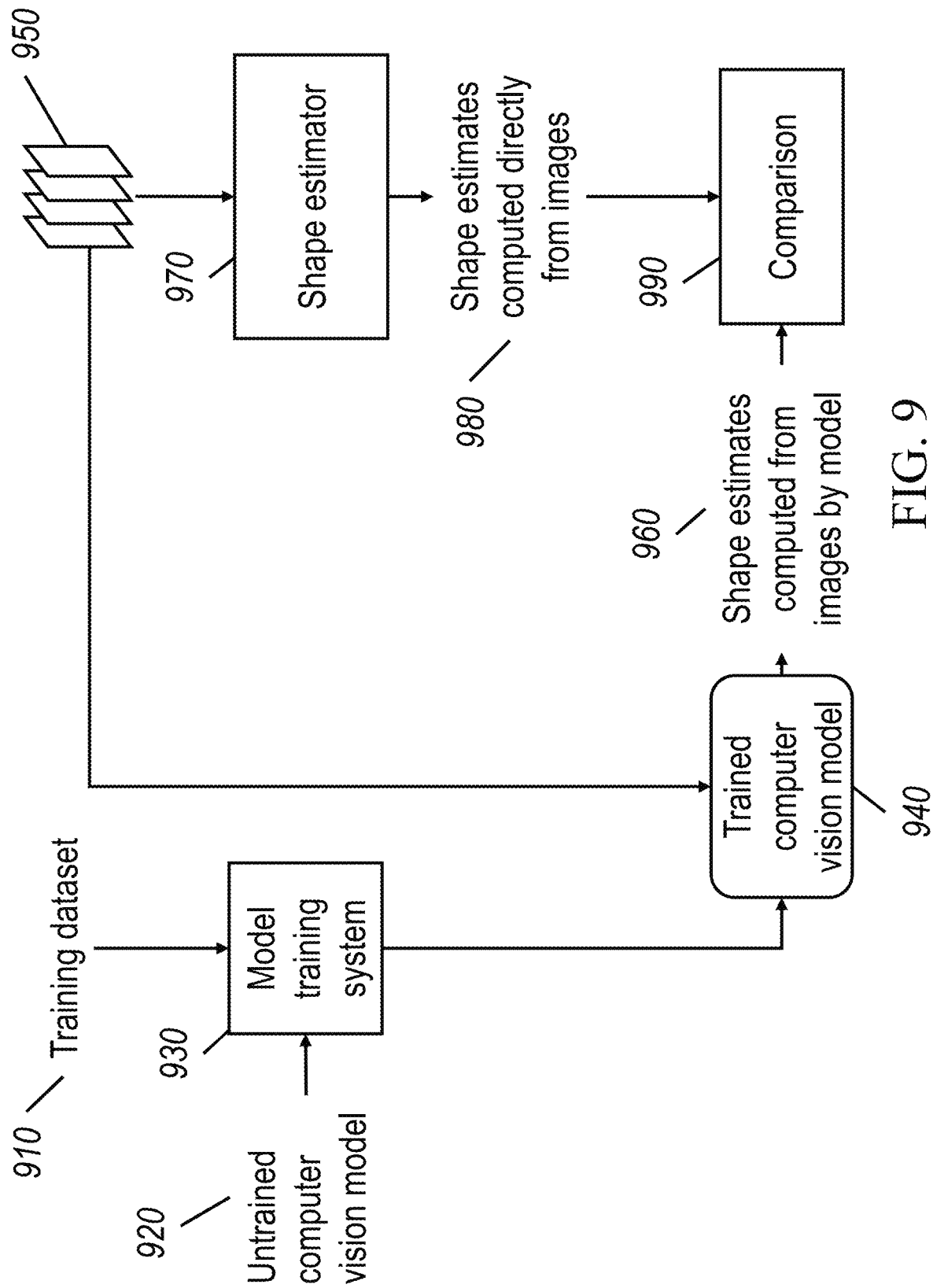
FIG. 9 is a schematic block diagram depicting training a computer vision model using a dataset according to some embodiments of the present disclosure.

FIG. 9 is a schematic block diagram depicting training a computer vision model using a dataset according to some embodiments of the present disclosure. As shown in FIG. 9, a training dataset 910 including captured images and corresponding clean ground-truth shape data (e.g., corresponding surface normals maps) is supplied with along with an untrained computer vision model 920 to a model training system 930 to compute a trained computer vision model 940 based on the training dataset 910. In particular, the training process may compute a plurality of parameters that configure the computer vision model to perform particular tasks. As a specific example, in the case of deep convolutional neural network, the trained parameters may include weights and biases of connections between the neurons in various layers of the deep convolutional neural network. The untrained computer vision model 920 may have initial parameters that are set randomly or may be a pre-trained network that may have previously been trained to perform a different task or trained based on a different training dataset. Captured images 950 of a scene may then be supplied to the trained computer vision model 940 to compute shape estimates by the computer vision model 960. In comparison, a comparative shape estimator 970 that computed the shapes of objects directly from the images (e.g., without using a trained computer vision model) may use techniques such as depth from disparity and/or shape from polarization to compute shape estimates directly from the images 980 (these may be referred to as being computed using "classical" techniques as opposed to techniques based on machine learning or statistical learning). However, these classically computed shape estimates may exhibit noisy or inconsistent estimates.

As such, a neural network trained according to embodiments of the present disclosure would disambiguate between the different noisy or inconsistent surface normals N computed from the different views, modalities, and spectral information captured (e.g., where the surface normals maps N may differ in accordance with the noise or variability of the polarization signature due to differences in albedo, wavelength, and texture copy artifacts due to viewing direction, as well as other noise in ambiguity in the image capture process). Comparing the shape estimates from the model 960 against the shape estimates computed directly from the images 980 in a comparison module 990 show that a properly-trained computer vision model 940 produces smoother and more accurate shape estimates than comparative techniques.

In addition, given a dataset depicting a sufficiently diverse set of objects (e.g., generated based on images of known objects and their corresponding 3-D models), in some embodiments, the trained model is generalized to generate accurate and low-noise estimates of the shapes of arbitrary objects (e.g., objects that may not be depicted in the training dataset), thereby enabling the estimation of unknown or novel objects (e.g., objects for which corresponding 3-D models may not be available to the shape estimator).

One example of a computer vision model uses a multi-view deep neural network, where the images captured from each viewpoint would pass through its own polarization fusion backbone (see, e.g., International Patent Application No. PCT/US20/48604 filed Aug. 28, 2020, U.S. patent application Ser. No. 17/266,046, and Kalra, Agastya, et al. "Deep polarization cues for transparent object segmentation." *Proceedings of the IEEE/CVF Conference on Computer Vision and Pattern Recognition.* 2020, the entire disclosures of which are incorporated by reference herein), with independent weights for each viewpoint-specific backbone. The features computed from the images captured from each viewpoint by the separate polarization fusion backbones are then used by the computer vision model to compute a set of multi-scale features (e.g., using ResNet, as described in He, Kaiming, et al. "Deep residual learning for image recognition." *Proceedings of the IEEE conference on computer vision and pattern recognition.* 2016. or using a Feature Pyramid Network see, e.g., Lin, Tsung-Yi, et al. "Feature pyramid networks for object detection." *Proceedings of the IEEE conference on computer vision and pattern recognition.* 2017.). The computer vision model may then compute correspondences between multi-scale features across the multiple viewpoints using a multi-view correlation search based on epipolar geometry (see, e.g., GCNet as described in Cao, Yue, et al. "Gcnet: Non-local networks meet squeeze-excitation networks and beyond." *Proceedings of the IEEE/CVF International Conference on Computer Vision Workshops.* 2019., AANet as described in Xu, Haofei, and Juyong Zhang. "Aanet: Adaptive aggregation network for efficient stereo matching." *Proceedings of the IEEE/CVF Conference on Computer Vision and Pattern Recognition.* 2020, GA-Net as described in Zhang, Feihu, et al. "GA-Net: Guided aggregation net for end-to-end stereo matching." *Proceedings of the IEEE/CVF Conference on Computer Vision and Pattern Recognition.* 2019., and the like). These correspondences provide 3-D information about the scene imaged by the multi-view imaging system including cameras at different viewpoints. This 3-D information can then be used to compute surface normals and 6-DoF poses of objects in the scene. Finally, in some embodiments, the surface normals are further refined using Polarized 3D in real-time, as described in Kadambi, Achuta, et al. "Polarized 3d: High-quality depth sensing with polarization cues." *Proceedings of the IEEE International Conference on Computer Vision.* 2015.

Figure 10:
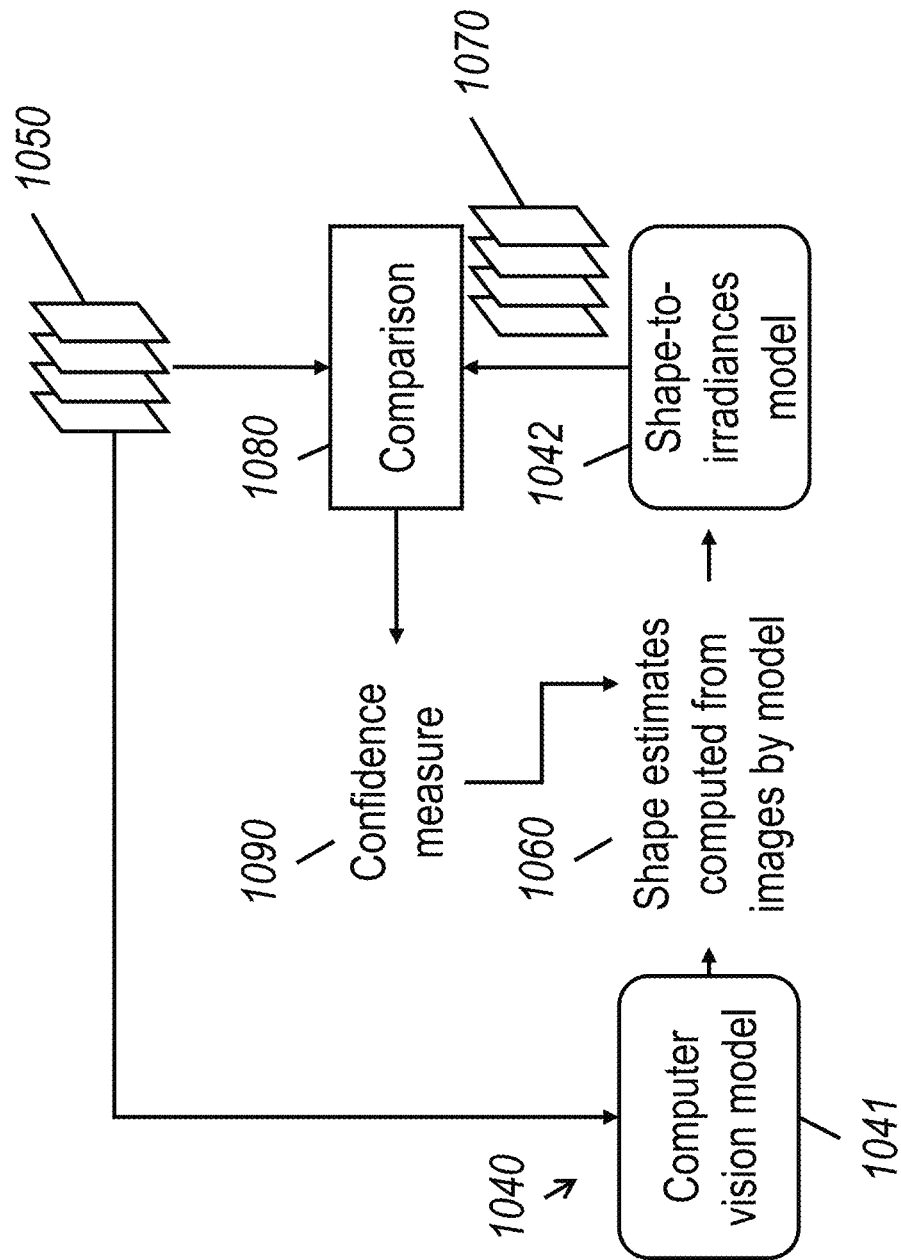
FIG. 10 is a schematic block diagram depicting a computer vision model according to some embodiments of the present disclosure.

FIG. 10 is a schematic block diagram depicting a computer vision model according to some embodiments of the present disclosure. As shown in FIG. 10, in some embodiments, the computer vision model 1040 includes a first neural network 1041 (e.g., using an architecture as described above) that is trained to compute shape estimates 1060 (e.g., surface normals maps) from irradiance images 1050 captured from a scene. The computer vision model 1040 in these embodiments further include a second neural network 1042 (e.g., a convolutional neural network) or a shape-to-irradiances model 1042 that is trained to map a computed surface normals map (e.g., trained using the ground truth labels in the dataset) to synthesized image irradiances 1070 from polarization filtered cameras (e.g., estimates of what the captured polarization raw frames would give rise to the surface normals map). This second neural network 1042 may be trained by reversing the roles of the ground truth labels and the input data pairs of the training dataset. This second neural network 1042 between the actual input 1050 and the inversely predicted input 1070 may then be used by a comparison module 1080 to compute a confidence measure 1080 in the surface normals maps 1060 computed by the first neural network 1041, described above, by comparing the synthesized polarization raw frames 1070 with the observed polarization raw frames 1050 captured by the cameras. During training, the confidence measure 1090 may be used as a component of the training loss function for training the parameters of the computer vision model 1040 to increase the confidence score, and may also be used in deployment as an estimate of the confidence in the shape estimates computed by the first computer vision model 1041.

In some embodiments, the computer vision model computes estimates of the shapes of surfaces based on the polarized inverse rendering problem. In particular, the computer vision model is trained to take the AOLP, DOLP, and Intensity image from each viewpoint as input (e.g., computed from polarization raw frames captured by the cameras) and to decompose each viewpoint into polarized lighting parameters, polarized material parameters (albedo and reflectance properties), and surface normals maps. In more detail, when generating the dataset, a differentiable rendering engine may be used to in operation 850 compute the polarized lighting parameters, polarized material parameters, and surface normals maps as a part of the shape estimates, such that the rendered images rendered by the differentiable rendering engine match the appearance of the input images. In some embodiments, the model further maps the features into a material invariant polarization embedding space, thereby enabling a physics-based equation search that improves physics-based polarization reconstruction and also the accuracy of the computed surface normals maps.

Accordingly, aspects of embodiments of the present disclosure relate to systems and methods for generating datasets for training computer vision models, such as neural networks, to predict the shapes of objects, such as the surface normals of those objects, based on a set of input images captured by an imaging system, such as a multi-view and/or multi-modal imaging system. Aspects of embodiments of the present disclosure also relate to such computer vision models trained based on such datasets. Such computer vision models provide a very efficient means of determining poses and shapes of objects, which is of value in the case of automation and robotics, where short cycle times (fast computations) increase the throughput of such systems (e.g., short processing times for determining the poses of objects enables robotic arm systems to pick and manipulate those objects more quickly, thereby enabling more objects to be manipulated per unit of time).

As noted above, in some circumstances, systems and methods for generating such datasets may be deployed within an existing production context, such as within a factory or other manufacturing facility, within a logistics pipeline (e.g., warehouse), and/or other operating environment where the shape estimator is configured to detect the shapes and/or poses of known objects. Through the process of detecting the shapes and poses of the known objects using the known 3-D model, embodiments of the present disclosure collect input images and 6-DoF poses of objects, which are then used to populate the training dataset by automatically generating ground truth data or labels for the data based on the input images, the 6-DoF poses of objects, and the 3-D models of the objects, without requiring hand labeling of these ground truth data (e.g., without requiring direct human involvement in generating these ground truth labels).

This process produces a large dataset with, possibly, millions of different images collected through the deployment of such systems in environments such as factories for autonomous manufacturing of products. Accordingly, the collected dataset can be used to train and/or re-train computer vision systems to produce robust predictions of the shapes of objects under a wide range of objects made of different materials, having different geometries (including unknown geometries), and under different illumination conditions, and therefore these systems can be quickly redeployed to new environments with little to no adaptation (e.g., retraining) required to achieve good performance, noting that additional data collected from the new environments may further improve performance.

Figure 11:
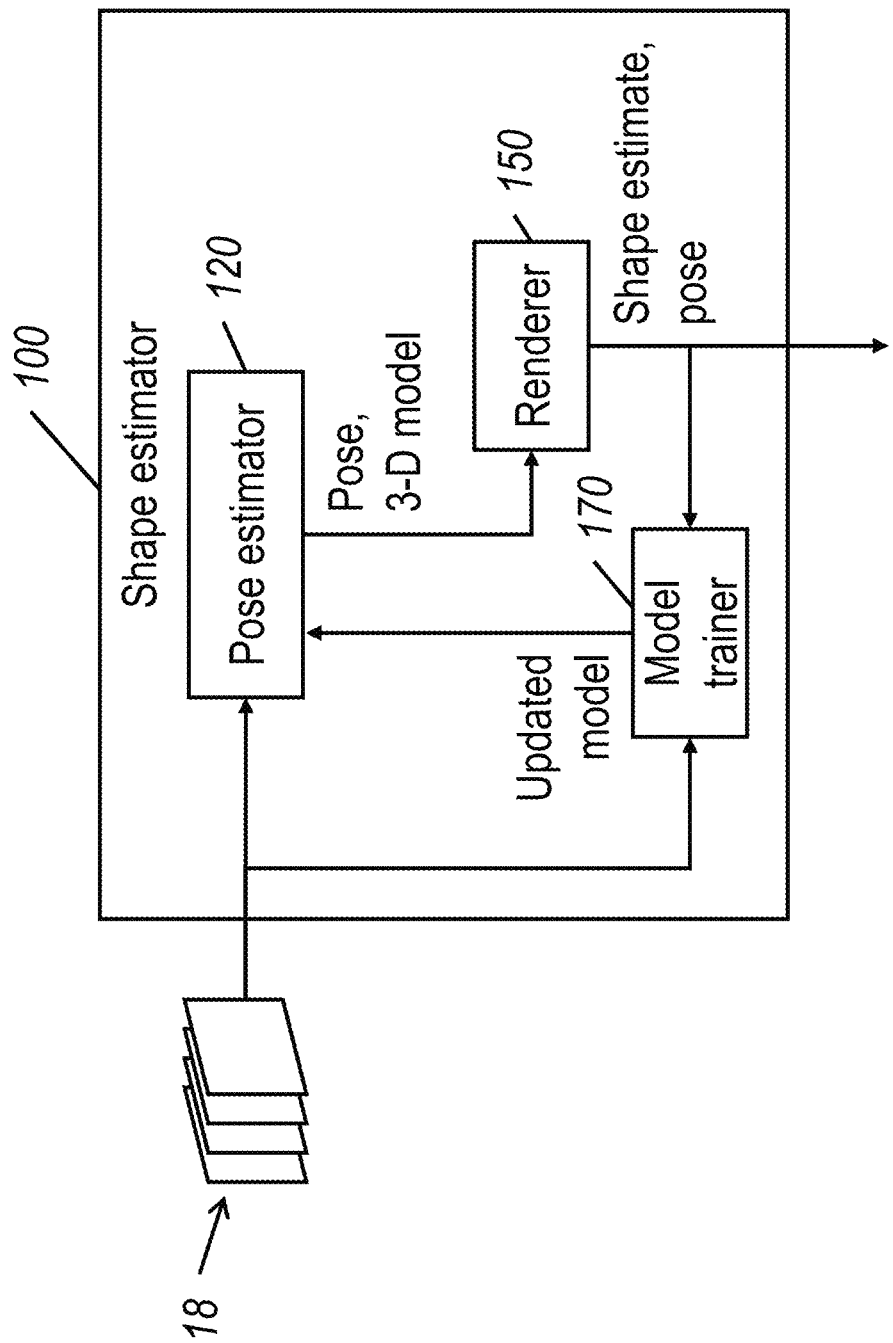
FIG. 11 is a block diagram of a shape estimator according to one embodiment of the present disclosure.
Figure 12:
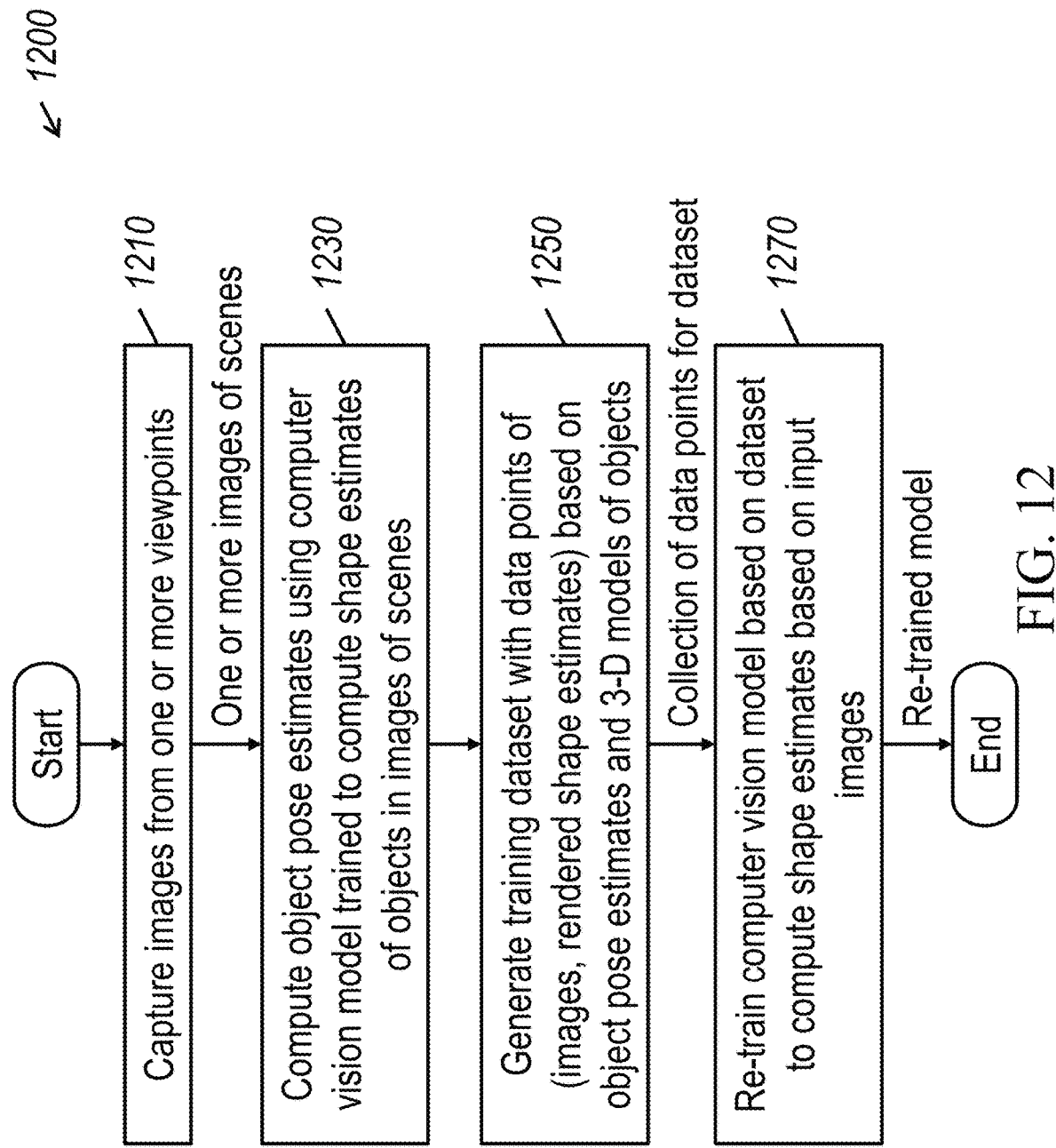
FIG. 12 is a flowchart of a method for re-training computer vision model according to one embodiment of the present disclosure.

FIG. 11 is a block diagram of a shape estimator according to one embodiment of the present disclosure. FIG. 12 is a flowchart of a method 1200 for re-training computer vision model according to one embodiment of the present disclosure. As described above with respect to FIG. 1A, in some embodiments, in operation 1210, a shape estimator 100 receives input images 18 based on images captured by the imaging system, which may include a main camera 10 and, in the case of a multi-view imaging system, support cameras 30. These input images 18 may be multi-view images (from multiple viewpoints) and may be captured using multiple imaging modalities (with or without polarization filters, in different portions of the electromagnetic spectrum, depth maps generated from time of flight or stereo, polarization signatures generated from polarization raw frames captured by camera modules with polarization filters, and the like). These input images 18 are processed by a pose estimator 120 to compute a pose of a known object in the scene in operation 1230, where a 3-D model of the known object is available to the pose estimator 120. (The pose estimator 120 may also concurrently compute the poses of multiple known objects of the same type represented by the same 3-D model or of different types represented by different 3-D models in the scene.) In the process of computing the pose of the object in the scene, the pose estimator 120 may compute a shape estimate of the object detected in the images 18 and compute a pose of the object by aligning the 3-D model to match estimated shape of the object. In some embodiments, the pose estimator 120 uses of one or more trained computer vision models to compute features from the input images 18. For example, the pose estimator 120 may use a computer vision model trained on a dataset as described above to compute a shape estimate (e.g., an estimated surface normals map of the object). The pose estimator 120 may then compare the shape estimate against a rendered shape of the 3-D model (e.g., comparing an estimated surface normals map against a rendered surface normals map) in order to update the estimated pose to reduce a difference between the rendered shape and the shape estimate as a constraint or as an additional constraint when computing the estimated pose of the object (e.g., in addition to constraints from other factors such as keypoint matching across one or more views, dense correspondence matching between rendered images and the observed surfaces of the object, and the like).

The computed pose and 3-D model of the object may then be output to a controller 28 for controlling an actuator, such as a robotic arm 24, to pick up objects detected in the input images 18. The pose and the 3-D model may also be supplied to a renderer 150 that is configured to render a final shape estimate of the object based on the 3-D model, and this shape estimate may also be supplied to the controller 28.

The computer vision model used by the pose estimator 120 to compute the shape estimate during pose estimation may also be retrained based on additional data collected from the environment in which the shape estimator 100 is operating. For example, the shape estimates generated by the renderer 150 may be combined with the observed images of the scene in operation 1250 to generate training data points where the data points include a set of one or more images and the corresponding rendered shape estimates (e.g., surface normals maps). These generated data points may then be supplied to a model trainer 170 to generate one or more data points for a dataset. The model trainer 170 may then periodically or continuously retrain the computer vision model in operation 1270 based on the additional training data (along with verifying that the updated model does not exhibit regressions or decreases in accuracy of the shape estimates). The retrained, updated computer vision model can then be installed or run by the pose estimator 120 for use in performing shape estimations as part of computing the poses of objects in received input images 18. In addition, the model trainer 170 may also receive training data (including data points of the same type as the input images 18 and ground truth shape estimates as labels) from other sources (e.g., other shape estimators deployed in other areas of the same facility or deployed in other facilities or from an external source of training data) to further update the computer vision models to improve performance. In some circumstances, the model trainer 170 is remote from the imaging system (e.g., remote from the main camera 10), such as a case where a centralized system receives training data points generated by one or more shape estimators 100, aggregates the received training data, and trains one or more computer vision models for deployment a shape estimator 100 (e.g., one or more of the shape estimators from which it received the training data).

Accordingly, shape estimators 100 in accordance with some embodiments of the present disclosure update internal computer vision models based on additional training data collected from their operational environments, thereby enabling the shape estimators 100 to continuously or periodically improve performance on the estimations of the poses and shapes of objects detected in the environment. This continuous improvement and domain adaptation is available even as the environment changes, either gradually (e.g., due to gradual changes in the types of objects presented to the system) or suddenly (e.g., deployment into a new environment with different types of objects and lighting conditions).

As such, datasets collected in accordance with aspects of embodiments of the present disclosure are useful in the training of computer vision models for performing shape estimation. The ImageNet dataset has over 14 million images that are hand-labeled to indicate what objects are pictured those images along with providing bounding box labels for those object in about one million of those images. The ImageNet dataset has had an enormous impact in improving object classification techniques over the years. Image datasets with multi-modal data (including, for example, polarization data) and corresponding ground truth labels indicating the shapes of the objects (e.g., the surface normals of surfaces depicted in the images) such as those described herein likewise enable efficient estimation of poses for new objects with new geometries and materials based on corresponding images such as their polarization and spectral signatures.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A system for collecting data for a training dataset for training a machine learning model, the system comprising:
    an imaging system configured to capture one or more images; and
    a processing system comprising one or more processors and memory storing instructions that, when executed by the one or more processors, cause the one or more processors to perform operations comprising:
        for each of multiple iterations:
            receiving one or more respective input images of a respective scene from the imaging system;
            estimating a respective pose of a respective object in the respective scene from the one or more respective input images including aligning keypoints in the one or more respective input images with respective corresponding keypoints of a respective 3-D model of the respective object;
            rendering, using the respective 3-D model of the respective object posed in accordance with the respective estimated pose, a respective shape estimate comprising a surface normals map that associates each of a plurality of locations in a respective input image with surface normal data;
            generating a respective data point, the respective data point comprising a respective image of the respective scene and a respective label comprising the respective shape estimate of the respective object; and
            including the respective data point in the training dataset;
        training the machine learning model on the training dataset generated using the respective 3-D models of the respective objects to compute shape estimates based on one or more input images;
        obtaining one or more images of a scene;
        generating a shape estimate of an object in the scene from the one or more images using the machine learning model;
        updating an estimated pose of the object to reduce a difference between the shape estimate and a rendered shape of a 3-D model of the object; and
        providing the estimated pose to a controller for causing a robot to manipulate the object.

2. The system of claim 1, wherein the imaging system comprises a polarization camera system, and
    wherein the one or more respective input images comprise one or more polarization images,
    wherein, for one or more of the multiple iterations, the operations further comprise generating a surface normals map from the one or more polarization images, and
    wherein aligning the keypoints in the one or more respective input images with respective corresponding keypoints of the respective 3-D model of the respective object comprises refining the respective estimated pose of the object according to differences between the surface normals map computed from the one or more polarization images and surface normals of the respective 3-D model of the object.

3. The system of claim 2 wherein the one or more polarization images comprise a plurality of spectral channels corresponding to different portions of an electromagnetic spectrum.

4. The system of claim 1, wherein the respective data point comprises one or more polarization images.

5. The system of claim 1, wherein the respective data point comprises one or more polarization signatures computed based on one or more polarization images.

6. The system of claim 1, wherein the respective data point comprises one or more surface normals maps computed from one or more polarization images.

7. The system of claim 2, wherein the respective shape estimate comprises a rendered depth map.

8. The system of claim 1, wherein the imaging system comprises a depth camera system, and
    wherein the respective data point comprises one or more depth maps.

9. The system of claim 8, wherein the respective pose of the respective object is estimated based on aligning a shape of the respective 3-D model with the one or more depth maps.

10. The system of claim 1, wherein for one or more of the multiple iterations, estimating the respective pose of the respective object further comprises using a previously trained machine learning model trained to compute shape estimates based on the one or more respective input images, and wherein training the machine learning model on the training dataset comprises re-training the machine learning model on the respective generated data points.

11. The system of claim 1, wherein training the machine learning model on the training dataset comprises training the machine learning model on the respective generated data points.

12. A method for collecting data for a training dataset for training a machine learning model, the method comprising:
    for each of multiple iterations:
        receiving, by a processing system comprising one or more processors and memory, one or more respective input images of a respective scene;
        estimating, by the processing system, a respective pose of a respective object in the respective scene from the one or more respective input images including aligning keypoints in the one or more respective input images with respective corresponding keypoints of a respective 3-D model of the respective object;

rendering, by the processing system using the respective 3-D model of the respective object posed in accordance with the respective estimated pose, a respective shape estimate comprising a surface normals map that associates each of a plurality of locations in a respective input image with surface normal data;

generating, by the processing system, a respective data point, the respective data point comprising a respective image of the respective scene and a respective label comprising the respective shape estimate of the respective object; and including the respective data point in the training dataset;

training the machine learning model on the training dataset generated using the respective 3-D models of the respective objects to compute shape estimates based on one or more input images;

obtaining one or more images of a scene;

generating a shape estimate of an object in the scene from the one or more images using the machine learning model;

updating an estimated pose of the object to reduce a difference between the shape estimate and a rendered shape of a 3-D model of the object; and providing the estimated pose to a controller for causing a robot to manipulate the object.

13. The method of claim 12, wherein the one or more respective input images comprise one or more polarization images, and wherein, for one or more of the multiple iterations, the method further comprises generating a surface normals map from the one or more polarization images, wherein aligning the keypoints in the one or more respective input images with respective corresponding keypoints of the respective 3-D model of the respective object comprises refining the respective estimated pose of the respective object according to differences between the surface normals map computed from the one or more polarization images and surface normals of the respective 3-D model of the respective object.

14. The method of claim 13, wherein the one or more polarization images comprise a plurality of spectral channels corresponding to different portions of an electromagnetic spectrum.

15. The method of claim 12, wherein the respective data point comprises one or more polarization images.

16. The method of claim 12, wherein the respective data point comprises one or more polarization signatures computed based on one or more polarization images.

17. The method of claim 12, wherein the respective data point comprises one or more surface normals maps computed from one or more polarization images.

18. The method of claim 13, wherein the respective shape estimate comprises a rendered depth map.

19. The method of claim 12, wherein the respective data point comprises one or more depth maps.

20. The method of claim 19, wherein the respective pose of the respective object is estimated based on aligning a shape of the respective 3-D model with the one or more depth maps.

21. The method of claim 12, wherein, for one or more of the multiple iterations, estimating the respective pose of the respective object further comprises using a previously trained machine learning model trained to compute shape estimates based on the one or more respective input images, and wherein training the machine learning model on the training dataset comprises re-training the machine learning model on the respective generated data points.

22. The method of claim 12, wherein training the machine learning model on the training dataset comprises training the machine learning model on the respective data points.

23. One or more non-transitory computer storage media encoded with computer program instructions that when executed by one or more computers cause the one or more computers to perform operations for collecting data for a training dataset, comprising:

for each of multiple iterations:
receiving one or more respective input images of a respective scene;

estimating a respective pose of a respective object in the respective scene from the one or more respective input images including aligning keypoints in the one or more respective input images with respective corresponding keypoints of a respective 3-D model of the respective object;

rendering, using the respective 3-D model of the respective object posed in accordance with the respective estimated pose, a respective shape estimate comprising a surface normals map that associates each of a plurality of locations in a respective input image with surface normal data;

generating a respective data point, the respective data point comprising a respective image of the respective scene and a respective label comprising the respective shape estimate of the respective object; and including the respective data point in the training dataset;

training a machine learning model on the training dataset generated using the respective 3-D models of the respective objects to compute shape estimates based on one or more input images;

obtaining one or more images of a scene;

generating a shape estimate of an object in the scene from the one or more images using the machine learning model;

updating an estimated pose of the object to reduce a difference between the shape estimate and a rendered shape of a 3-D model of the object; and providing the estimated pose to a controller for causing a robot to manipulate the object.

* * * * *